United States Patent
Kishikawa et al.

(10) Patent No.: US 10,310,303 B2
(45) Date of Patent: Jun. 4, 2019

(54) LIQUID CRYSTAL COMPOUND, LIQUID CRYSTAL COMPOSITION AND LIQUID CRYSTAL DISPLAY DEVICE USING THE SAME

(71) Applicants: National University Corporation Chiba University, Chiba (JP); JNC Corporation, Tokyo (JP); JNC Petrochemical Corporation, Tokyo (JP)

(72) Inventors: Keiki Kishikawa, Chiba (JP); Sang Ho Lee, Chiba (JP); Yasuyuki Sasada, Chiba (JP); Tokifumi Masukawa, Chiba (JP)

(73) Assignees: National University Corporation Chiba University, Chiba (JP); JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 44 days.

(21) Appl. No.: 15/597,186

(22) Filed: May 17, 2017

(65) Prior Publication Data
US 2017/0336660 A1 Nov. 23, 2017

(30) Foreign Application Priority Data

May 20, 2016 (JP) ................. 2016-101478

(51) Int. Cl.
| | | |
|---|---|---|
| G02F 1/1333 | (2006.01) | |
| G02F 1/133 | (2006.01) | |
| C09K 19/20 | (2006.01) | |
| C09K 19/44 | (2006.01) | |
| C09K 19/32 | (2006.01) | |
| C09K 19/30 | (2006.01) | |
| C09K 19/04 | (2006.01) | |

(52) U.S. Cl.
CPC .............. *G02F 1/133* (2013.01); *C09K 19/20* (2013.01); *C09K 19/32* (2013.01); *C09K 19/322* (2013.01); *C09K 19/44* (2013.01); *C09K 19/3066* (2013.01); *C09K 2019/0448* (2013.01); *C09K 2019/2042* (2013.01); *C09K 2019/2078* (2013.01); *C09K 2019/3012* (2013.01); *C09K 2019/3021* (2013.01)

(58) Field of Classification Search
CPC ........ C09K 19/20; C09K 19/44; C09K 19/32; C09K 19/322; C09K 19/3066; C09K 2019/3021; C09K 2019/0448; C09K 2019/2042; C09K 2019/2078; C09K 2019/3012; G02F 1/133; G02F 1/1334
USPC ................................................... 252/299.67
See application file for complete search history.

(56) References Cited

U.S. PATENT DOCUMENTS

| | | | |
|---|---|---|---|
| 9,394,482 B2 * | 7/2016 | Gotoh | ................ C09K 19/3402 |
| 2008/0058544 A1 | 3/2008 | Sasada et al. | |
| 2015/0102259 A1 | 4/2015 | Gotoh et al. | |

OTHER PUBLICATIONS

R. Amaranatha Reddy et al., "Banana-shaped Mesogens: Observation of a Direct Transition From the Antiferroelectric $B_2$ to Nematic Phase", Chemical Communications, Issue 19, 2001 pp. 1972-1973.

Sasada et al., "Drastic Change of Mesomorphism Induced by the Fluorination of Peripherally Attached Phenyl Groups in Triphenylene Mesogens", Molecular Crystals and Liquid Crystals, vol. 525, No. 1, 2010, pp. 153-157.

Sasada et al., "Drastic Enhancement of Discotic Mesomorphism Induced by Fluorination of the Peripheral Phenyl Groups in Triphenylene Mesogens", Chemical Communications, Issue 12, 2008, pp. 1452-1454.

(Continued)

*Primary Examiner* — Geraldina Visconti

(74) *Attorney, Agent, or Firm* — Marshall, Gerstein & Borun LLP

(57) ABSTRACT

Provided is a liquid crystal compound that can obtain a high-speed response and a sufficient contrast ratio in switching of a display device. A compound represented by formula (1) described below is utilized.

(1)

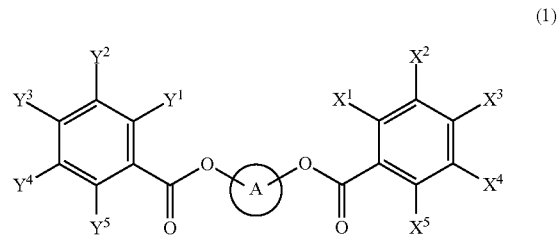

In formula (1),
ring A is naphthylene, phenantolylene or anthracenylene, and in the groups, at least one piece of hydrogen may be replaced by halogen, $—CH_3$, $—C_2H_5$, $—CF_3$, $—CHF_2$, $—CH_2F$, $—OCF_3$, $—OCHF_2$ or $—OCH_2F$; and $X^1$, $X^2$, $X^3$, $X^4$, $X^5$, $Y^1$, $Y^2$, $Y^3$, $Y^4$ and $Y^5$ are independently hydrogen or fluorine, but at least two or more of $X^1$, $X^2$, $X^3$, $X^4$, $X^5$, $Y^1$, $Y^2$, $Y^3$, $Y^4$ and $Y^5$ is fluorine.

16 Claims, 6 Drawing Sheets

(56) References Cited

OTHER PUBLICATIONS

Extended European Search Report in EP Application No. 17171628.5 dated Oct. 25, 2017, nine pages.
Le et al., "Biaxiality of Bent-Core Nematic Liquid Crystals", Ekisho vol. 15, No. 2, 2011, pp. 125-131.
Kishikawa, "Interaction-assisted Approach for Realization of Biaxiality in Nematic and Smectic A Phases", 123rd Study Group Document (2.28, 2012), pp. 8-14 of Japan Society for the Promotion of Science "142nd Committee for Organic Materials for Information Science" Subcommittee A (liquid crystal materials).

* cited by examiner

LIQUID CRYSTAL COMPOUND, LIQUID CRYSTAL COMPOSITION AND LIQUID CRYSTAL DISPLAY DEVICE USING THE SAME

TECHNICAL FIELD

The invention relates to a liquid crystal compound. Moreover, the invention also relates to a liquid crystal composition using the liquid crystal compound and a liquid crystal display device using the same.

BACKGROUND ART

A liquid crystal television using a liquid crystal display is known. A compound exhibiting a uniaxial nematic phase is generally utilized in such a liquid crystal display. The liquid crystal display using the compound exhibiting the uniaxial nematic phase is indicated to be low in a response speed thereof. The response speed means a period of time taken for a liquid crystal device to be directed toward a predetermined direction according to voltage applied. If the response speed is slow, a period of time during which color is changed from color first displayed to objective color becomes long, and therefore upon displaying moving images, a residual image easily appears.

On the other hand, a field sequential system attracts attention as a next-generation liquid crystal display system, and the system requires the response speed 3 times or more the response speed of a current system. In order to achieve a fast response speed, a compound exhibiting a biaxial nematic phase has been developed.

In a conventional display device utilizing the uniaxial nematic phase, a way of light to pass therethrough is changed by significantly changing a direction of molecules in a major axis. In contrast, in a display device utilizing the biaxial nematic phase, the way of light to pass therethrough is changed by changing the direction of molecules in a minor axis while the direction of molecules in the major axis is kept.

In order to realize the biaxial nematic phase, a molecule having high anisotropy has been so far designed and prepared. As such molecules, for example, bent-type (Non-patent literature No. 1) molecules are generally known. Moreover, in Non-patent literature No. 2, in order to avoid response speed reduction that may occur in the molecules having high anisotropy as described in Non-patent literature No. 1, simple rod-like molecules in which an excluded volume in rotation around the major axis is small have also been developed.

CITATION LIST

Non-Patent Literature

Non-patent literature No. 1: EKISHO Vol.15 No.2, 2011, pp. 125-131.

Non-patent literature No. 2: 123rd Study Group Document (2.28, 2012) pp. 8-14 of Japan Society for the Promotion of Science "142nd Committee for Organic Materials for Information Science" Subcommittee A (liquid crystal materials).

SUMMARY OF INVENTION

Technical Problem

Molecules as described in Non-patent literature No. 1 and Non-patent literature No. 2 have a possibility of being unable to obtain a high-speed response and a sufficient contrast ratio in switching of a display device.

Then, in the invention, an object is to provide a liquid crystal compound according to which the high-speed response and the sufficient contrast ratio can be obtained in switching of the display device. Further, the invention also provides a liquid crystal composition using the liquid crystal compound, and a liquid crystal display device using the same.

Solution to Problem

The present inventors have found that a high-speed response and a sufficient contrast ratio are obtained in switching of a display device if a compound represented by formula (1) described below is utilized, and thus have completed the invention.

Formula 1

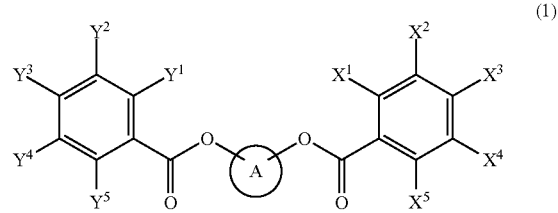

wherein, in formula (1), ring A is naphthylene, phenantolylene or anthracenylene, and in the groups, at least one piece of hydrogen may be replaced by halogen, $-CH_3$, $-C_2H_5$, $-CF_3$, $-CHF_2$, $-CH_2F$, $-OCF_3$, $-OCHF_2$ or $-OCH_2F$; and $X^1$, $X^2$, $X^3$, $X^4$, $X^5$, $Y^1$, $Y^2$, $Y^3$, $Y^4$ and $Y^5$ are independently hydrogen or fluorine, but at least two or more of $X^1$, $X^2$, $X^3$, $X^4$, $X^5$, $Y^1$, $Y^2$, $Y^3$, $Y^4$ and $Y^5$ is fluorine.

Advantageous Effects of Invention

The invention can provide a liquid crystal compound for obtaining a high-speed response and a sufficient contrast ratio in switching of a display device, a liquid crystal composition and a liquid crystal display device using the same.

DESCRIPTION OF EMBODIMENTS

Figure 1:
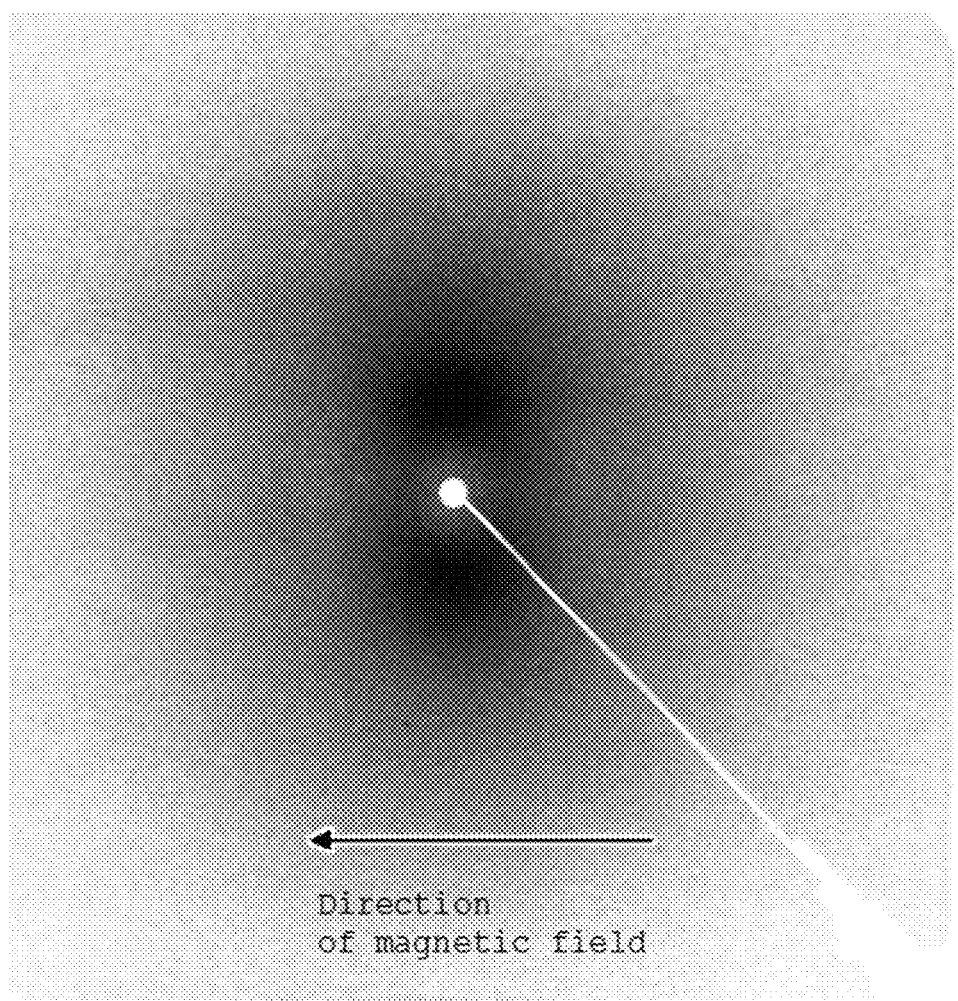
FIG. 1 is a diagram (photograph) showing measurement results of 2D-XRD of compound No. 4 prepared in Example 1.

Usage of terms herein is as described below. A liquid crystal compound is a generic term for a compound having a liquid crystal phase such as a nematic phase and a smectic phase, and a compound having no liquid crystal phase but to be added for the purpose of adjusting physical properties of a composition, such as maximum temperature, minimum temperature, viscosity and dielectric anisotropy. The liquid crystal compound, a liquid crystal composition and a liquid crystal display device may be occasionally abbreviated as "compound," "composition" and "device," respectively. The liquid crystal display device is a generic term for a liquid crystal display panel and a liquid crystal display module. A clearing point is transition temperature between the liquid crystal phase and an isotropic phase in the liquid crystal compound. A minimum temperature of the liquid crystal phase is transition temperature between a solid and the liquid crystal phase (a smectic phase, a nematic phase or the like) in the liquid crystal compound. The maximum temperature of the nematic phase is transition temperature between the nematic phase and the isotropic phase in the liquid crystal composition, and may be occasionally abbreviated as "maximum temperature." A minimum temperature of the nematic phase may be occasionally abbreviated as "minimum temperature."

A compound represented by formula (1) may be occasionally abbreviated as "compound (1)." The abbreviation may also apply occasionally to a compound represented by formula (2) or the like. In formulas (2) to (15), a symbol of $B^1$, $C^1$ or the like surrounded by a hexagonal shape corresponds to ring $B^1$, ring $C^1$ or the like, respectively. In formula (8), when i is 2, two of ring $D^1$ exists. In the compound, two groups represented by two of ring $D^1$ may be identical or different. A same rule applies also to two of arbitrary ring $D^1$ when i is larger than 2. A same rule applies also to a symbol such as any other ring and a bonding group.

Specific examples of the liquid crystal compounds include a liquid crystal compound having a six-membered ring such as 1,4-cyclohexylene and 1,4-phenylene, and having rod-like molecular structure. A liquid crystal composition may be prepared by further mixing such liquid crystal compounds. A proportion (content) of the liquid crystal compounds is expressed in terms of weight percent (% by weight) based on the weight of the liquid crystal composition. An additive such as an optically active compound, an antioxidant, an ultraviolet light absorber, a light stabilizer, a heat stabilizer, an antifoaming agent, a polymerization initiator and a polymerization inhibitor is added to the composition when necessary. A proportion (amount of addition) of the additive is expressed in terms of weight percent (% by weight) based on the weight of the liquid crystal composition in a manner similar to the liquid crystal compound. Weight parts per million (ppm) may be occasionally used. However, the polymerization initiator and the polymerization inhibitor are expressed based on the weight of the polymerizable compound.

An expression "at least one piece of "A" may be replaced by "B"" means that, when the number of "A" is 1, a position of "A" is arbitrary, and also when the number of "A" is 2 or more, positions thereof can be freely selected without restriction. An expression "at least one piece of A may be replaced by B, C or D" means including a case where at least one piece of A is replaced by B, a case where at least one piece of A is replaced by C, and a case where at least one piece of A is replaced by D, and also a case where a plurality of pieces A are replaced by at least two of B, C and D. For example, alkyl in which at least one piece of —$CH_2$— (or —$CH_2CH_2$—) may be replaced by —O— (or —CH=CH—) includes alkyl, alkenyl, alkoxy, alkoxyalkyl, alkoxyalkenyl and alkenyloxyalkyl. In addition, a case where two pieces of consecutive —$CH_2$— are replaced by —O— to form —O—O— is not preferred. In alkyl or the like, a case where —$CH_2$— of a methyl part (—$CH_2$—H) is replaced by —O— to form —O—H is not preferred, either.

The invention includes contents described in the following items.

Item 1. A compound, represented by formula (1):

Formula 2

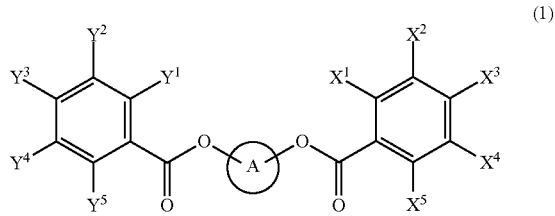

(1)

wherein, in formula (1), ring A is naphthylene, phenantolylene or anthracenylene, and in the groups, at least one piece of hydrogen may be independently replaced by halogen, —$CH_3$, —$C_2H_5$, —$CF_3$, —$CHF_2$, —$CH_2F$, —$OCF_3$, —$OCHF_2$ or —$OCH_2F$; and $X^1$, $X^2$, $X^3$, $X^4$, $X^5$, $Y^1$, $Y^2$, $Y^3$, $Y^4$ and $Y^5$ are independently hydrogen or fluorine, but at least two or more of $X^1$, $X^2$, $X^3$, $X^4$, $X^5$, $Y^1$, $Y^2$, $Y^3$, $Y^4$ and $Y^5$ is fluorine.

Item 2. The compound according to item 1,
wherein, in formula (1), ring A is naphthylene, phenantolylene or anthracenylene, and in the groups, at least one piece of hydrogen may be independently replaced by fluorine, —$CH_3$ or —$CF_3$.

Item 3. The compound according to item 1, represented by any one of formula (1-1) to formula (1-12):

Formula 3

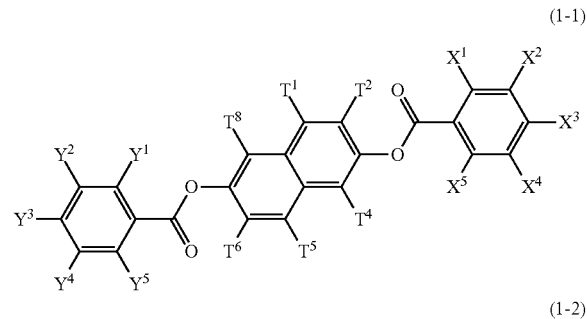

(1-1)

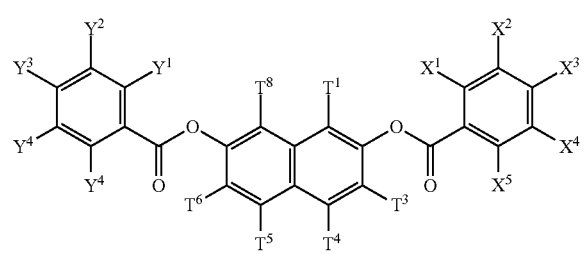

(1-2)

(1-3)
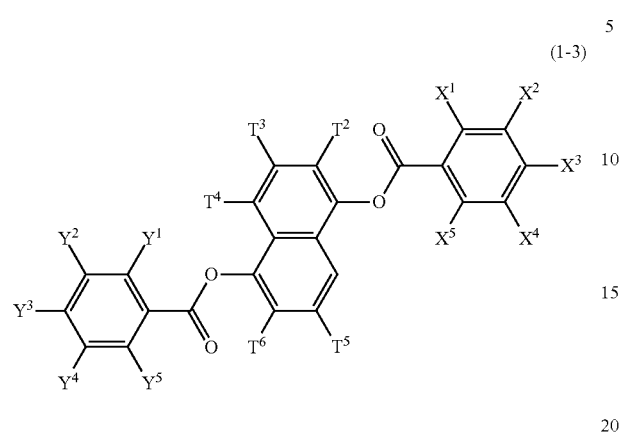
(1-7)
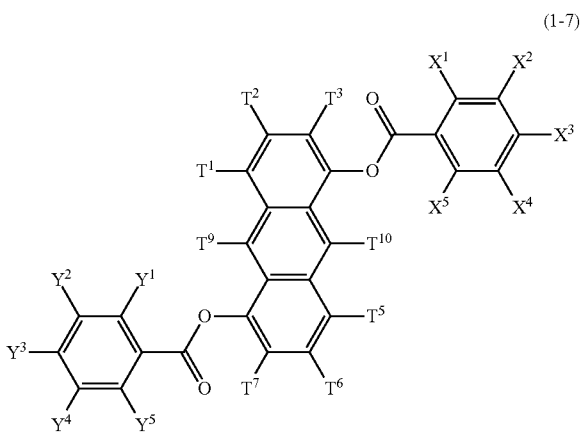
(1-4)
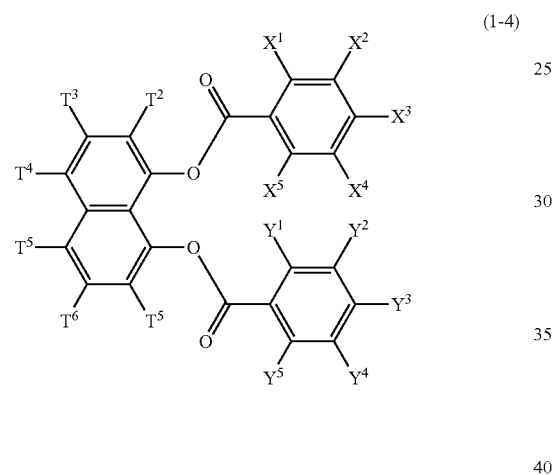
(1-8)
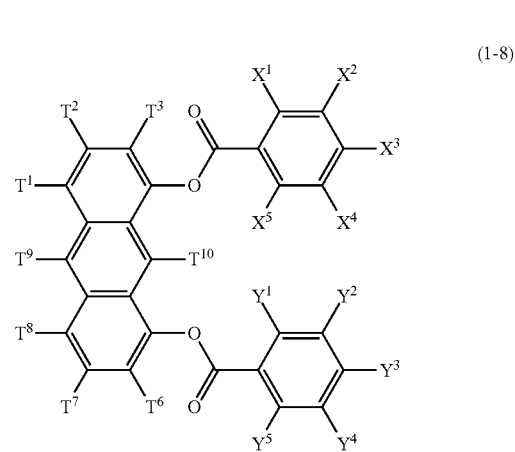
(1-5)
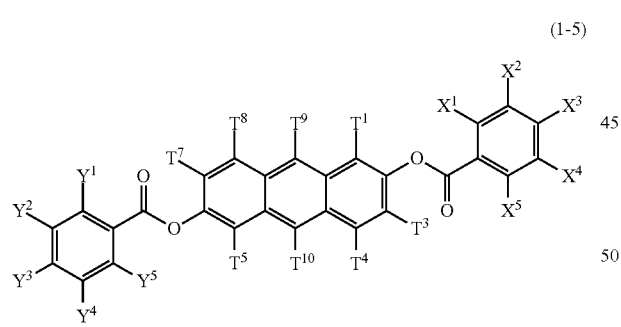
(1-9)
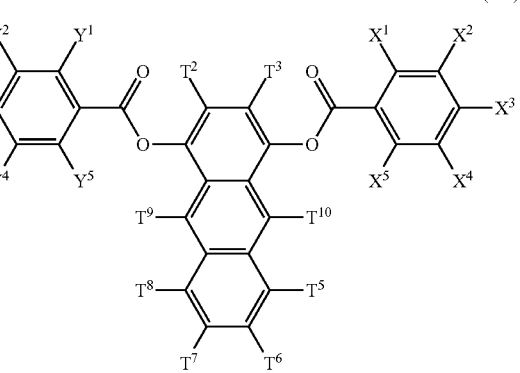
(1-6)
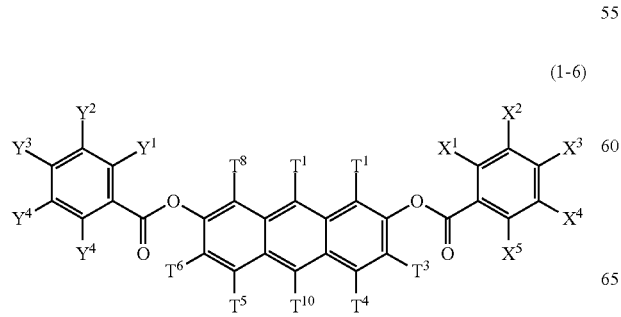
(1-10)
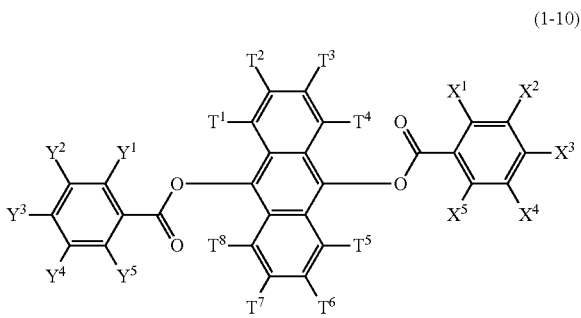

-continued (1-11)

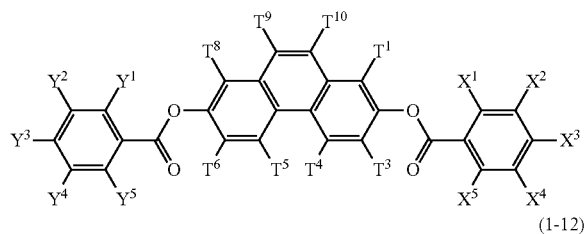

(1-12)

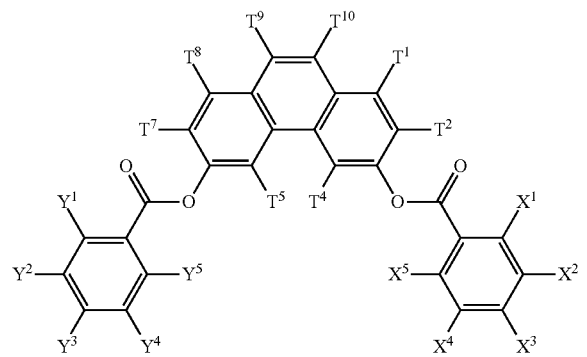

wherein, in formula (1-1) to formula (1-12), $T^1$, $T^2$, $T^3$, $T^4$, $T^5$, $T^6$, $T^7$, $T^8$, $T^9$ and $T^{10}$ are independently hydrogen, halogen, —$CH_3$, —$C_2H_5$, —$CF_3$, —$CHF_2$, —$CH_2F$, —$OCF_3$, —$OCHF_2$ or —$OCH_2F$; and $X^1$, $X^2$, $X^3$, $X^4$, $X^5$, $Y^1$, $Y^2$, $Y^3$, $Y^4$ and $Y^5$ are independently hydrogen or fluorine, but at least two or more of $X^1$, $X^2$, $X^3$, $X^4$, $X^5$, $Y^1$, $Y^2$, $Y^3$, $Y^4$ and $Y^5$ is fluorine.

Item 4. The compound according to item 3, wherein, in formula (1-1) to formula (1-12), $T^1$, $T^2$, $T^3$, $T^4$, $T^5$, $T^6$, $T^7$, $T^8$, $T^9$ and $T^{10}$ are hydrogen, fluorine or —$CH_3$.

Item 5. The compound according to item 3, wherein, in formula (1-1) to formula (1-12), $X^2$, $X^3$, $Y^2$ and $Y^3$ are fluorine.

Item 6. The compound according to item 3, represented by any one of formula (1-1), formula (1-2), formula (1-5), formula (1-6), formula (1-11) or formula (1-12).

Item 7. The compound according to item 3, represented by any one of formula (1-3), formula (1-4), formula (1-7), formula (1-8), formula (1-9) or formula (1-10).

Item 8. The compound according to item 3, represented by any one of formula (1-1-A), formula (1-2-A), formula (1-5-A), formula (1-6-A), formula (1-11-A) and formula (1-12-A):

Formula 4

(1-1-A)

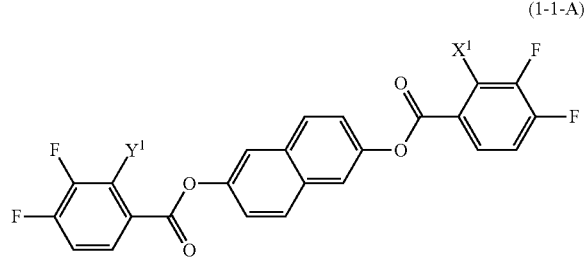

(1-2-A)

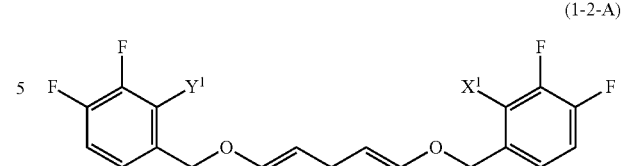

(1-5-A)

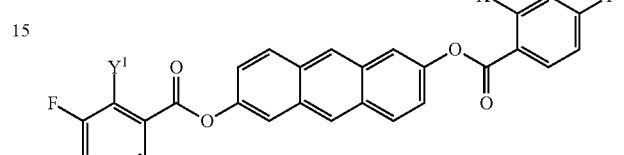

(1-6-A)

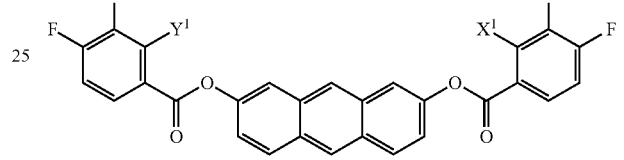

(1-11-A)

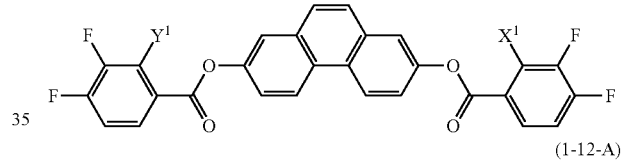

(1-12-A)

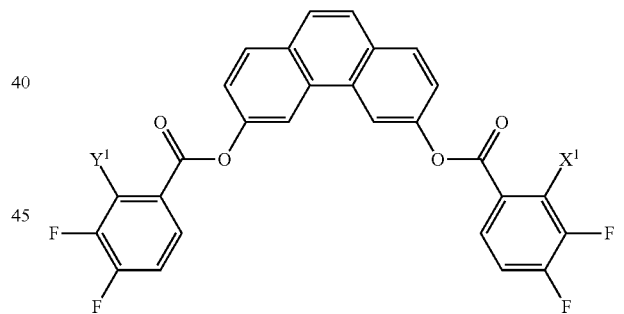

wherein, in formula (1-1-A), formula (1-2-A), formula (1-5-A), formula (1-6-A), formula (1-11-A) and formula (1-12-A), $X^1$ and $Y^1$ are independently hydrogen or fluorine.

Item 9. The compound according to item 8, wherein, in formula (1-1-A), formula (1-2-A), formula (1-5-A), formula (1-6-A), formula (1-11-A) and formula (1-12-A), both $X^1$ and $Y^1$ are hydrogen.

Item 10. The compound according to item 9, represented by formula (1-1-A) and formula (1-2-A).

Item 11. A liquid crystal composition, containing at least one compound according to any one of items 1 to 10.

Item 12. The liquid crystal composition according to item 11, further containing at least one compound selected from the group consisting of compounds represented by formulas (2) to (4):

Formula 5

(2)
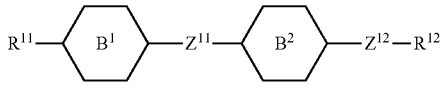

(3)
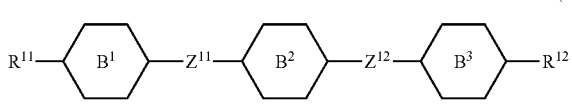

(4)
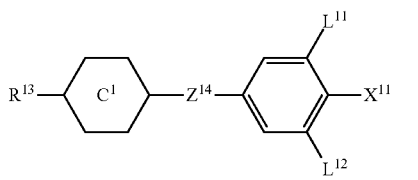

wherein, in formulas (2) to (4), $R^{11}$ and $R^{12}$ are independently alkyl having 1 to 10 carbons or alkenyl having 2 to 10 carbons, and in the alkyl and the alkenyl, at least one piece of —CH$_2$— may be replaced by —O—, and in the groups, at least one piece of hydrogen may be replaced by fluorine;

ring $B^1$, ring $B^2$, ring $B^3$ and ring $B^4$ are independently 1,4-cyclohexylene, 1,4-phenylene, 2-fluoro-1,4-phenylene, 2,5-difluoro-1,4-phenylene or pyrimidine-2,5-diyl; and $Z^{11}$, $Z^{12}$ and $Z^{13}$ are independently a single bond, —COO—, —CH$_2$CH$_2$—, —CH=CH— or —C≡C—.

Item 13. The liquid crystal composition according to item 11 or 12, further containing at least one compound selected from the group consisting of compounds represented by formulas (5) to (7):

Formula 6

(5)
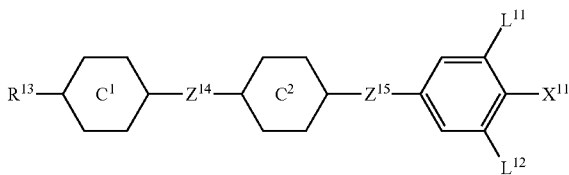

(6)
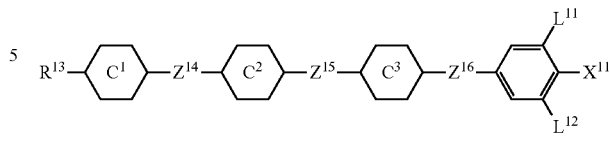

(7)
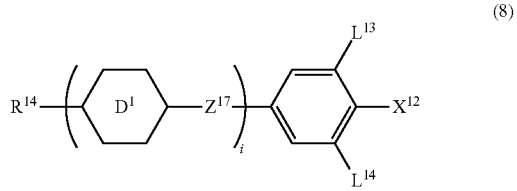

wherein, in formulas (5) to (7), $R^{13}$ is alkyl having 1 to 10 carbons or alkenyl having 2 to 10 carbons, and in the alkyl and the alkenyl, at least one piece of —CH$_2$— may be replaced by —O—, and in the groups, at least one piece of hydrogen may be replaced by fluorine;

$X^{11}$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;

ring $C^1$, ring $C^2$ and ring $C^3$ are independently 1,4-cyclohexylene, 1,4-phenylene, 1,4-phenylene in which at least one piece of hydrogen is replaced by fluorine, tetrahydropyran-2,5-diyl, 1,3-dioxane-2,5-diyl or pyrimidine-2,5-diyl;

$Z^{14}$, $Z^{15}$ and $Z^{16}$ are independently a single bond, —COO—, —OCO—, —CH$_2$O—, —OCH$_2$—, —CF$_2$O—, —OCF$_2$—, —CH$_2$CH$_2$—, —CH=CH—, —C≡C— or —(CH$_2$)$_4$—; and $L^{11}$ and $L^{12}$ are independently hydrogen or fluorine.

Item 14. The liquid crystal composition according to any one of items 11 to 13, further containing at least one compound represented by formula (8):

Formula 7

(8)
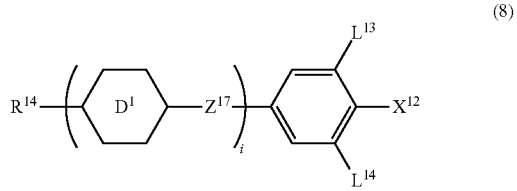

wherein, in formula (8), $R^{14}$ is alkyl having 1 to 10 carbons or alkenyl having 2 to 10 carbons, and in the alkyl and the alkenyl, at least one piece of —CH$_2$— may be replaced by —O—, and in the groups, at least one piece of hydrogen may be replaced by fluorine;

$X^{12}$ is —C≡N or —C≡C—C≡N;

ring $D^1$ is 1,4-cyclohexylene, 1,4-phenylene, 1,4-phenylene in which at least one piece of hydrogen is replaced by fluorine, tetrahydropyran-2,5-diyl, 1,3-dioxane-2,5-diyl or pyrimidine-2,5-diyl;

$Z^{17}$ is a single bond, —COO—, —OCO—, —CH$_2$O—, —OCH$_2$—, —CH$_2$CH$_2$— or —C≡C—;

$L^{13}$ and $L^{14}$ are independently hydrogen or fluorine; and i is 1, 2, 3 or 4.

Item 15. The liquid crystal composition according to any one of items 11 to 14, further containing at least one compound selected from the group consisting of compounds represented by formulas (9) to (15):

Formula 8

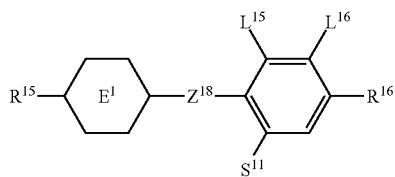 (9)

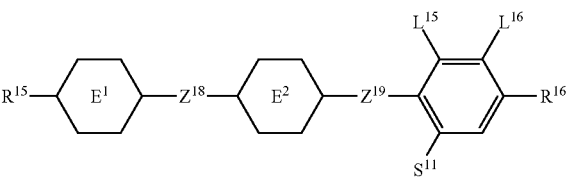 (10)

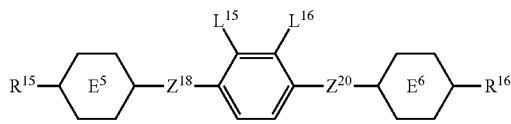 (11)

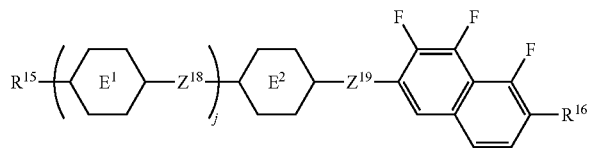 (12)

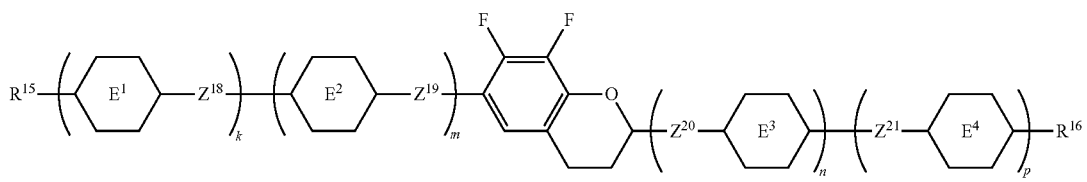 (13)

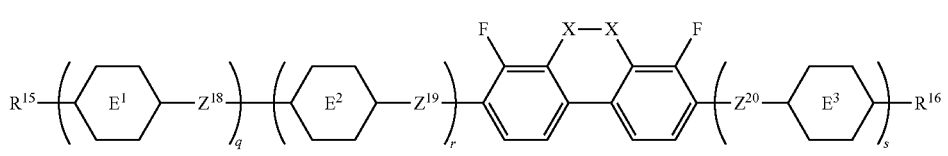 (14)

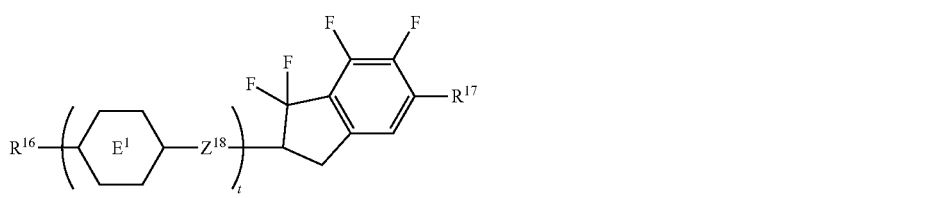 (15)

wherein, in formulas (9) to (15), $R^{15}$, $R^{16}$ and $R^{17}$ are independently alkyl having 1 to 10 carbons or alkenyl having 2 to 10 carbons, and in the alkyl and the alkenyl, at least one piece of —$CH_2$— may be replaced by —O—, and in the groups, at least one piece of hydrogen may be replaced by fluorine, and $R^{17}$ may be hydrogen or fluorine;

ring $E^1$, ring $E^2$, ring $E^3$ and ring $E^4$ are independently 1,4-cyclohexylene, 1,4-cyclohexenylene, 1,4-phenylene, 1,4-phenylene in which at least one piece of hydrogen is replaced by fluorine, tetrahydropyran-2,5-diyl or decahydronaphthalene-2,6-diyl;

ring $E^5$ and ring $E^6$ are independently 1,4-cyclohexylene, 1,4-cyclohexenylene, 1,4-phenylene, tetrahydropyran-2,5-diyl or decahydronaphthalene-2,6-diyl;

$Z^{18}$, $Z^{19}$, $Z^{29}$ and $Z^{21}$ are independently a single bond, —COO—, —OCO—, —$CH_2O$—, —$OCH_2$—, —$CF_2O$—, —$OCF_2$—, —$CH_2CH_2$—, —$CF_2OCH_2CH_2$— or —$OCF_2CH_2CH_2$—;

$L^{15}$ and $L^{16}$ are independently fluorine or chlorine;

$S^{11}$ is hydrogen or methyl;

X is —CHF— or —$CF_2$—; and j, k, m, n, p, q, r and s are independently 0 or 1, a sum of k, m, n and p is 1 or 2, a sum of q, r and s is 0, 1, 2 or 3, and t is 1, 2 or 3.

Item 16. A liquid crystal display device, including the liquid crystal composition according to any one of items 11 to 15.

Compound (1) will be first described, and then a synthesis method, the liquid crystal composition and the liquid crystal display device will be described in the order.

Compound (1) has the following structure:

Formula 9

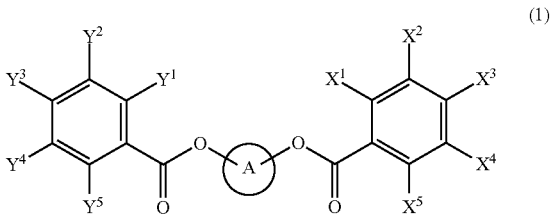 (1)

wherein, in formula (1), ring A is naphthylene, phenantolylene or anthracenylene, and in the groups, at least one piece of hydrogen may be replaced by halogen, —$CH_3$, —$C_2H_5$, —$CF_3$, —$CHF_2$, —$CH_2F$, —$OCF_3$, —$OCHF_2$ or —$OCH_2F$; and $X^1$, $X^2$, $X^3$, $X^4$, $X^5$, $Y^1$, $Y^2$, $Y^3$, $Y^4$ and $Y^5$ are independently hydrogen or fluorine, but at least two or more of $X^1$, $X^2$, $X^3$, $X^4$, $X^5$, $Y^1$, $Y^2$, $Y^3$, $Y^4$ and $Y^5$ is fluorine.

Compound (1) has the structure described above, and thus exhibits ferroelectricity in a nematic phase, and simultaneously contributes to development of biaxiality. Then, a device containing compound (1) exhibits a high-speed response during applying voltage.

In formula (1), ring A is naphthylene, phenantolylene or anthracenylene, and in the groups, at least one piece of hydrogen is preferably a group that may be replaced by fluorine, —CH$_3$ or —CF$_3$.

The compound represented by formula (1) is preferably represented by any one of formula (1-1) to formula (1-12):

Formula 10

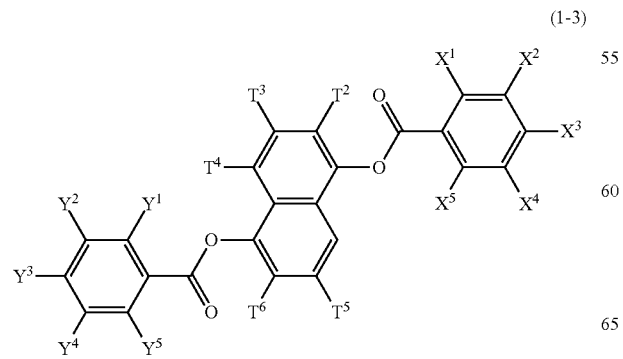
(1-1)

(1-2)

(1-3)

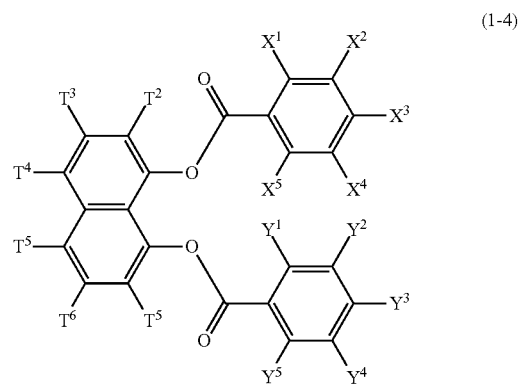
(1-4)

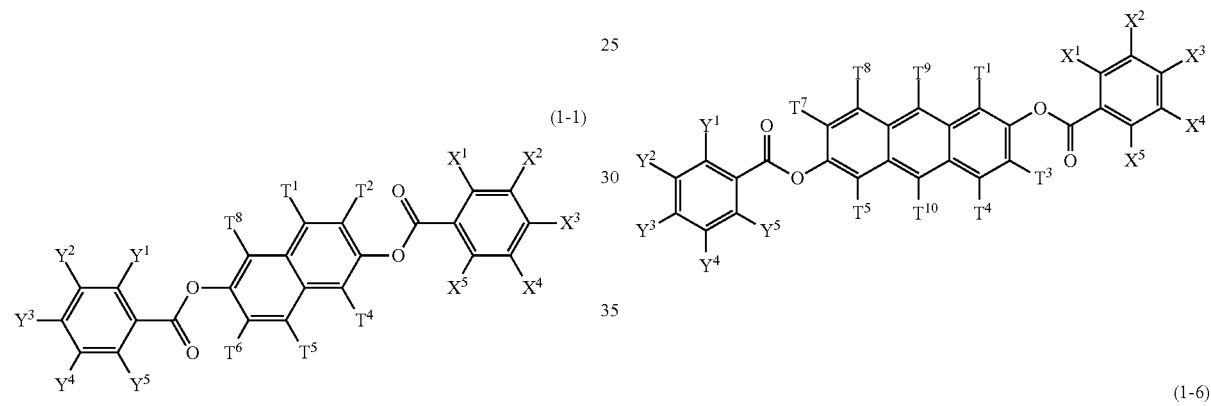
(1-5)

(1-6)

(1-7)

(1-8)
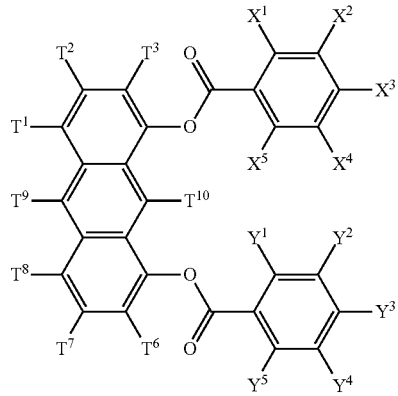

(1-9)
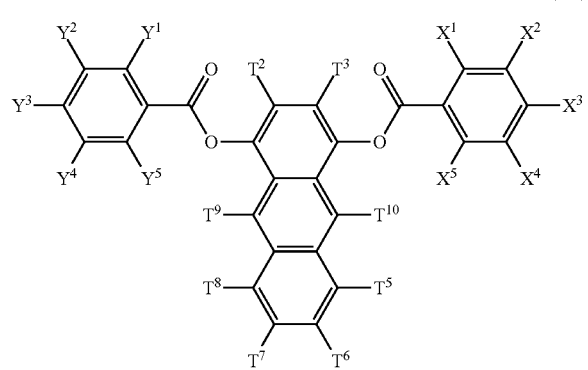

(1-10)
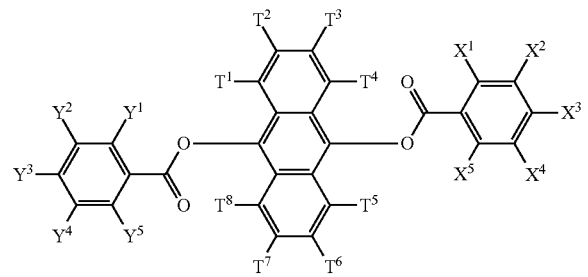

(1-11)
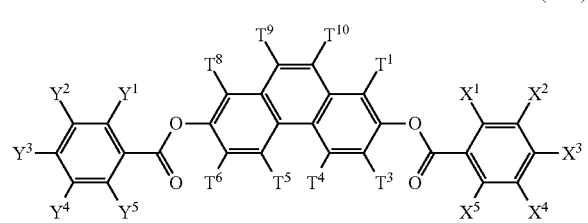

(1-12)
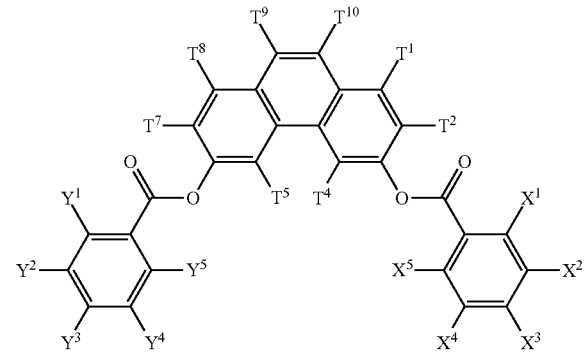

wherein, in formula (1-1) to formula (1-12), $T^1$, $T^2$, $T^3$, $T^4$, $T^5$, $T^6$, $T^7$, $T^8$, $T^9$ and $T^{10}$ are hydrogen, halogen, —$CH_3$, —$C_2H_5$, —$CF_3$, —$CHF_2$, —$CH_2F$, —$OCF_3$, —$OCHF_2$ or —$OCH_2F$; and $X^1$, $X^2$, $X^3$, $X^4$, $X^5$, $Y^1$, $Y^2$, $Y^3$, $Y^4$ and $Y^5$ are independently hydrogen or fluorine, but at least two or more of $X^1$, $X^2$, $X^3$, $X^4$, $X^5$, $Y^1$, $Y^2$, $Y^3$, $Y^4$ and $Y^5$ is fluorine.

The compound in which $T^1$, $T^2$, $T^3$, $T^4$, $T^5$, $T^6$, $T^7$, $T^8$, $T^9$ and $T^{10}$ are hydrogen, fluorine or —$CH_3$ in formula (1-1) to formula (1-12) described above cause reduction of a liquid crystal phase transition temperature, and improvement in compatibility with other liquid crystals, and therefore such a case is preferred.

The compound in which $X^2$, $X^3$, $Y^2$ and $Y^3$ are fluorine in formula (1-1) to formula (1-12) causes development of a biaxial nematic phase having low transition temperature, and therefore such a case is preferred.

The compound being represented by any one of formula (1-1), formula (1-2), formula (1-5), formula (1-6), formula (1-11) and formula (1-12) in formula (1-1) to formula (1-12) described above causes development of the liquid crystal phase in a moderate temperature region, and therefore such a case is preferred.

The compound being represented by any one of formula (1-3), formula (1-4), formula (1-7), formula (1-8), formula (1-9) or formula (1-10) in formula (1-1) to formula (1-12) described above causes generation of a large birefringence change in an electrooptical response, and therefore such a case is preferred.

The compound being represented by any one of formula (1-1-A), formula (1-2-A), formula (1-5-A), formula (1-6-A), formula (1-11-A) and formula (1-12-A) described below in formula (1-1) to formula (1-12) described above causes development of the liquid crystal phase in a large temperature range, and therefore such a case is preferred.

Formula 11

(1-1-A)
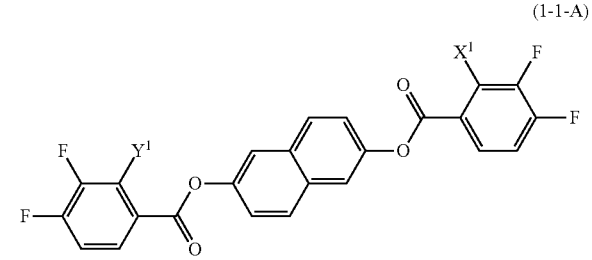

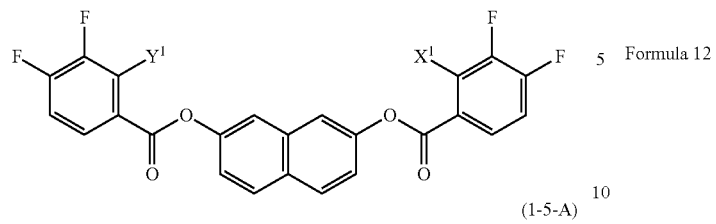

wherein, in formula (1-1-A), formula (1-2-A), formula (1-5-A), formula (1-6-A), formula (1-11-A) and formula (1-12-A), X¹ and Y¹ are independently hydrogen or fluorine.

Both X¹ and Y¹ being hydrogen in formula (1-1-A), formula (1-2-A), formula (1-5-A), formula (1-6-A), formula (1-11-A) and formula (1-12-A) described above causes development of the biaxial nematic phase, and therefore such a case is preferred.

The compound being represented by formula (1-1-A) and formula (1-2-A) in formula (1-1-A), formula (1-2-A), formula (1-5-A), formula (1-6-A), formula (1-11-A) and formula (1-12-A) described above causes development of the liquid crystal phase, and therefore such a case is preferred.

Compounds exemplified below can be prepared with reference to a section of Synthesis Method of compound (1) described below, and a method described in Synthesis Example 1 in Examples described below.

(No. 6)
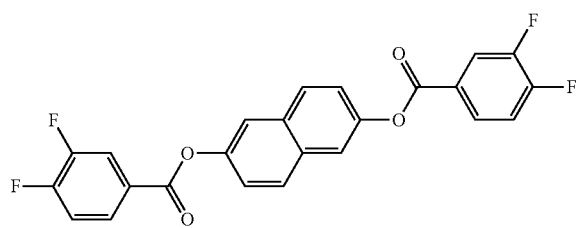
Cr 185.1 N 206.1 Iso (° C.)
(No. 7)
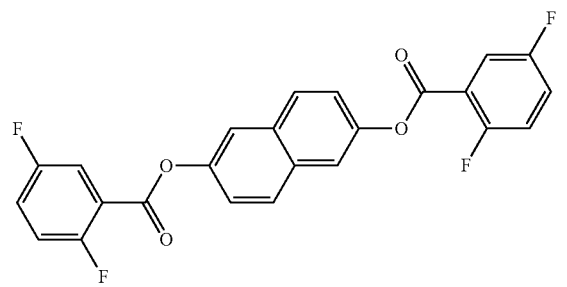
(No. 8)
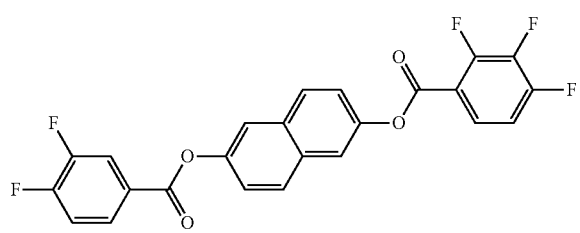
(No. 9)
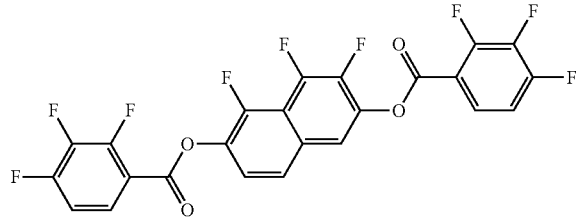
(No. 10)
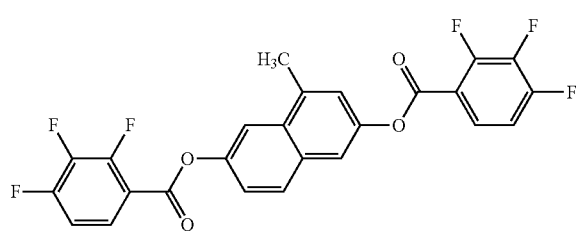
(No. 11)
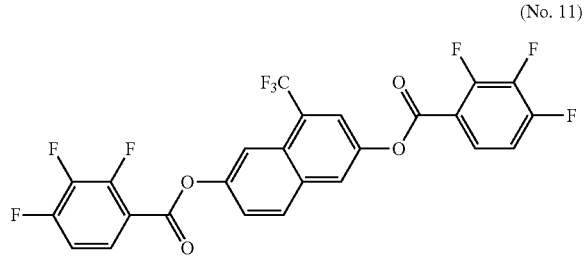
(No. 12)
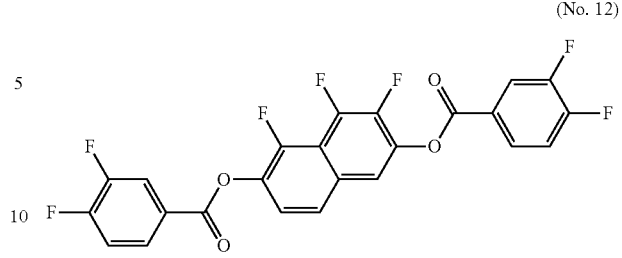
(No. 13)
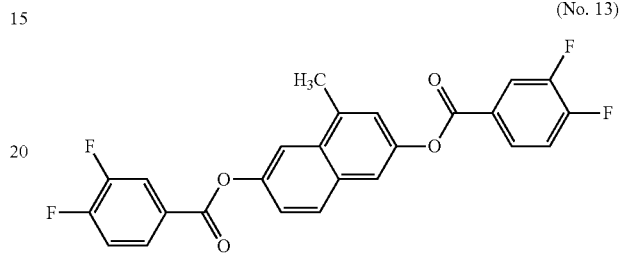
(No. 14)
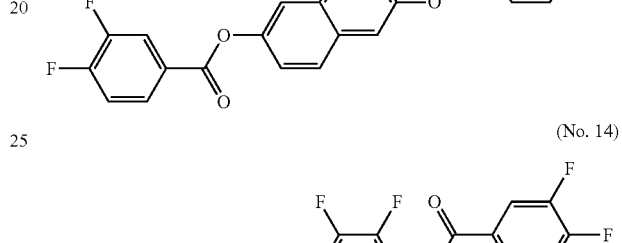
(No. 15)
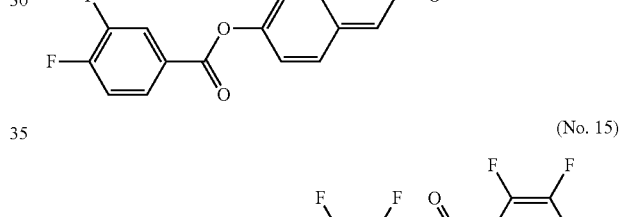
(No. 16)
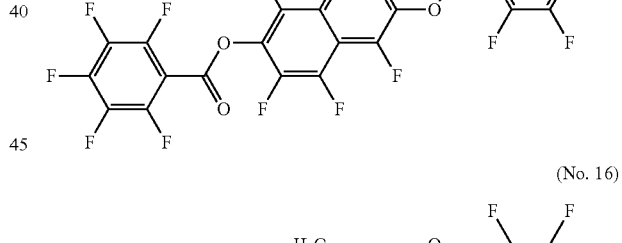
Formula 13
(No. 17)
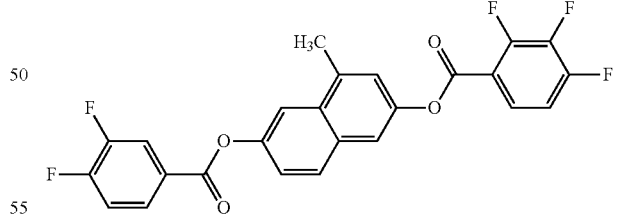
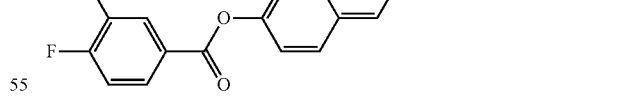

(No. 18)
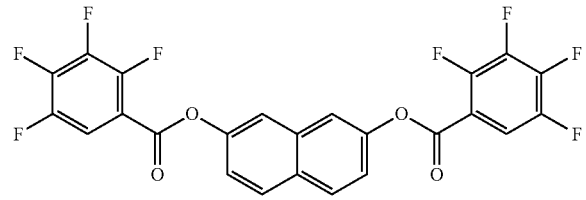
(No. 19)
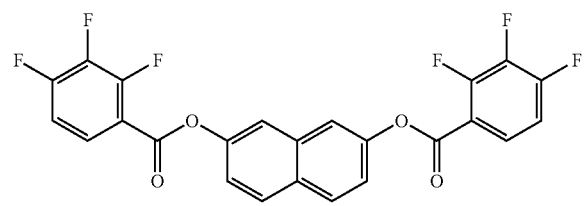
(No. 20)
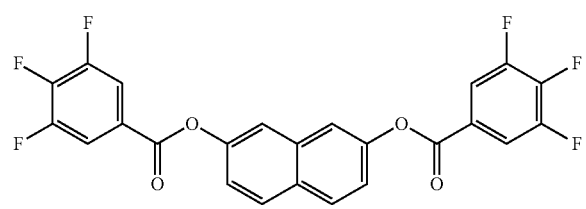
(No. 21)
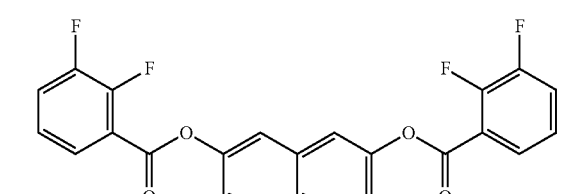
(No. 22)
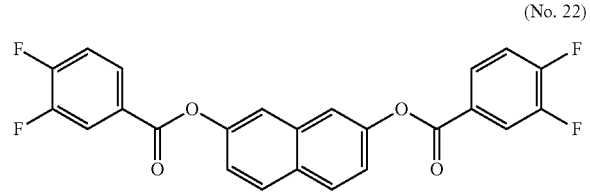
(No. 23)
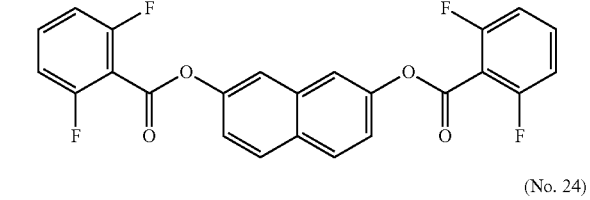
(No. 24)
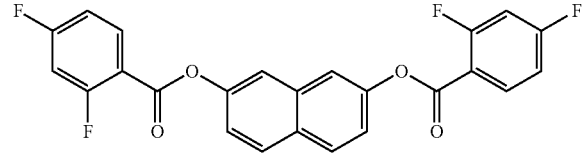
(No. 25)
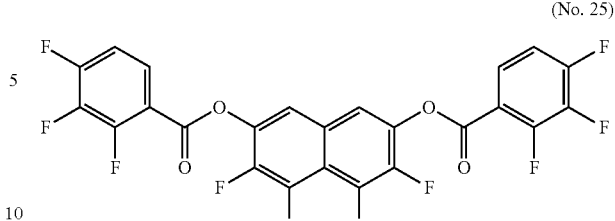
(No. 26)
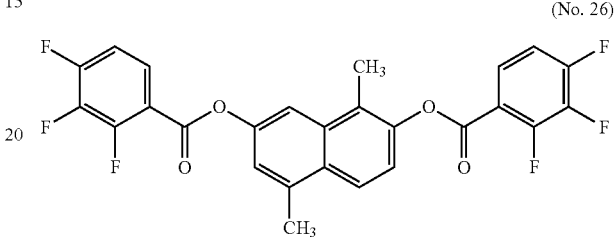
(No. 27)
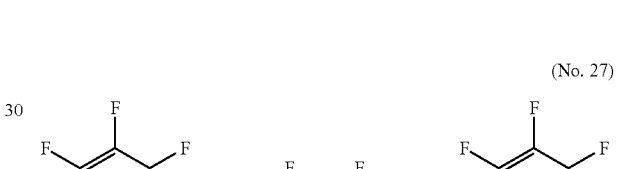
(No. 28)
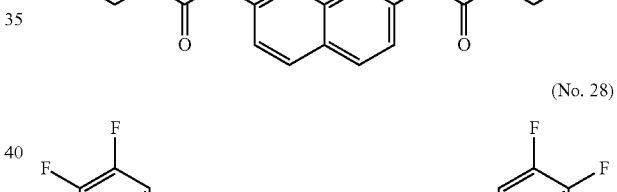
(No. 29)
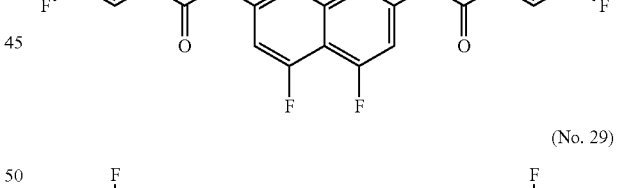
(No. 30)
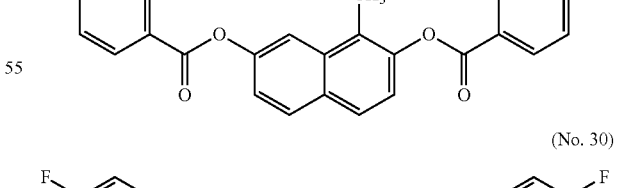
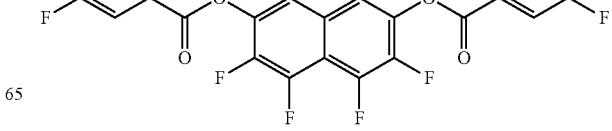

-continued
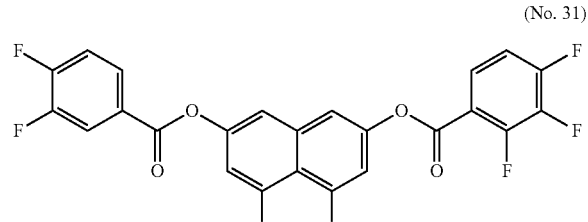
(No. 31)
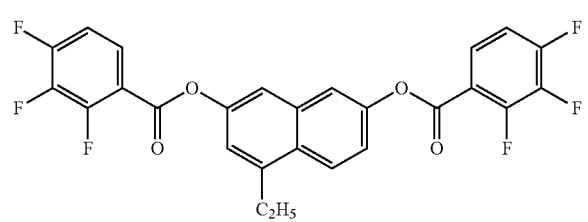
(No. 32)
Formula 14
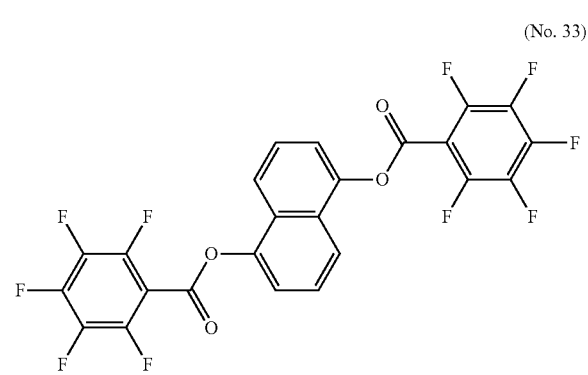
(No. 33)
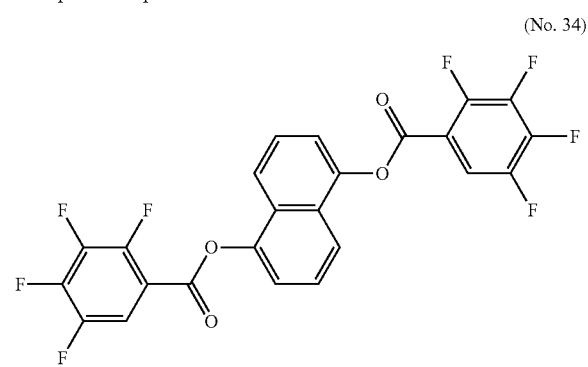
(No. 34)
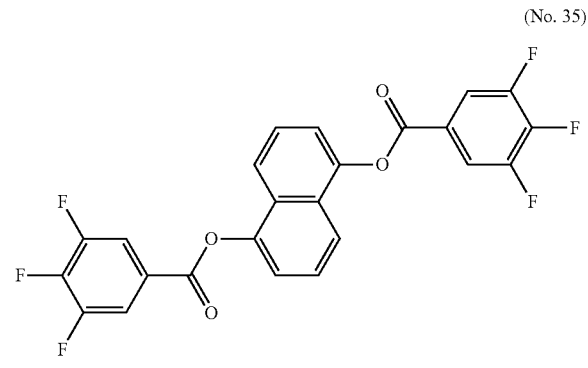
(No. 35)
-continued
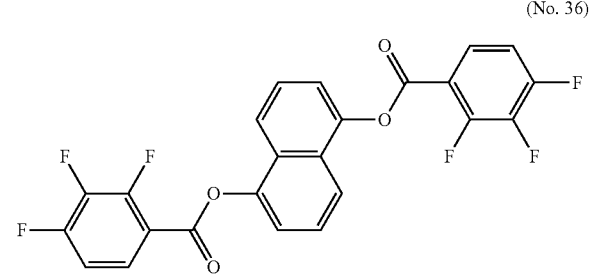
(No. 36)
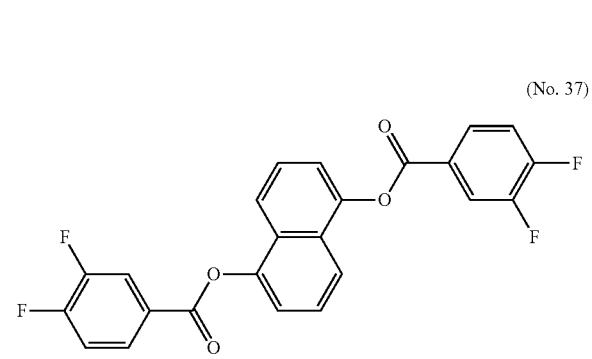
(No. 37)
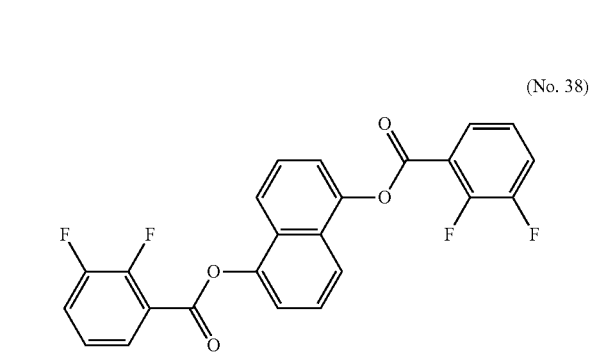
(No. 38)
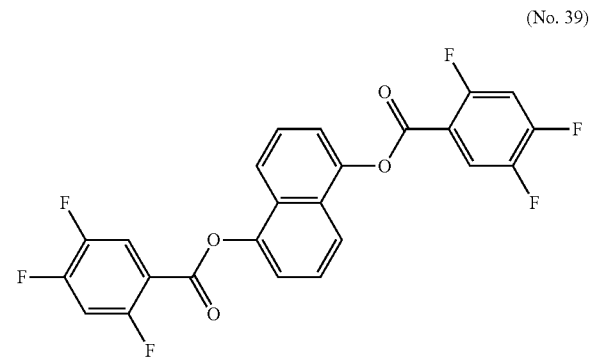
(No. 39)
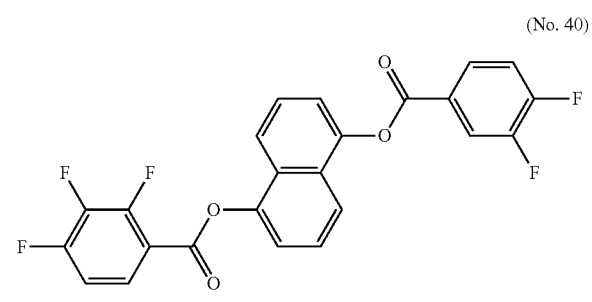
(No. 40)

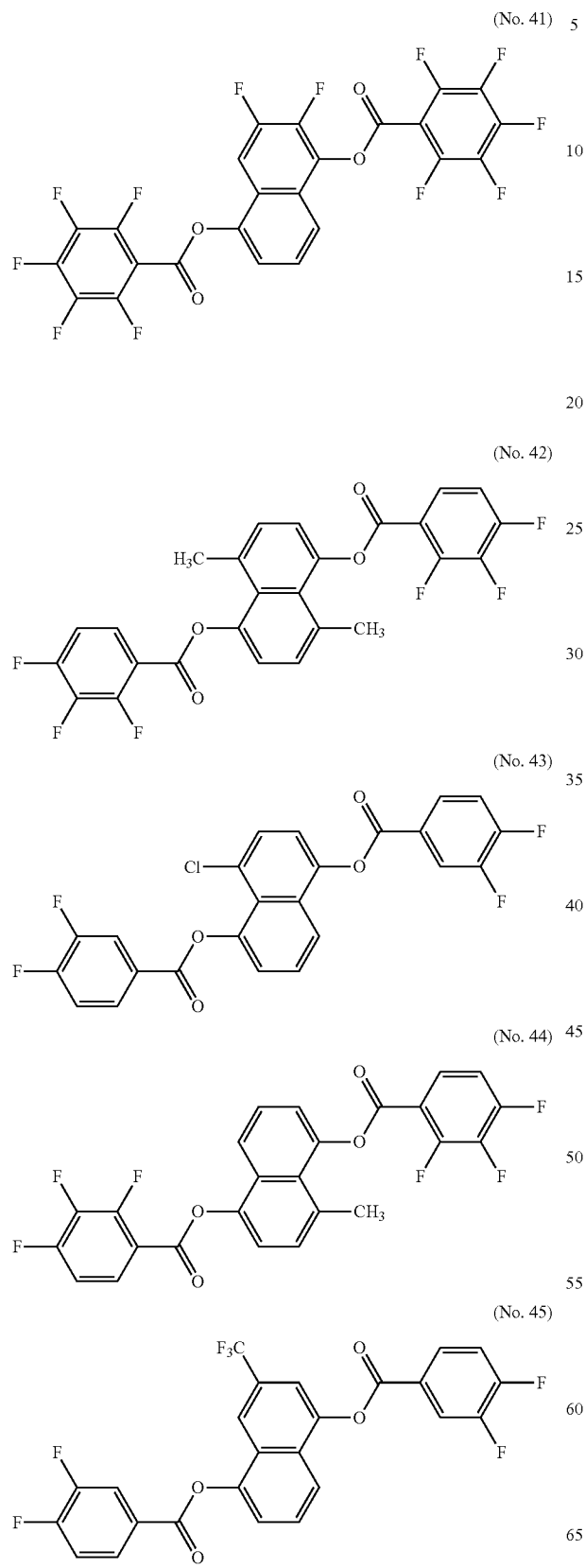
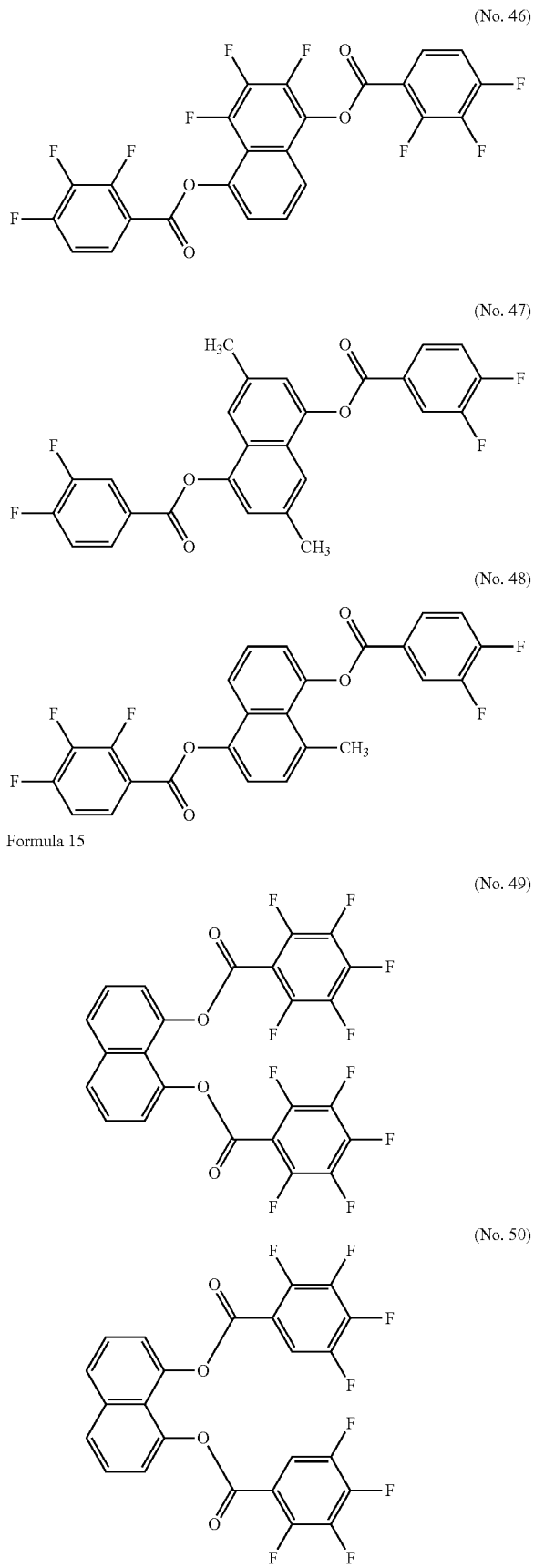
Formula 15

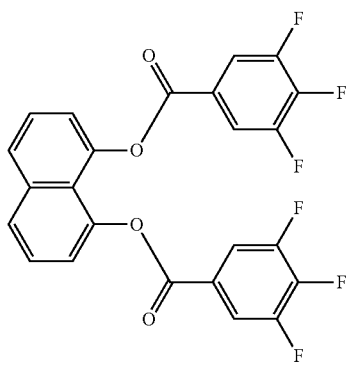
(No. 51)
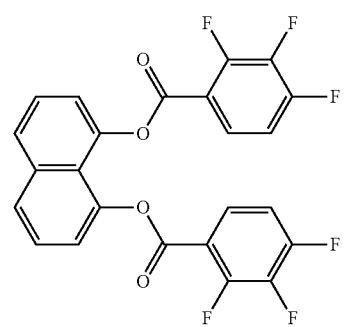
(No. 52)
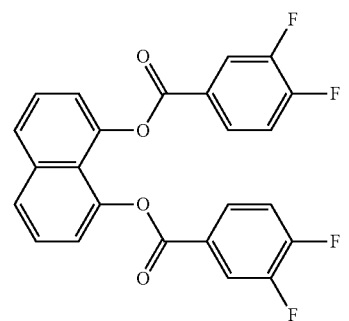
(No. 53)
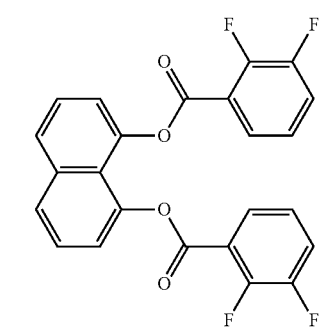
(No. 54)
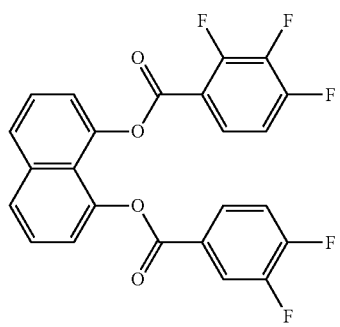
(No. 55)
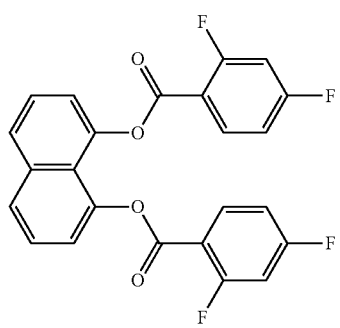
(No. 56)
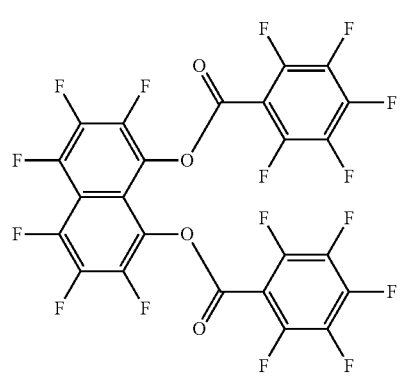
(No. 57)
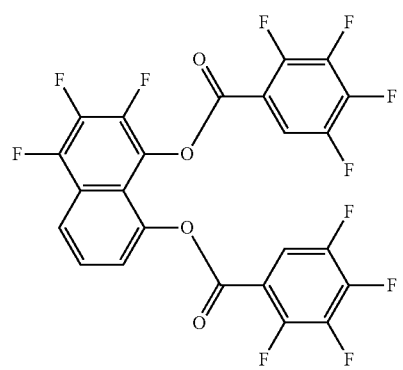
(No. 58)

(No. 59)
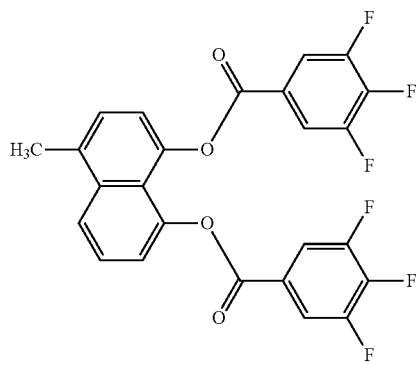
(No. 60)
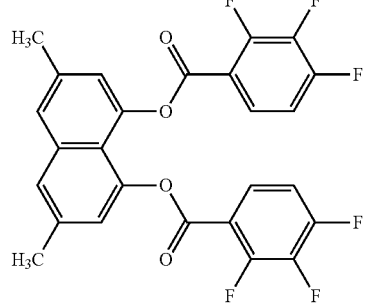
(No. 61)
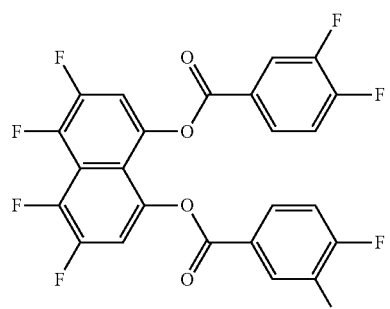
(No. 62)
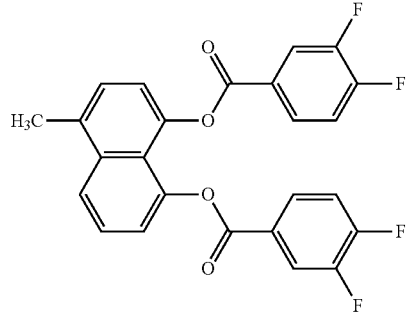
(No. 63)
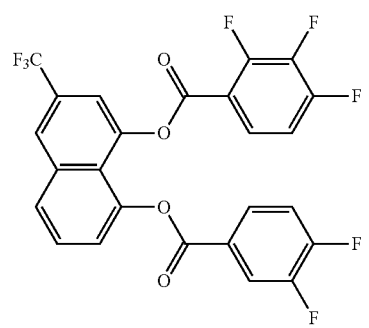
(No. 64)
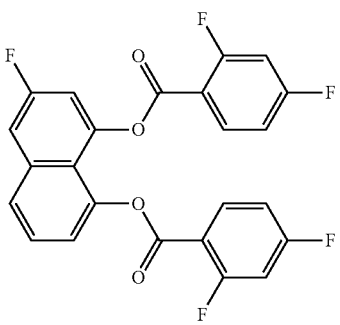
Formula 16
(No. 65)
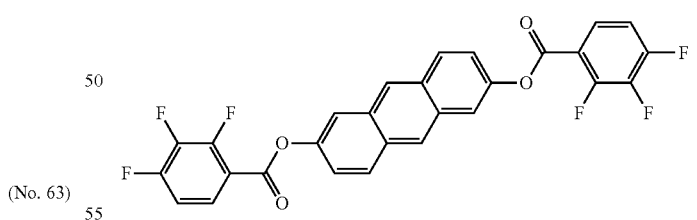
(No. 66)
(No. 67)
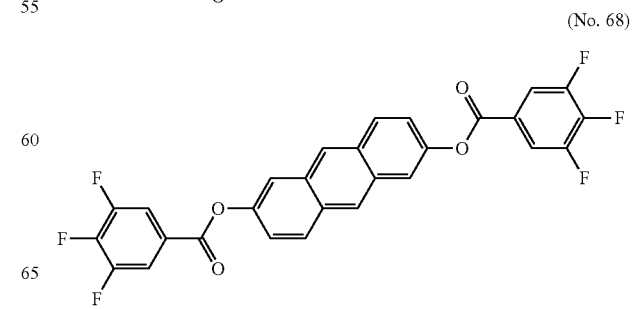
(No. 68)

(No. 69)
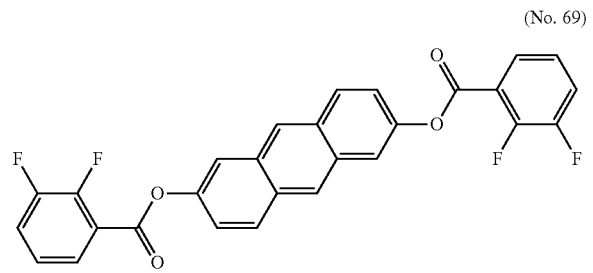
(No. 70)
(No. 71)
(No. 72)
(No. 73)
(No. 74)
(No. 75)
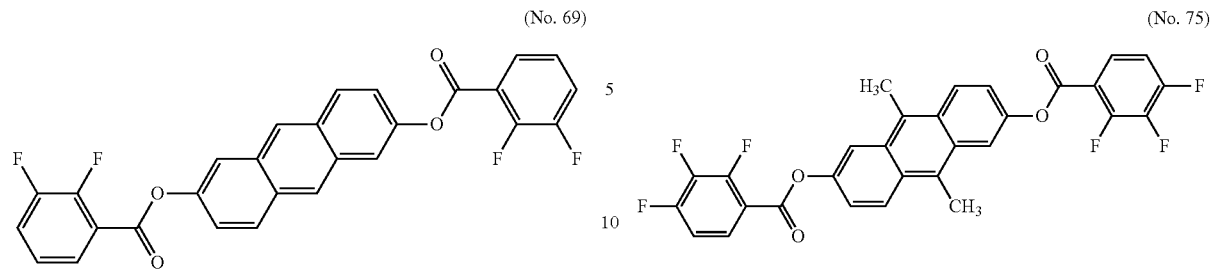
(No. 76)
(No. 77)
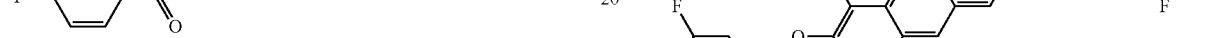
(No. 78)
(No. 79)
(No. 80)
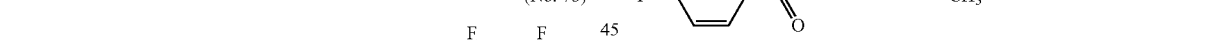

Formula 17
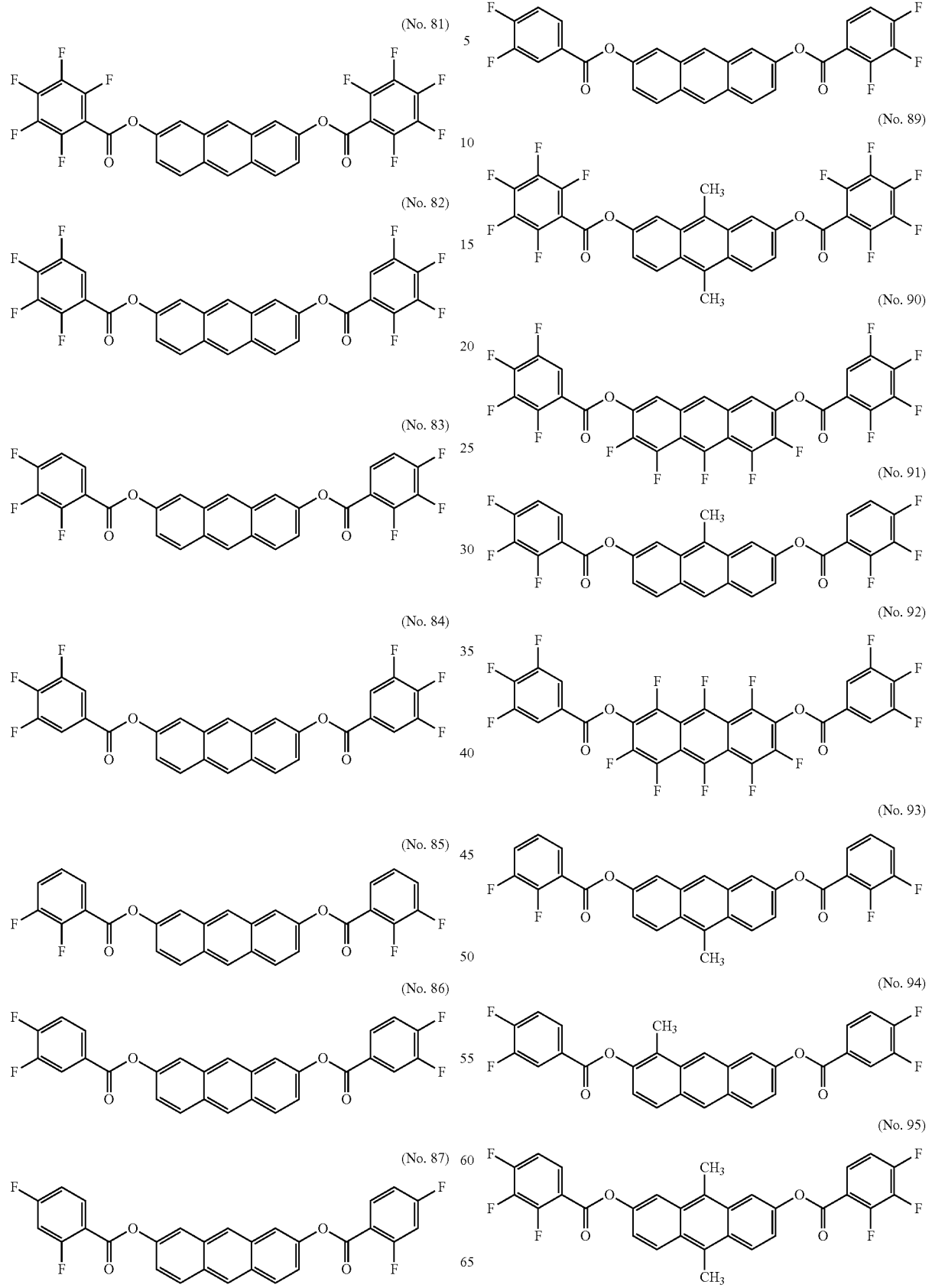

(No. 96)
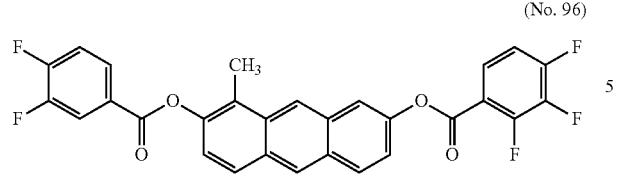
Formula 18
(No. 97)
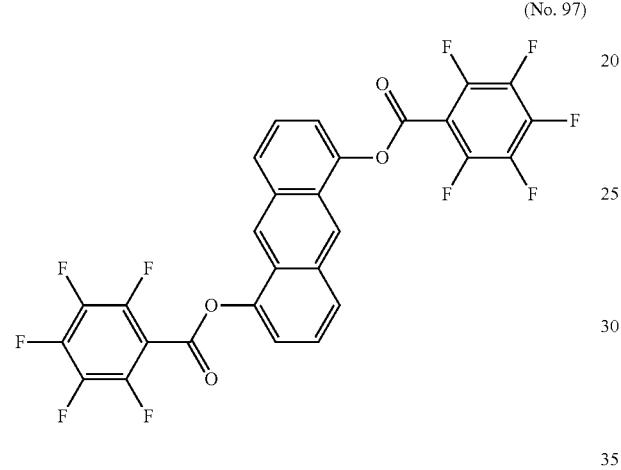
(No. 98)
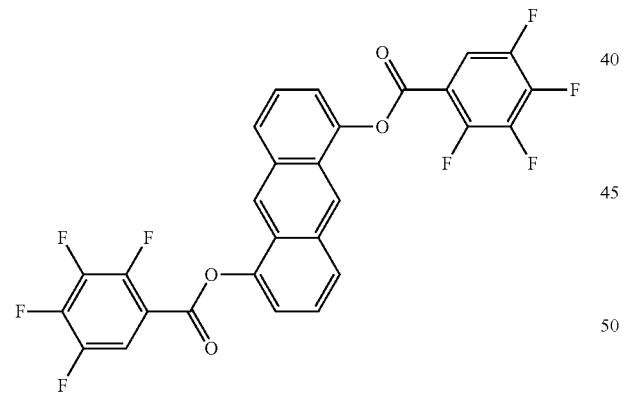
(No. 99)
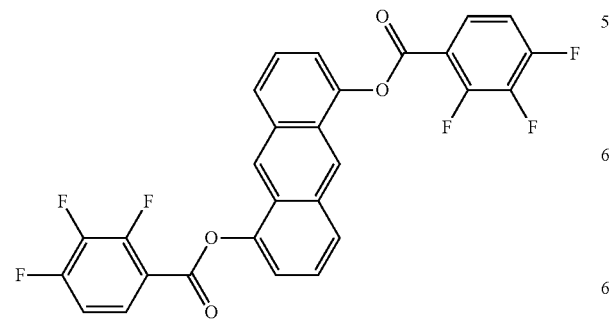
(No. 100)
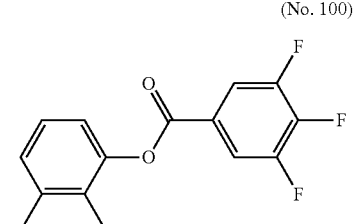
(No. 101)
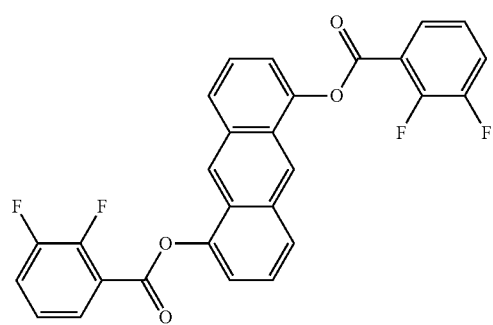
(No. 102)
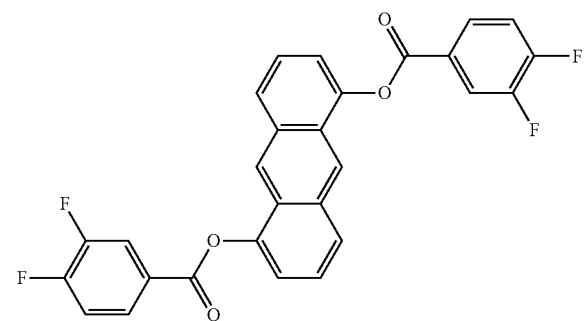
(No. 103)
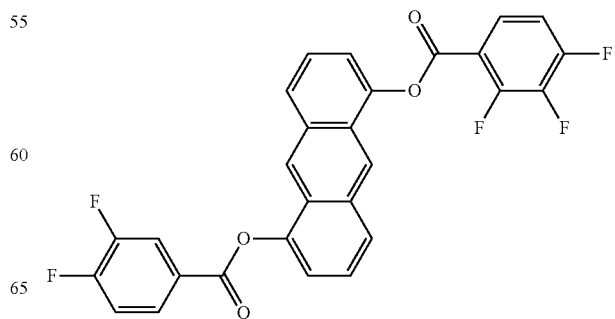

(No. 104)
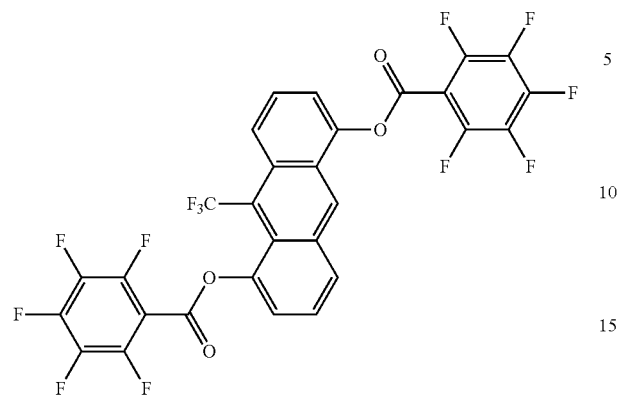
(No. 105)
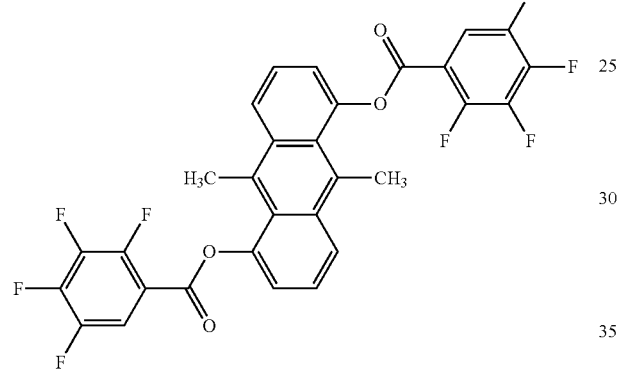
(No. 106)
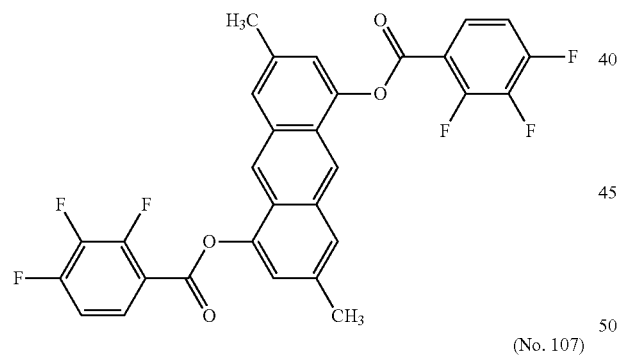
(No. 107)
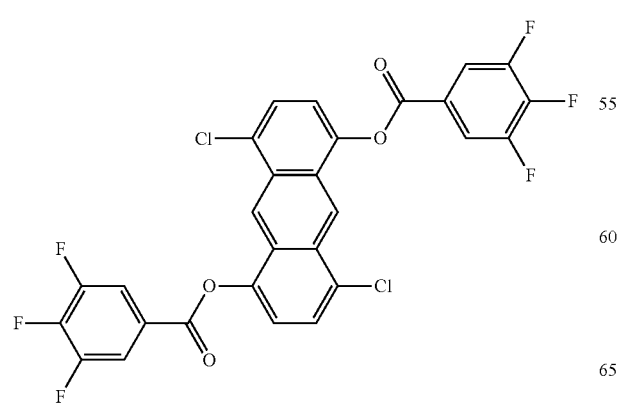
(No. 108)
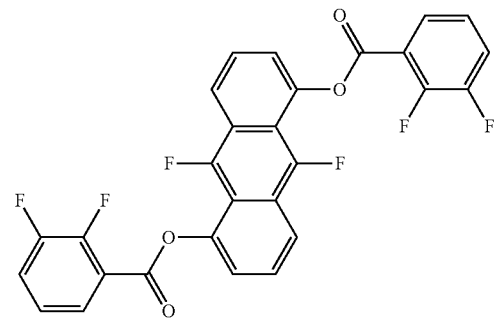
(No. 109)
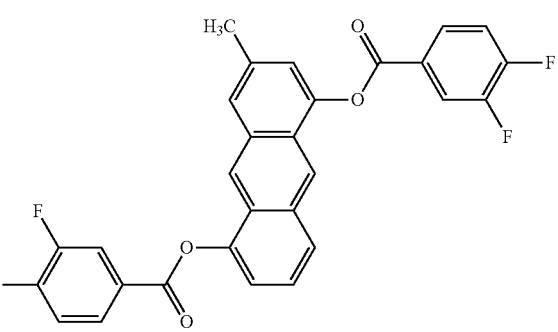
(No. 110)
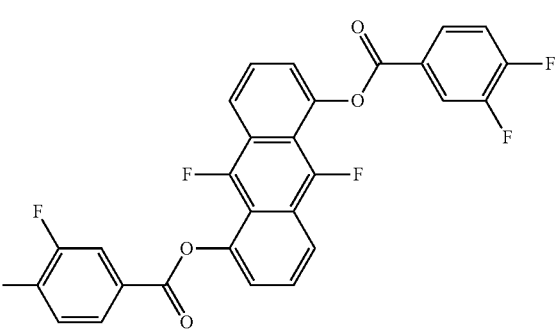
Formula 19
(No. 111)
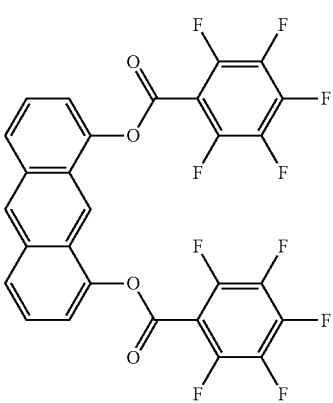

(No. 112) 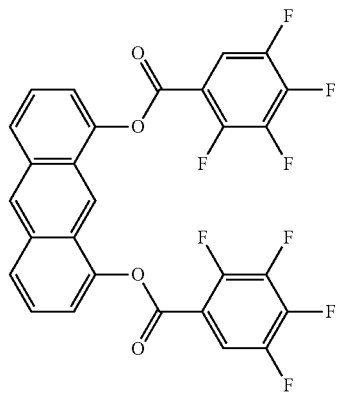
(No. 113) 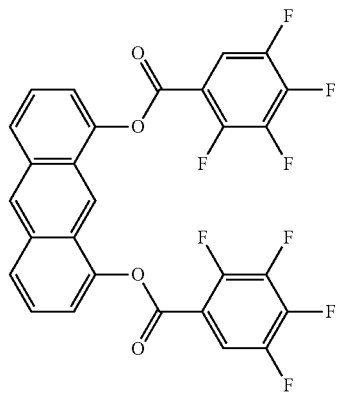
(No. 114) 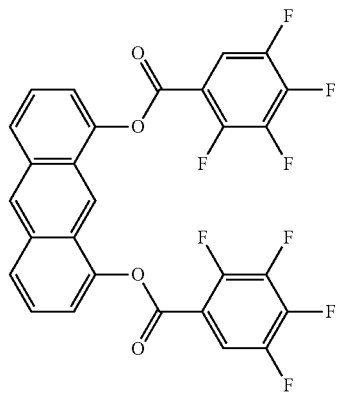
(No. 115) 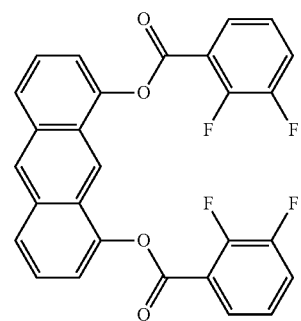
(No. 116) 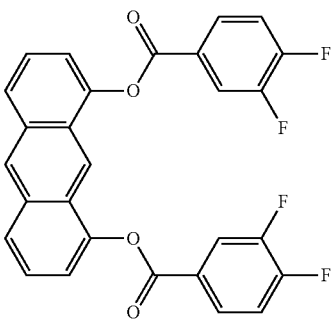
(No. 117) 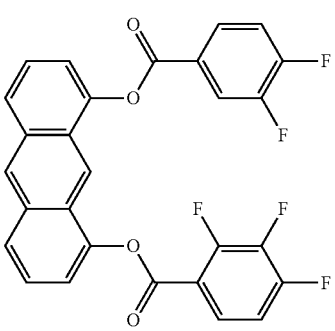
(No. 118) 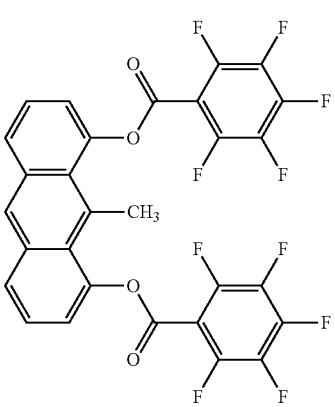
(No. 119) 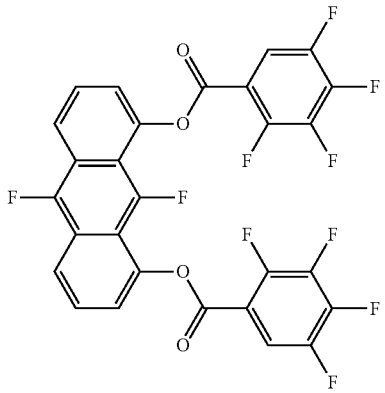

(No. 120) 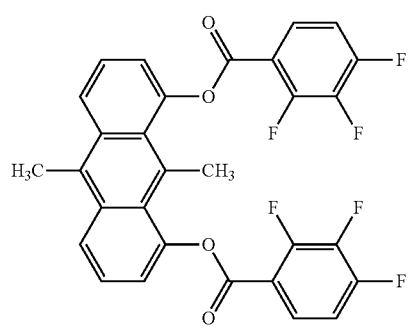
(No. 121) 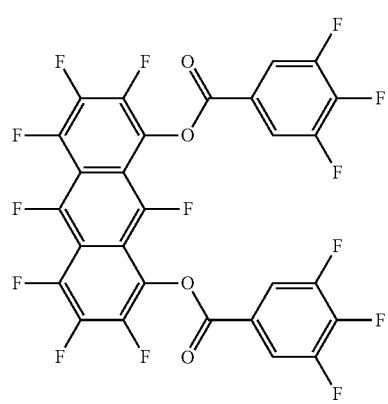
(No. 122) 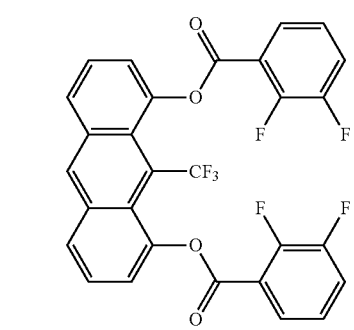
(No. 123) 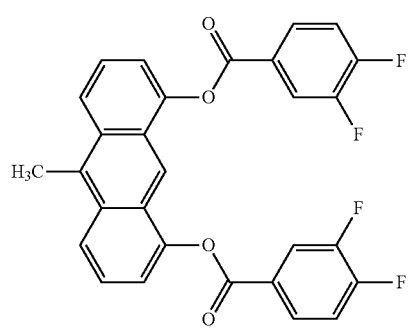
(No. 124) 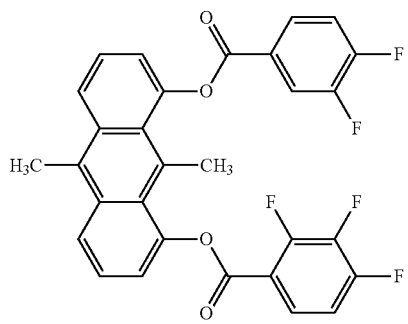
Formula 20
(No. 125) 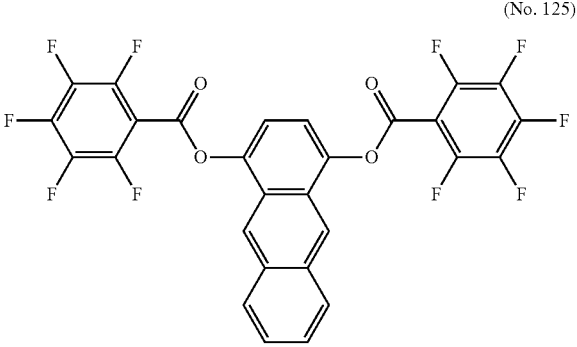
(No. 126) 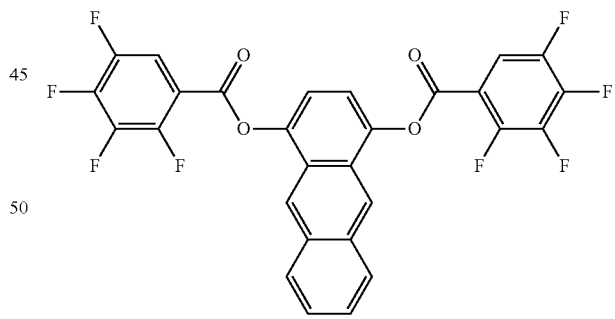
(No. 127) 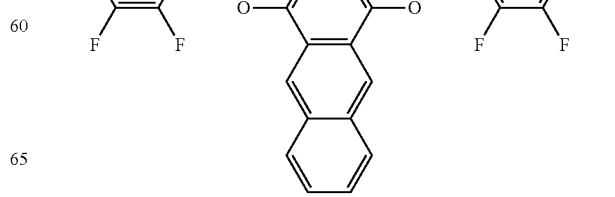

(No. 128)
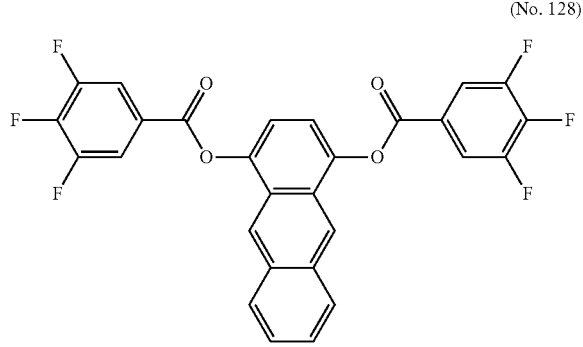
(No. 133)
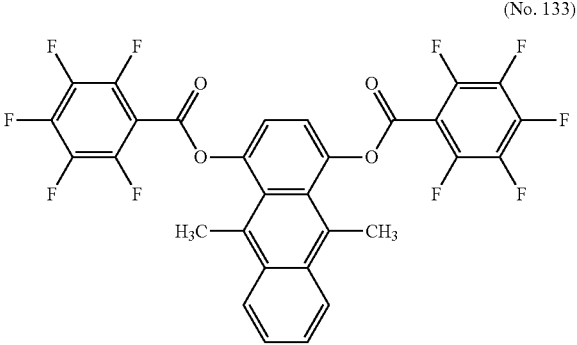
(No. 129)
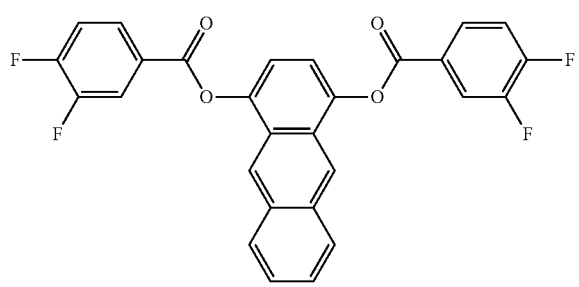
(No. 134)
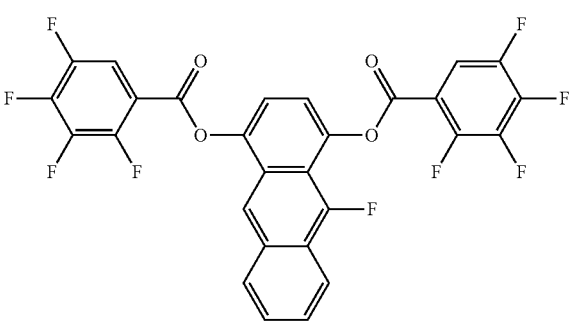
(No. 130)
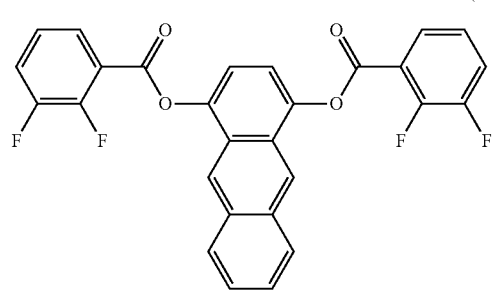
(No. 135)
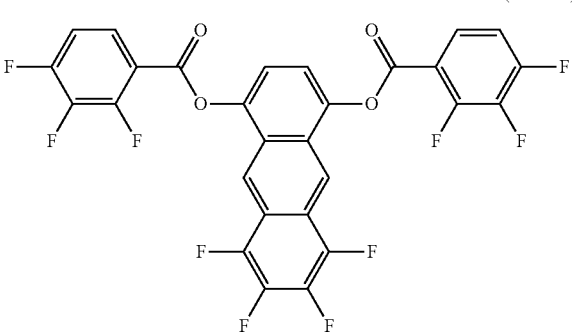
(No. 131)
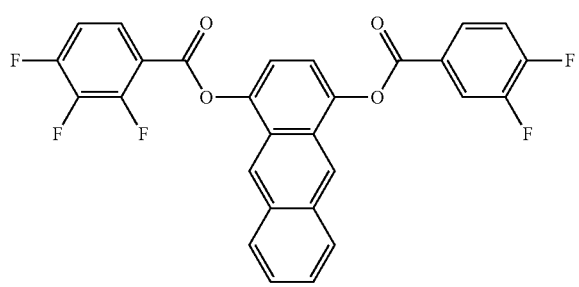
(No. 136)
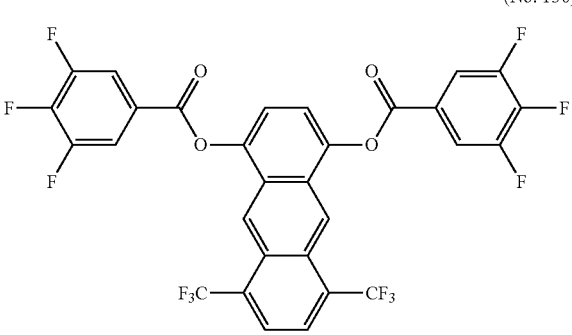
(No. 132)
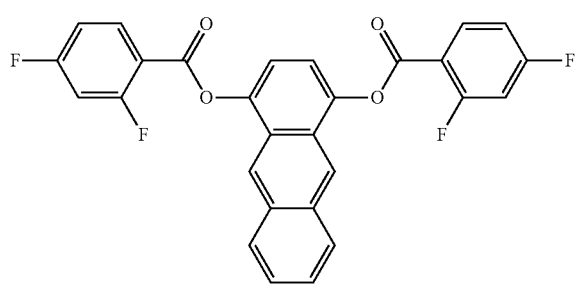
(No. 137)
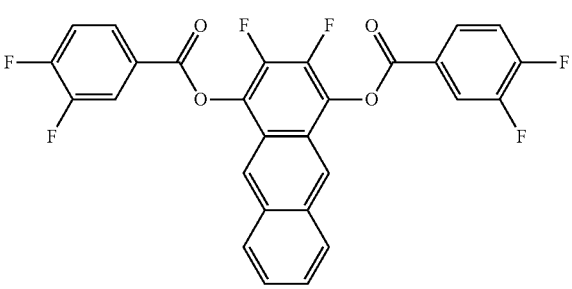

(No. 138) 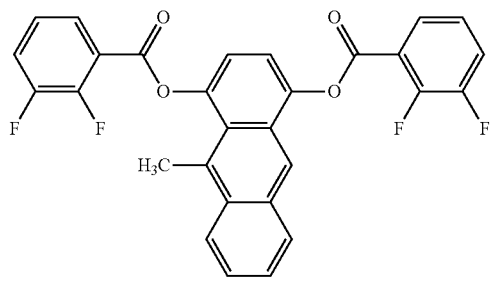
(No. 143) 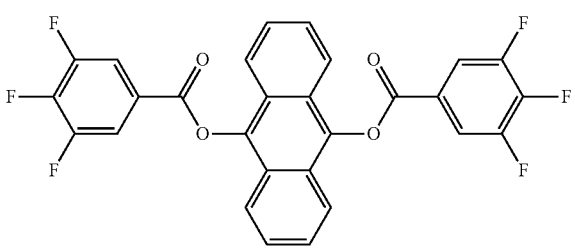
(No. 139) 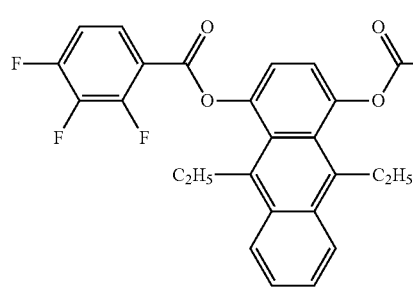
(No. 144) 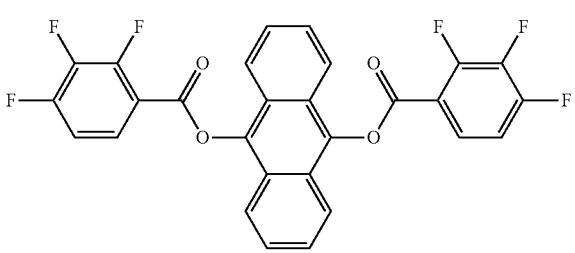
(No. 145) 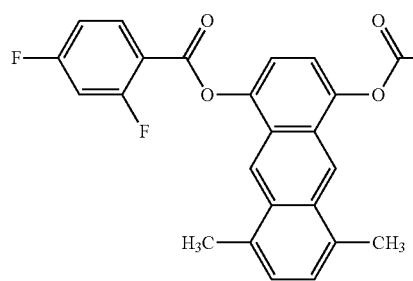
(No. 140) 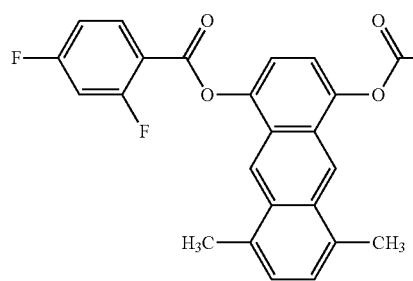
Formula 21
(No. 141) 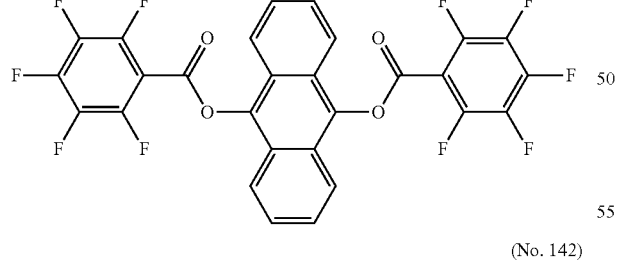
(No. 146) 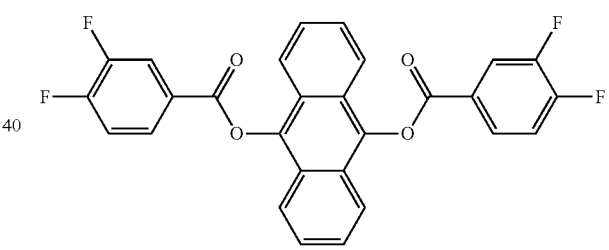
(No. 147) 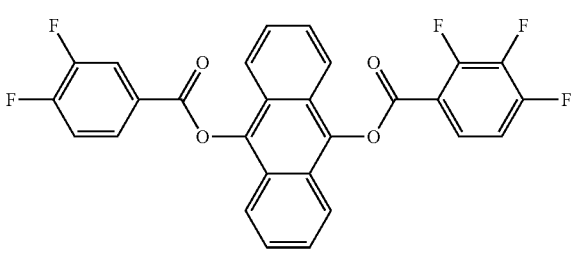
(No. 142) 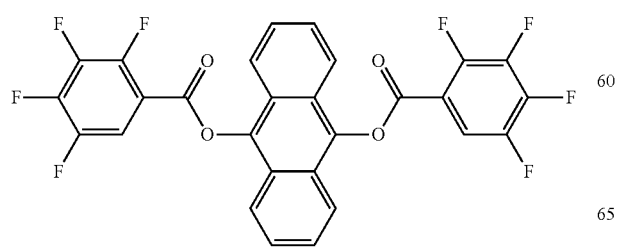
(No. 148) 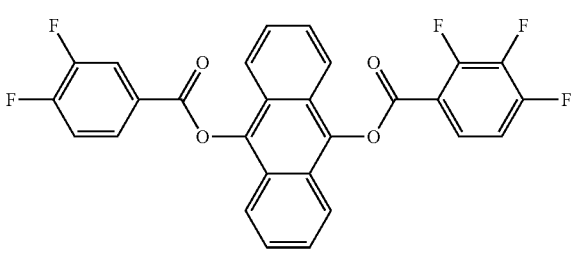

-continued
(No. 149)
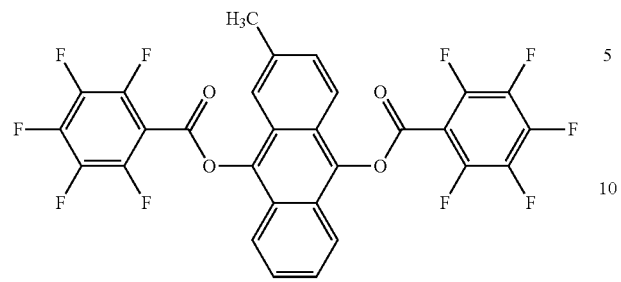
(No. 150)
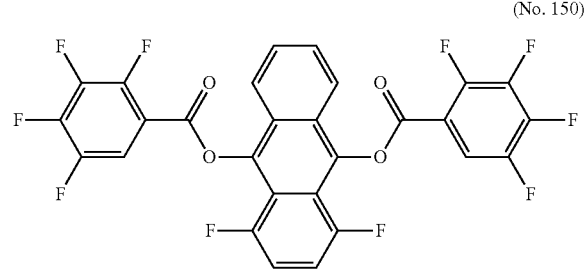
(No. 151)
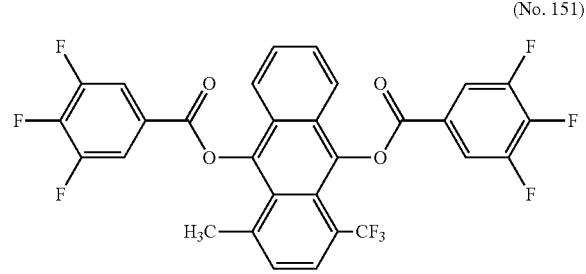
(No. 152)
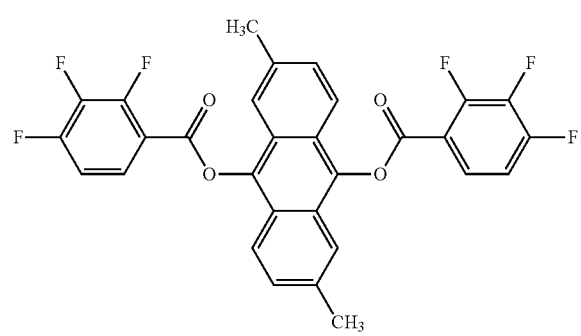
(No. 153)
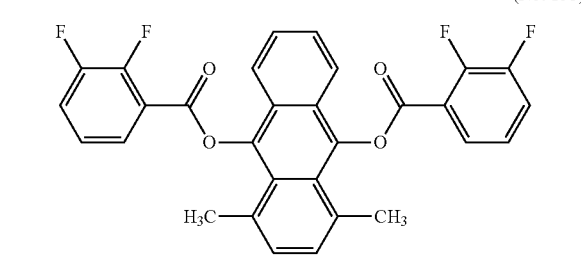
-continued
(No. 154)
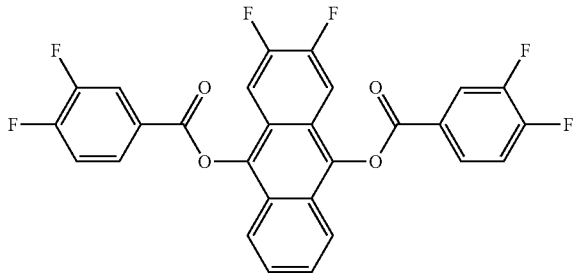
(No. 155)
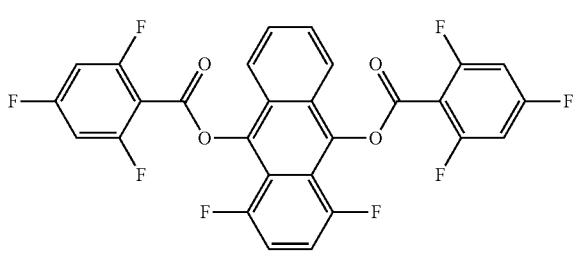
(No. 156)
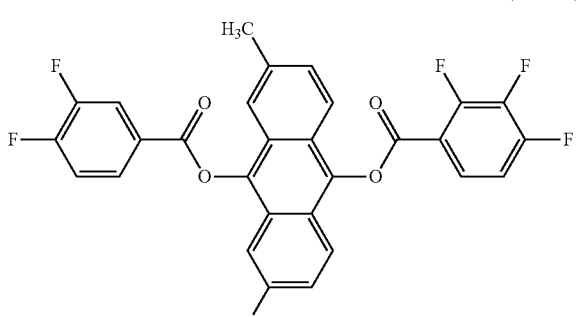
Formula 22
(No. 157)
(No. 158)
(No. 159)
(No. 160)
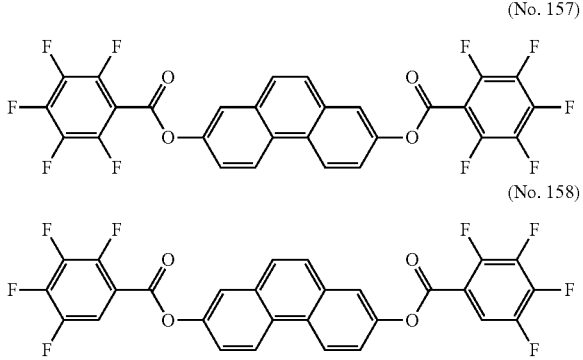
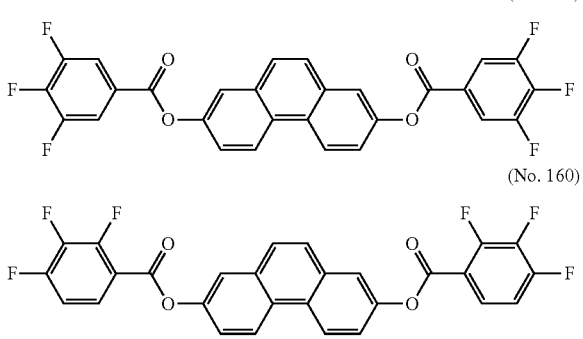

(No. 161) (No. 162) (No. 163) (No. 164) (No. 165) (No. 166) (No. 167) (No. 168) (No. 169) (No. 170) (No. 171) (No. 172)

Formula 23

(No. 173) (No. 174) (No. 175)

(No. 176)
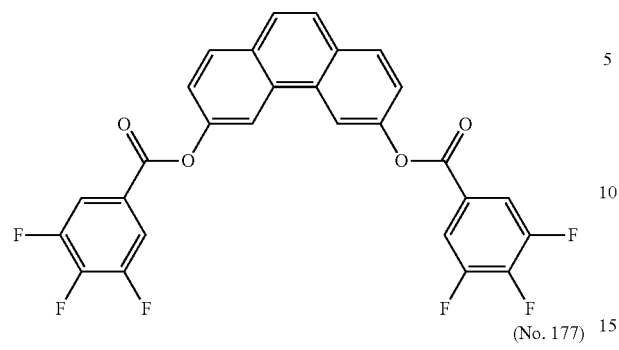
(No. 181)
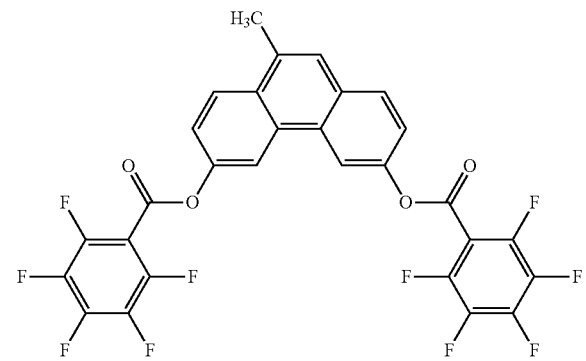
(No. 177)
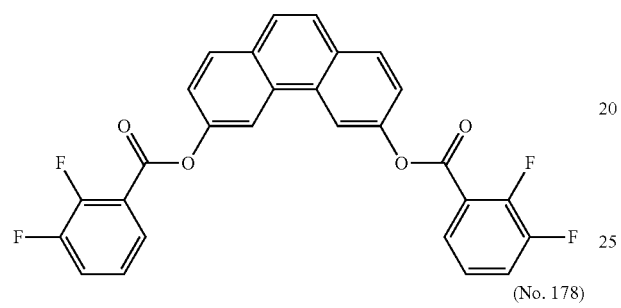
(No. 182)
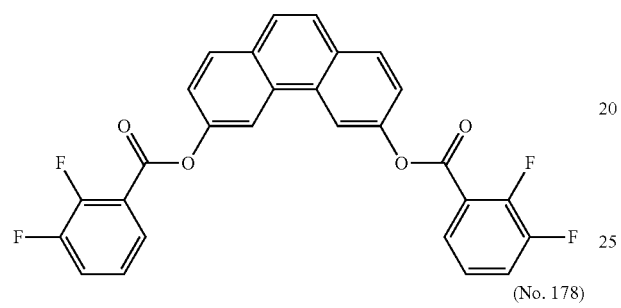
(No. 178)
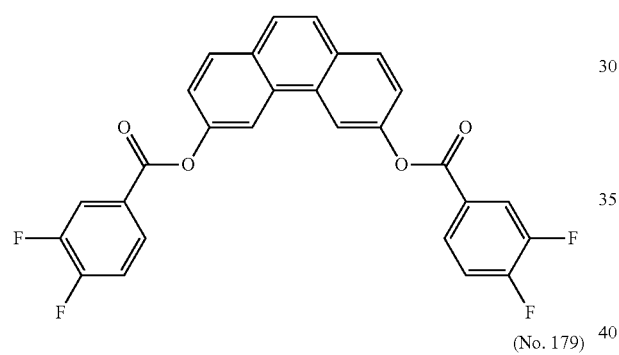
(No. 179)
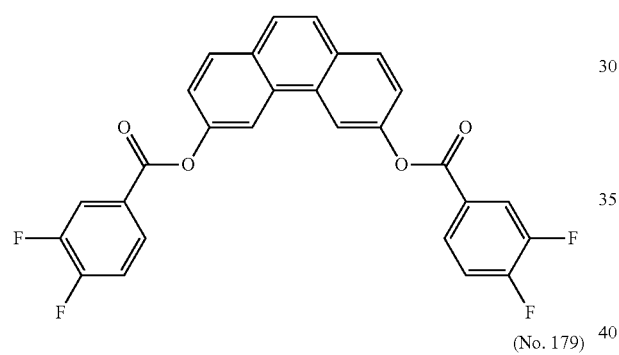
(No. 183)
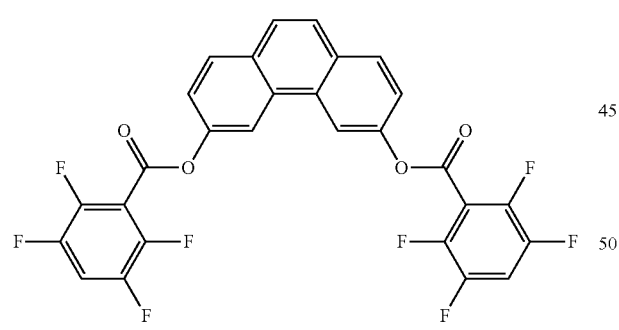
(No. 180)
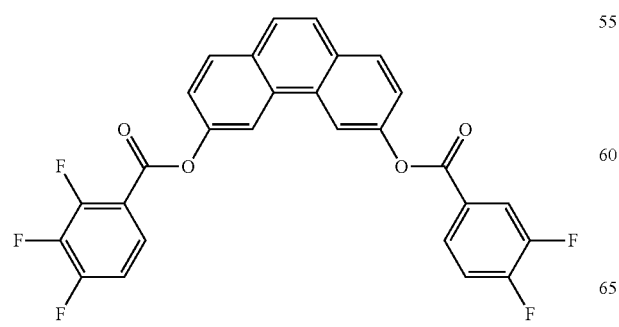
(No. 184)
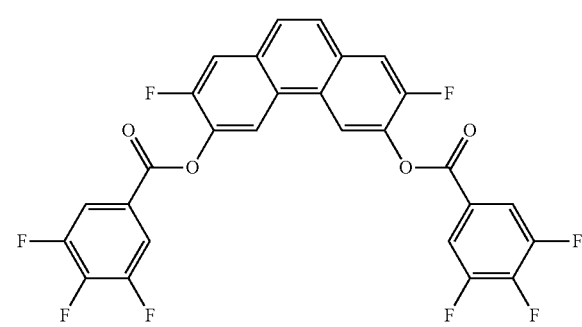

-continued

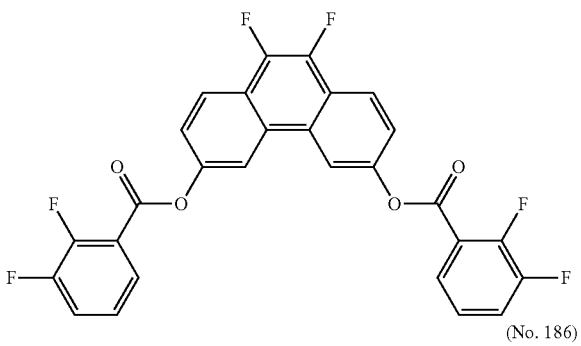

(No. 185)

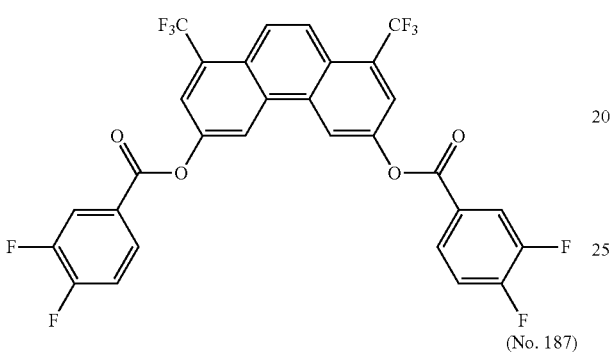

(No. 186)

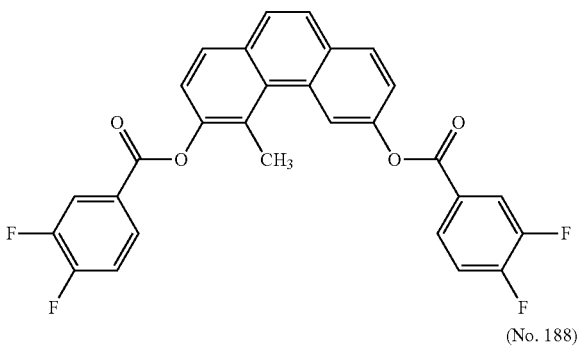

(No. 187)

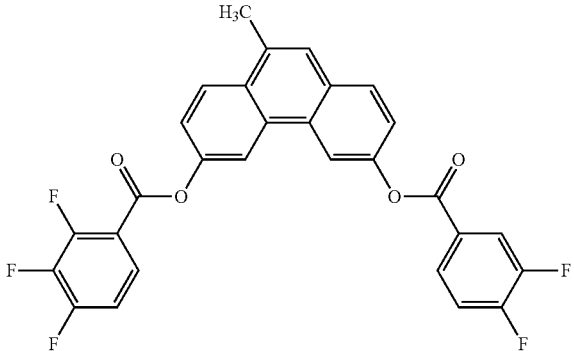

(No. 188)

2. Synthesis Method

Compound (1) can be prepared by suitably combining techniques in synthetic organic chemistry. Methods for introducing an objective terminal group, ring and bonding group into a starting material are described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.).

A compound represented by formula (1) is prepared, for example, using the starting materials (i) and (ii) described below:

Formula 24

wherein, in formula (i), ring A is naphthylene, phenantolylene or anthracenylene, and in the groups, at least one piece of hydrogen may be replaced by fluorine, —$CH_3$ or —$CF_3$.

Formula 25

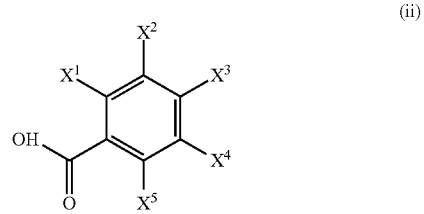

wherein, $X^1$, $X^2$, $X^3$, $X^4$ and $X^5$ are independently hydrogen or fluorine, but at least two or more of $X^1$, $X^2$, $X^3$, $X^4$ and $X^5$ is fluorine.

The compound represented by formula (i) is allowed to react with the compound represented by formula (ii) according to the following scheme to obtain compound (1) represented by formula (iii).

Formula 26

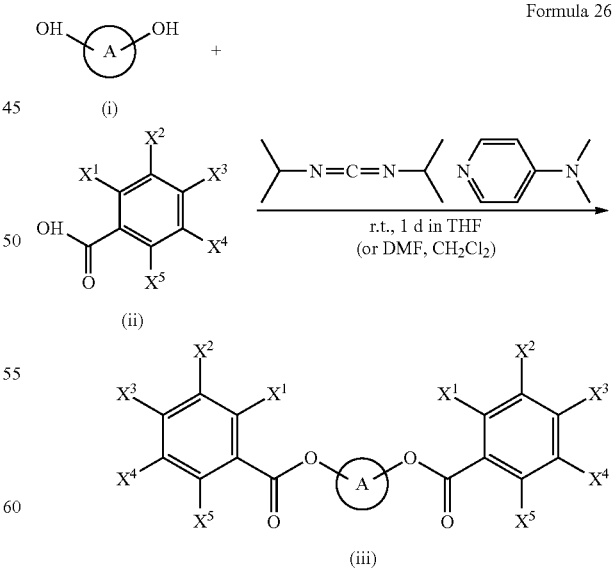

As the compound represented by formula (ii), not only one kind, but also the following compound having other substituents as substituents of $X^1$ to $X^5$ may be used.

Formula 27

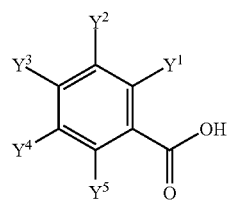

wherein, $Y^1$, $Y^2$, $Y^3$, $Y^4$ and $Y^5$ are independently hydrogen or fluorine, but at least two or more of $Y^1$, $Y^2$, $Y^3$, $Y^4$ and $Y^5$ is fluorine.

In the reaction described above, as a condensing agent, in addition to N,N-diisopropylcarbodiimide (DICP) exemplified in the formula described above, a carbodiimide condensing agent such as N,N-dicyclocarbodiimide (DCC), 1-[3-(dimethylamino)propyl]3-ethylcarbodiimide (EDC) and 1-ethyl-3-(3-dimethylaminopropyl)carbodiimide hydrochloride (EDC-HCl), an imidazole condensing agent such as N,N'-carbonyldiimidazole, and a phosphonium condensing agent such as 1H-benzotriazol-1-yloxytris(dimethylamino)phosphonium hexafluorophosphate can also be utilized.

Moreover, as a catalyst, 4-dimethylaminopyridine (DMAP), 1-hydroxybenzotriazole (HOBt), 1-hydroxy-7-azabenzotriazole (HOAt) and N-hydroxyimide succinate exemplified in the formula described above can also be utilized.

Specific examples of a mole ratio of the compound represented by formula (i) to the compound represented by formula (ii) upon the reaction include 1:2.5 to 1:0.5. In particular, asymmetrical compound (1) can be prepared by stepwise preparing the compound by adjusting a ratio of the compound represented by formula (ii). Specific example of reaction temperature include 0° C. to 110° C.

3. Liquid Crystal Composition

A composition of the invention is mainly used in a liquid crystal display device. The composition contains at least one of compound (1) as a first component. The composition may contain compounds (2) to (15) described above. The composition may contain any other liquid crystal compound different from compounds (2) to (15).

A preferred composition contains at least one of compound (1) as the first component, and at least one of compounds (2) to (4) as a second component. A third component is selected from compounds (5) to (15) based on a mode of the device. When the composition is used in a device having a mode such as an FFS mode and a PSA mode, compounds (5) to (7) are suitable for the third component. When the composition is used in a device having a mode such as a TN mode and an STN mode, compound (8) is suitable for the third component. When the composition is used in a device having a mode such as a VA mode and the PSA mode, compounds (9) to (15) are suitable for the third component. The composition may further contain a liquid crystal compound different from compounds (1) to (15). The composition may contain the additive such as the optically active compound, the antioxidant, the ultraviolet light absorber, the light stabilizer, the heat stabilizer, the antifoaming agent, the polymerizable compound, the polymerization initiator and the polymerization inhibitor when necessary.

In order to develop excellent characteristics, the composition preferably contains at least one of compounds (1) in the range of about 1% by weight to about 99% by weight. A further preferred proportion is in the range of about 3% by weight to about 90% by weight. The most preferred proportion is in the range of about 5% by weight to about 60% by weight.

In compounds (2) to (4), two terminal groups are alkyl or the like, and dielectric anisotropy is small. Preferred examples of the compounds include compounds (2-1) to (2-11), compounds (3-1) to (3-19) and compounds (4-1) to (4-7). In the compounds, $R^{11}$ and $R^{12}$ are independently alkyl having 1 to 10 carbons or alkenyl having 2 to 10 carbons, and in the alkyl or the alkenyl, at least one piece of —$CH_2$— may be replaced by —O—, and at least one piece of hydrogen may be replaced by fluorine.

Compound (2) is mainly effective in decreasing viscosity or adjusting optical anisotropy. Compounds (3) and (4) are effective in extending the temperature range of the nematic phase by increasing the maximum temperature, or in adjusting the optical anisotropy.

Compounds (2) to (4) have the small dielectric anisotropy. As a content of compounds (2) to (4) is increased, the viscosity of the composition is decreased, but the dielectric anisotropy is decreased. Thus, as long as a desired value of threshold voltage of the device is met, the content is preferably as large as possible. Accordingly, when a composition for a mode such as an IPS mode and the VA mode is prepared, the content of compounds (2) to (4) is preferably about 30% by weight or more, and further preferably about 40% by weight or more, based on the weight of the liquid crystal composition.

Compounds (5) to (7) have a halogen-containing group or a fluorine-containing group at a right terminal. Preferred examples of the compounds include compounds (5-1) to (5-16), compounds (6-1) to (6-113) and compounds (7-1) to (7-57). In the compounds, $R^{13}$ is alkyl having 1 to 10 carbons or alkenyl having 2 to 10 carbons, and in the alkyl and the alkenyl, at least one piece of —$CH_2$— may be replaced by —O—, and at least one piece of hydrogen may be replaced by fluorine; and $X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$.

Formula 28

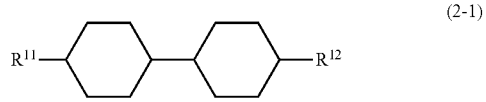
(2-1)

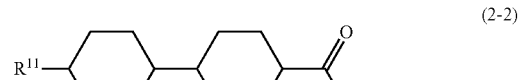
(2-2)

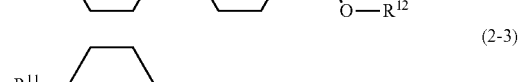
(2-3)

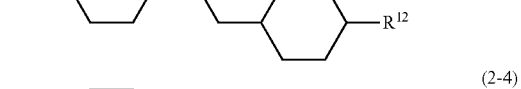
(2-4)

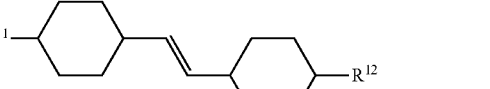
(2-5)

(2-6) 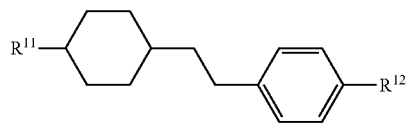
(2-7) 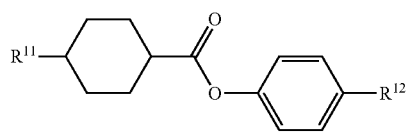
(2-8) 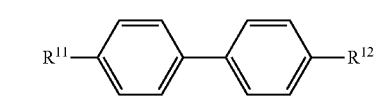
(2-9) 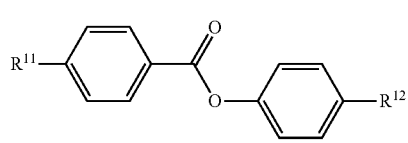
(2-10) 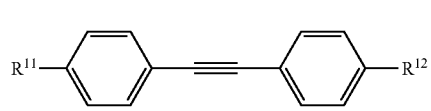
(2-11) 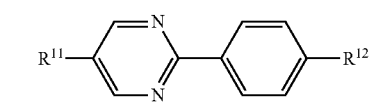
(3-1) 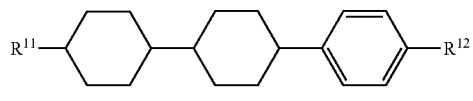
(3-2) 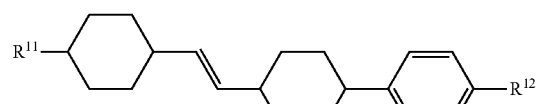
(3-3) 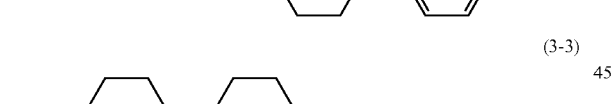
(3-4) 
(3-5) 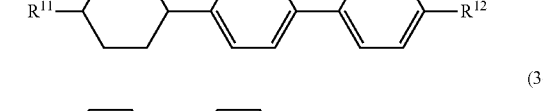
(3-6) 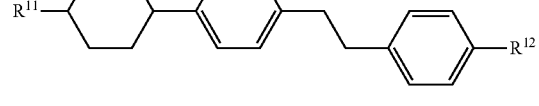
(3-7) 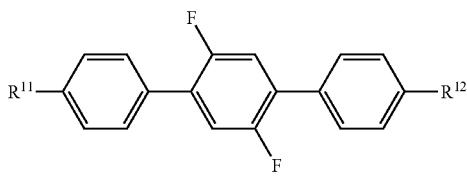
(3-8) 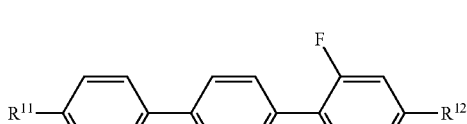
(3-9) 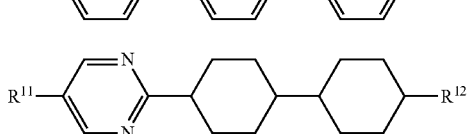
(3-10) 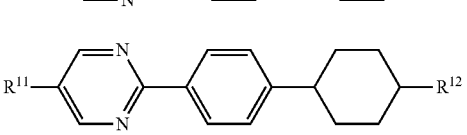
(3-11) 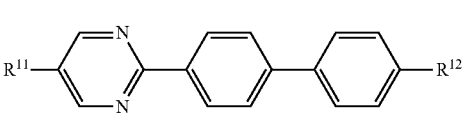
(3-12) 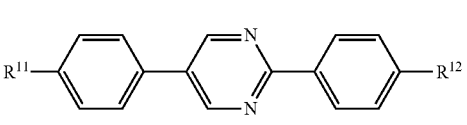
(3-13) 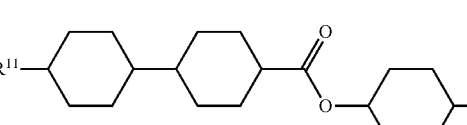
(3-14) 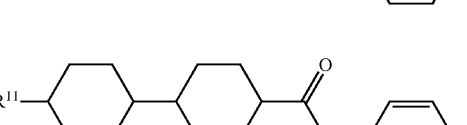
(3-15) 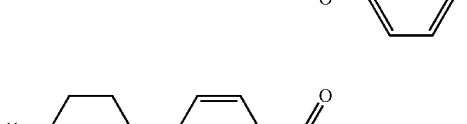
(3-16) 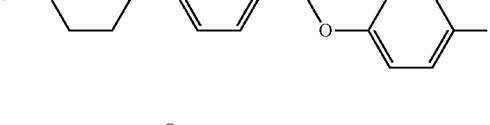
(3-17) 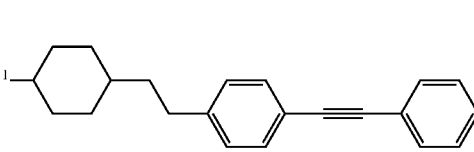

(3-18)
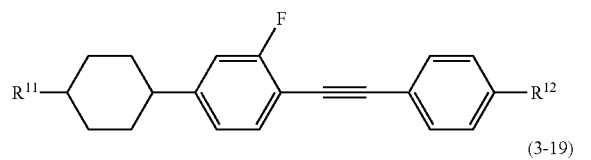
(3-19)
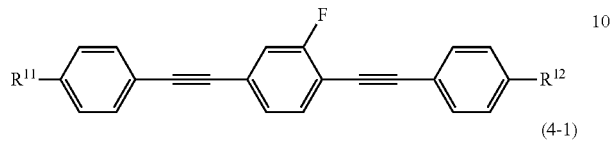
(4-1)
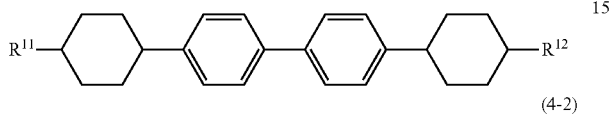
(4-2)
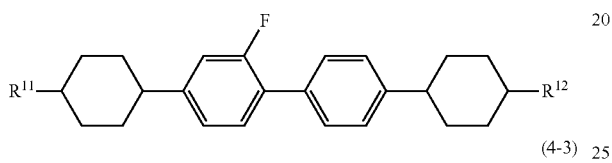
(4-3)
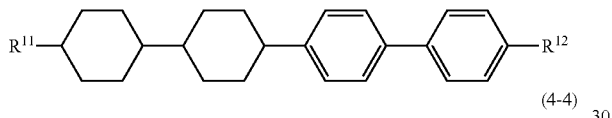
(4-4)
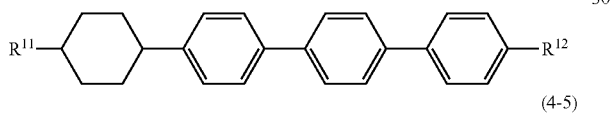
(4-5)
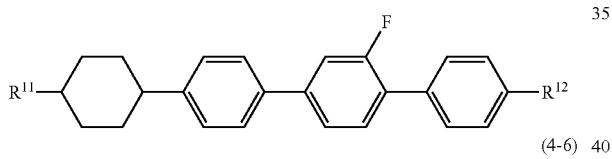
(4-6)
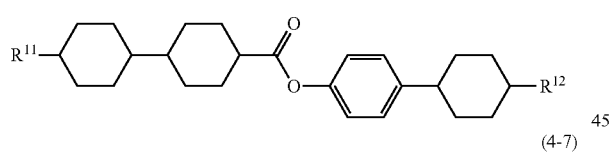
(4-7)
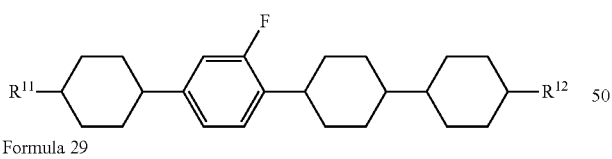
Formula 29
(5-1)
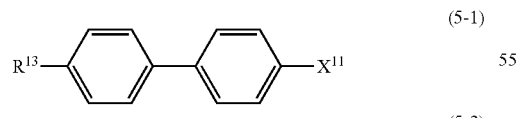
(5-2)
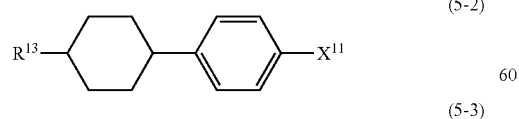
(5-3)
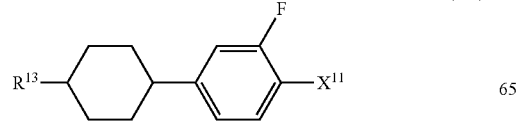
(5-4)
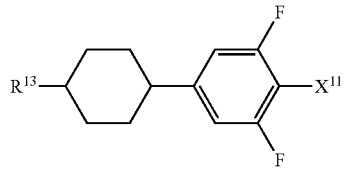
(5-5)
(5-6)
(5-7)
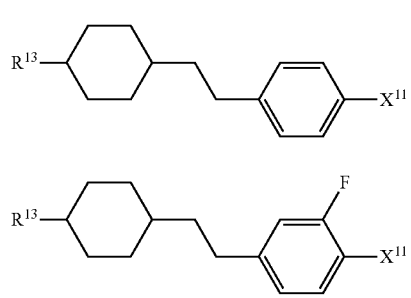
(5-8)
(5-9)
(5-10)
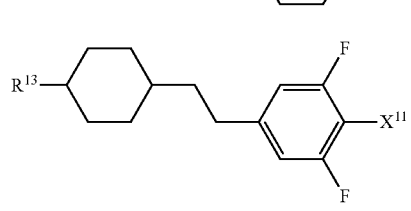
(5-11)
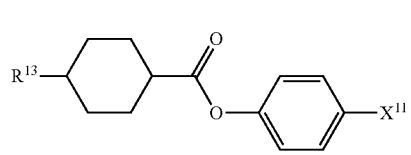
(5-12)
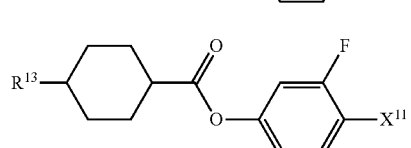
(5-13)
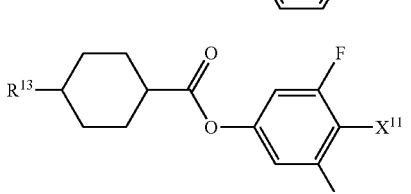

(5-14)
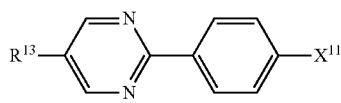
(5-15)
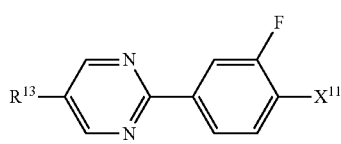
(5-16)
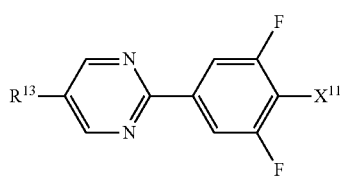
Formula 30
(6-1)
(6-2)
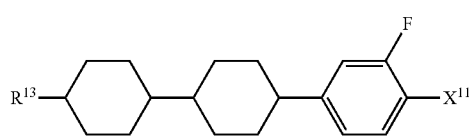
(6-3)
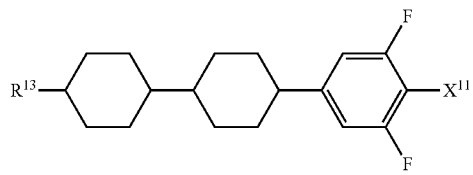
(6-4)
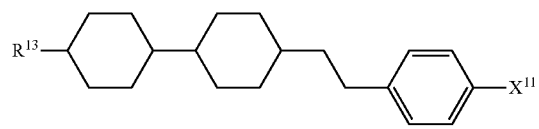
(6-5)
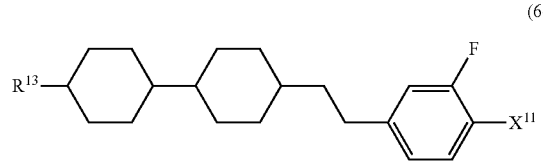
(6-6)
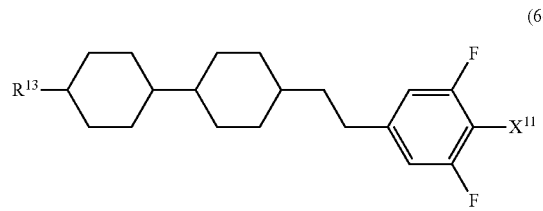
(6-7)
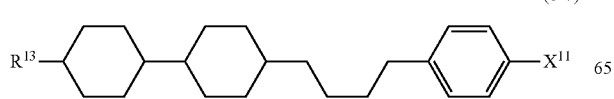
(6-8)
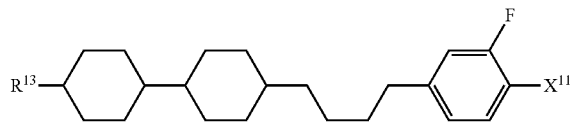
(6-9)
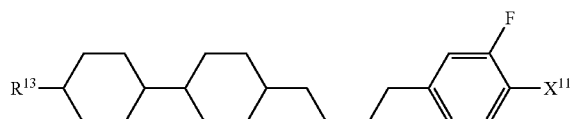
(6-10)
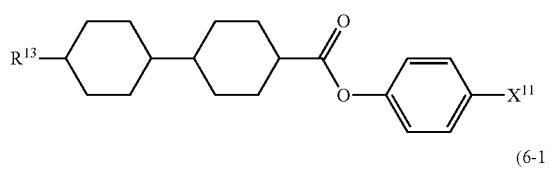
(6-11)
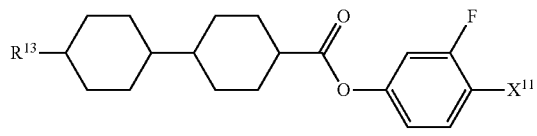
(6-12)
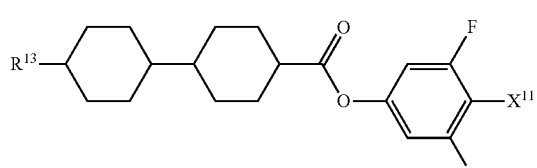
(6-13)
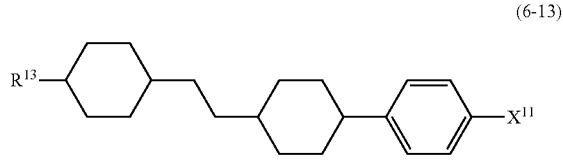
(6-14)
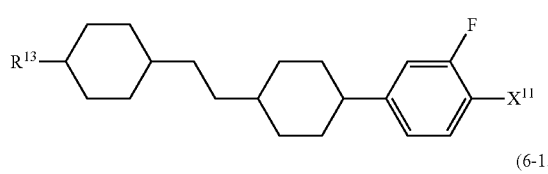
(6-15)
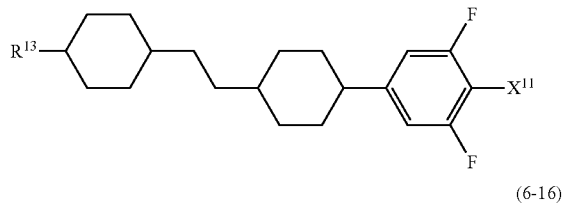
(6-16)
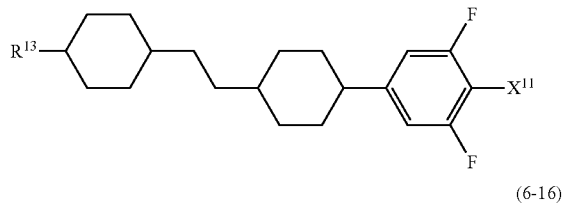

-continued
(6-17)
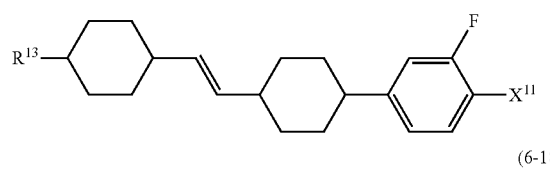
(6-18)
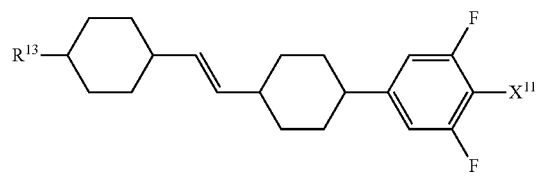
(6-19)
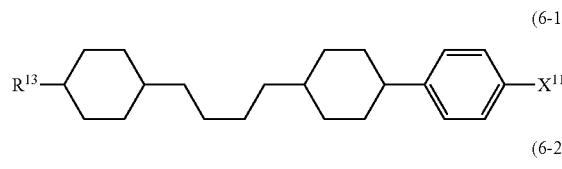
(6-20)
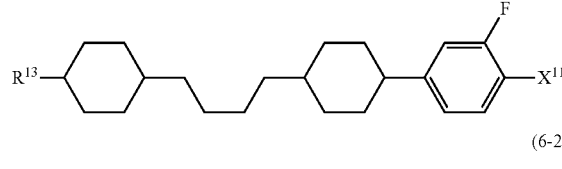
(6-21)
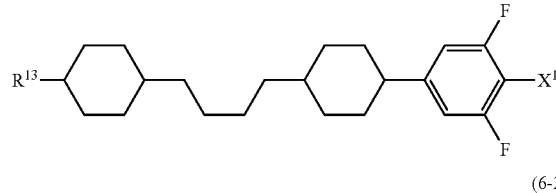
(6-22)
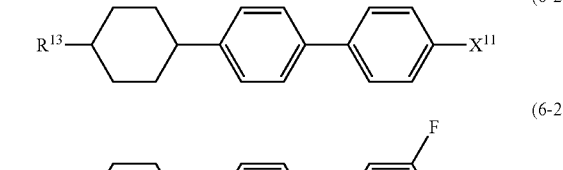
(6-23)
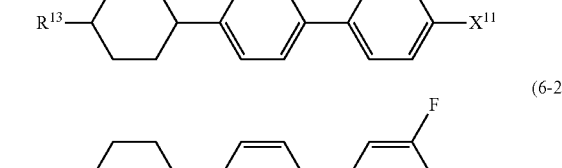
(6-24)
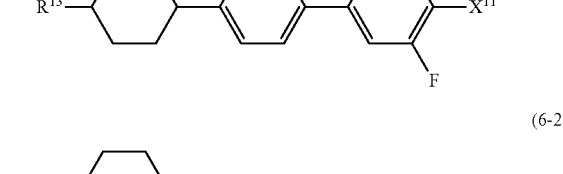
(6-25)
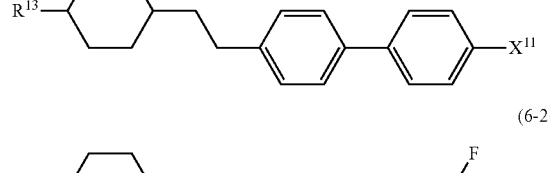
(6-26)
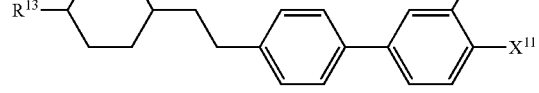
-continued
(6-27)
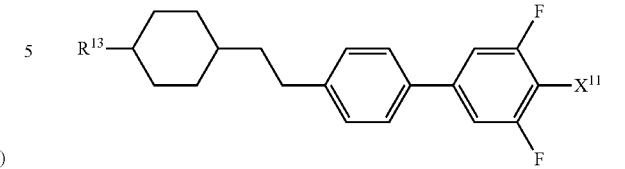
(6-28)
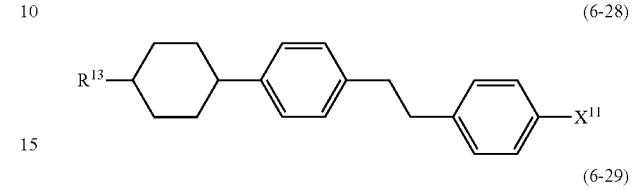
(6-29)
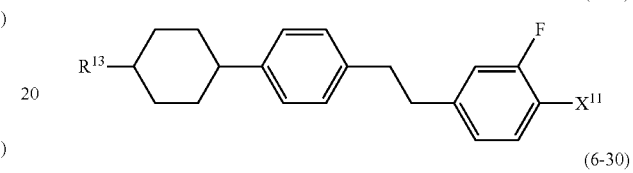
(6-30)
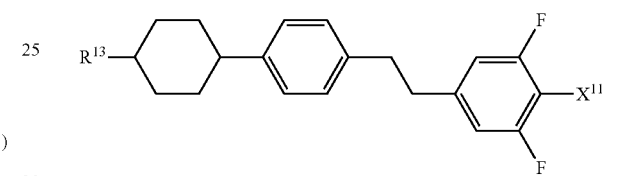
(6-31)
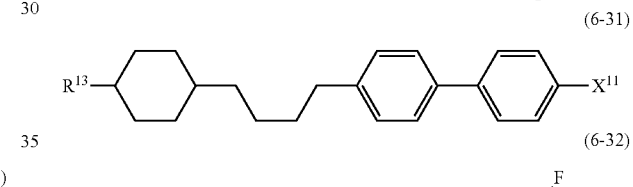
(6-32)
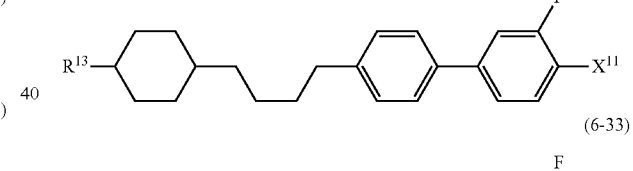
(6-33)
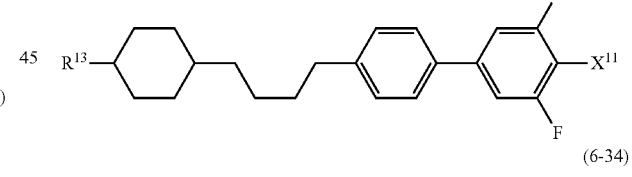
(6-34)
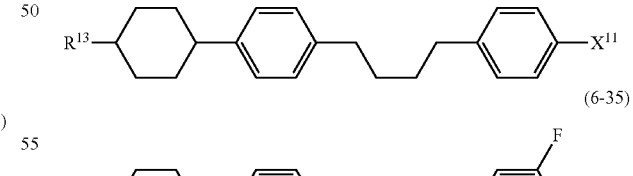
(6-35)
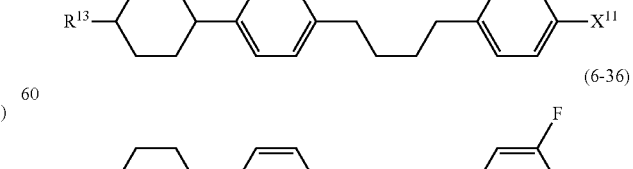
(6-36)
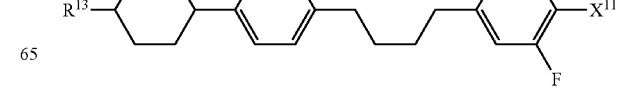

(6-37) 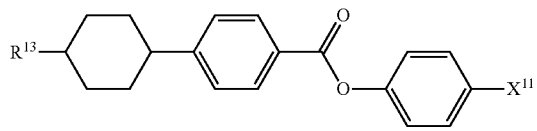
(6-38) 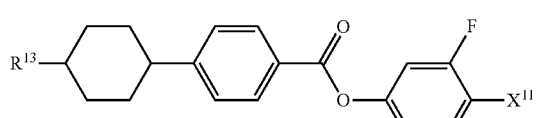
Formula 31
(6-39) 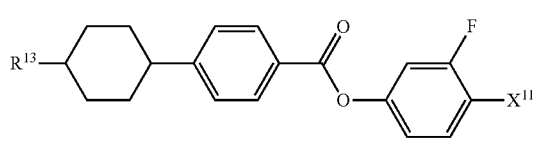
(6-40)
(6-41)
(6-42)
(6-43)
(6-44)
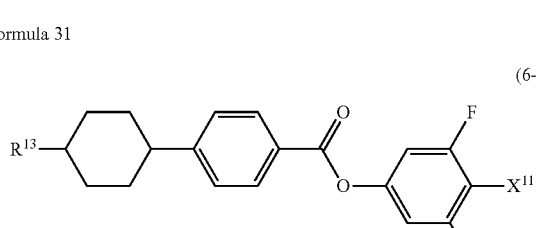
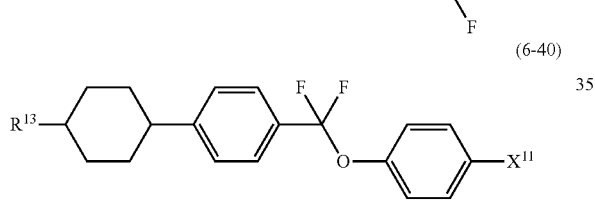
(6-45) 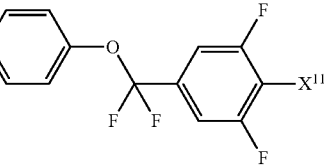
(6-46)
(6-47)
(6-48)
(6-49)
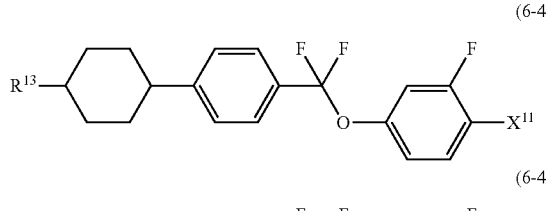
(6-50)
(6-51)
(6-52)
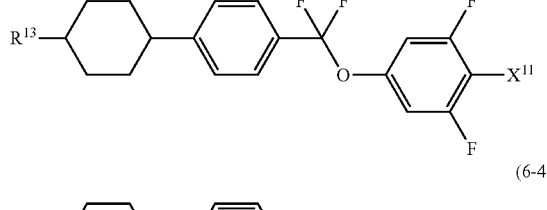
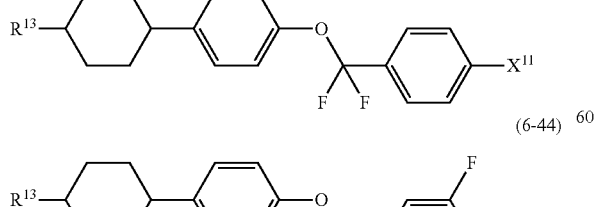
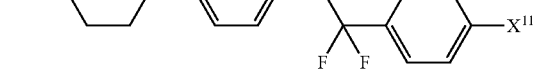

(6-53) 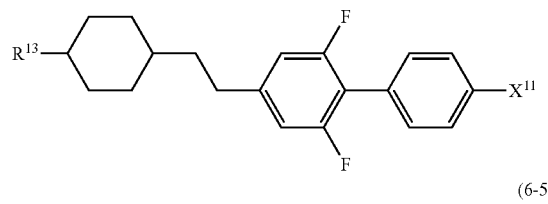
(6-54) 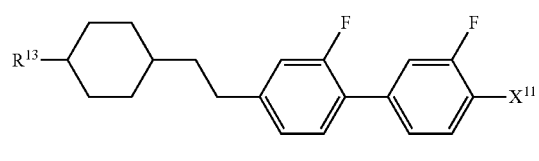
(6-55) 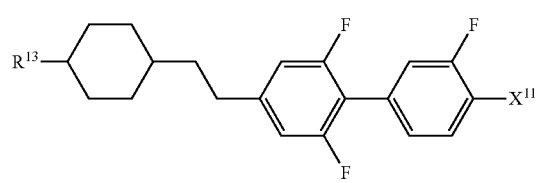
(6-56) 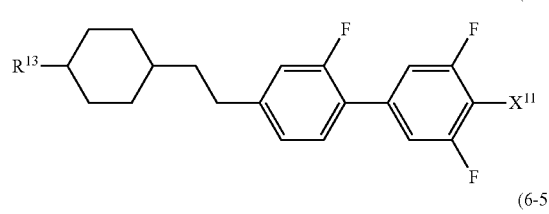
(6-57) 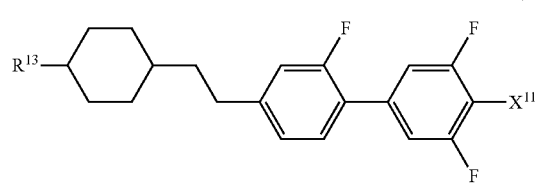
(6-58) 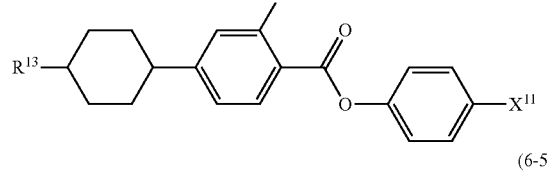
(6-59) 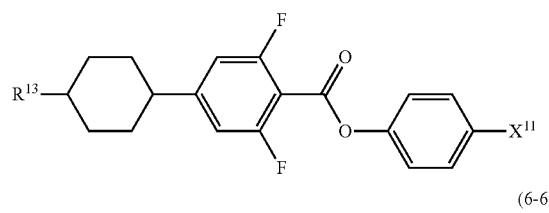
(6-60) 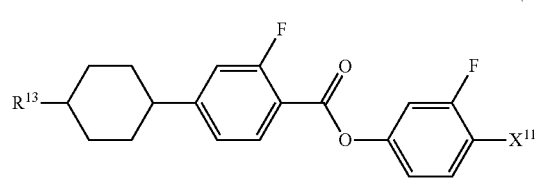
(6-61) 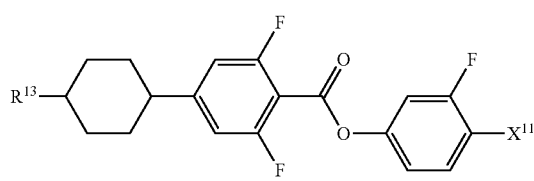
(6-62) 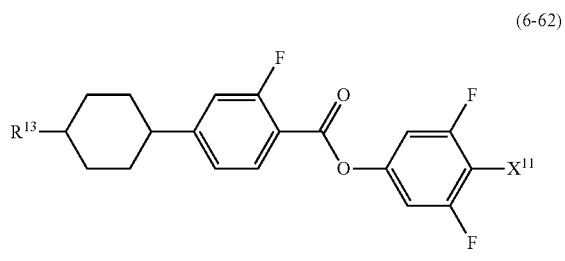
(6-63) 
(6-64) 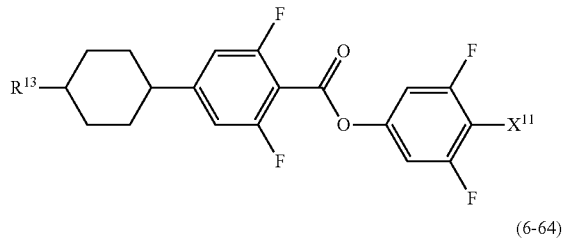
(6-65) 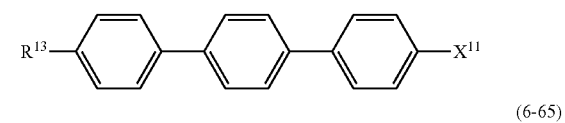
(6-66) 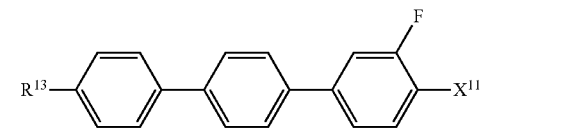
(6-67) 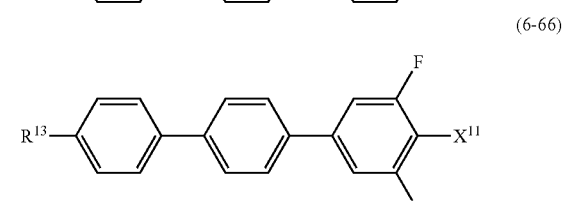
(6-68) 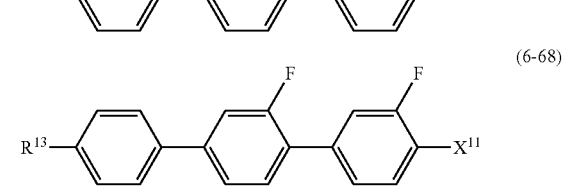

Formula 32
(6-69) 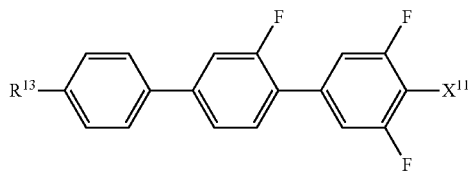
(6-70) 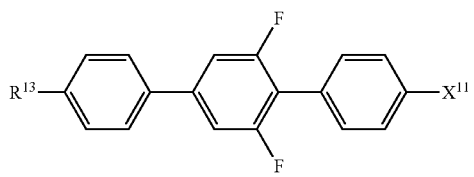
(6-71) 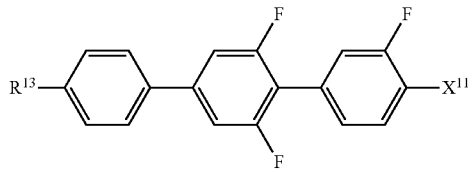
(6-72) 
(6-73) 
(6-74) 
(6-75) 
(6-76) 
(6-77) 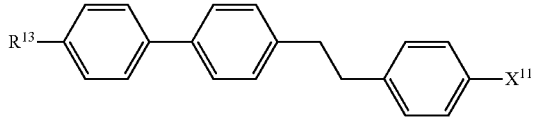
(6-78) 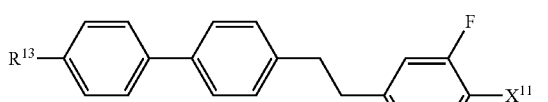
(6-79) 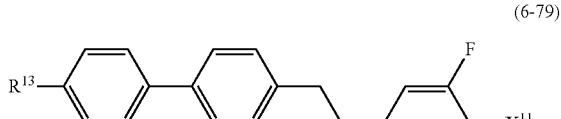
(6-80) 
(6-81) 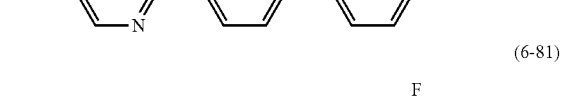
(6-82) 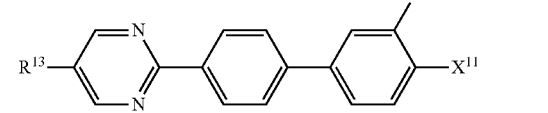
(6-83) 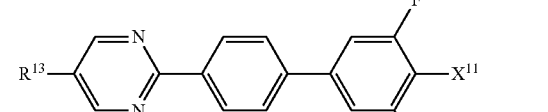
(6-84) 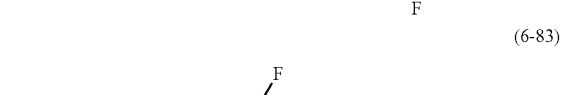
(6-85) 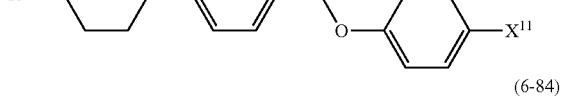

(6-86) 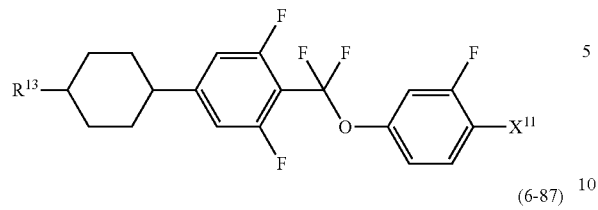
(6-87) 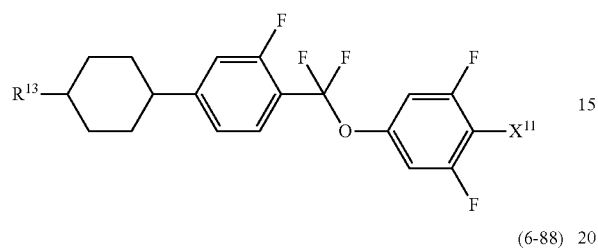
(6-88) 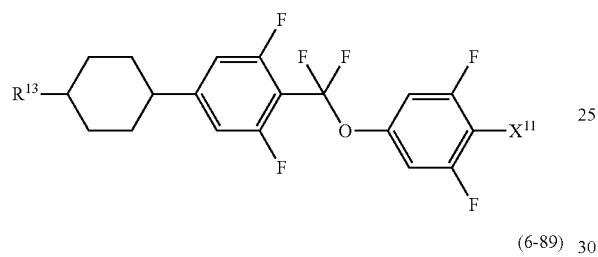
(6-89) 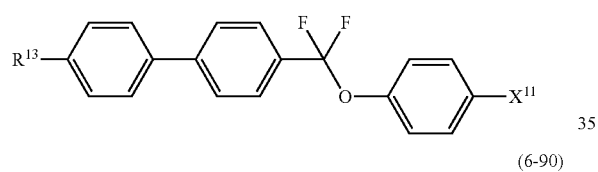
(6-90) 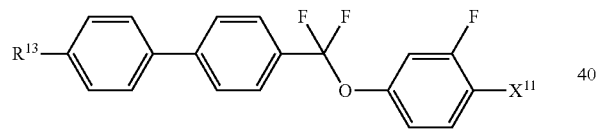
(6-91) 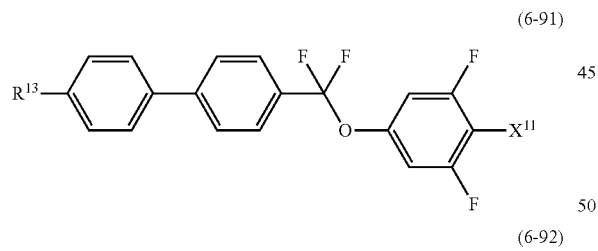
(6-92) 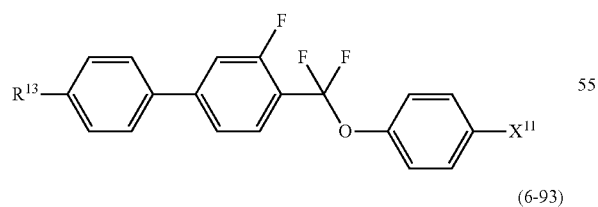
(6-93) 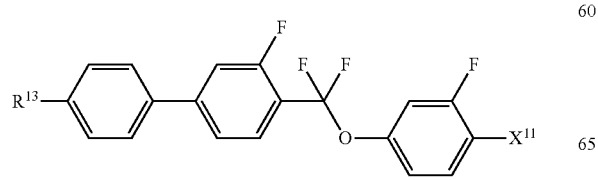
(6-94) 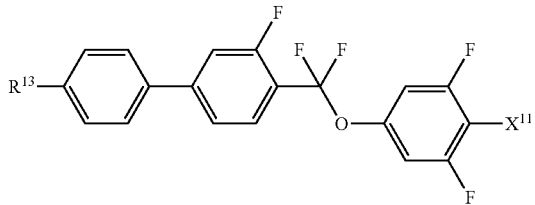
(6-95) 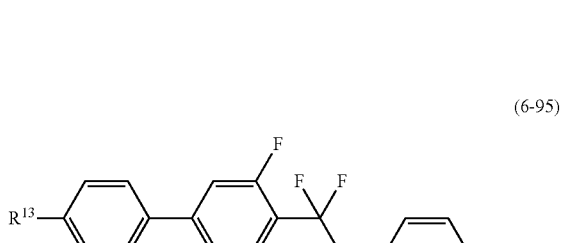
(6-96) 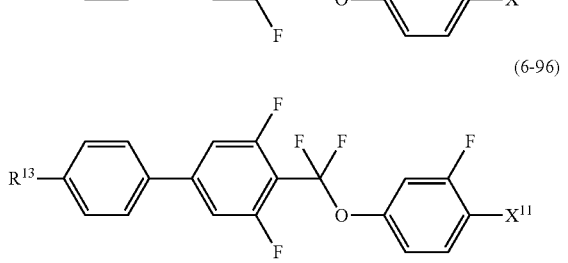
(6-97) 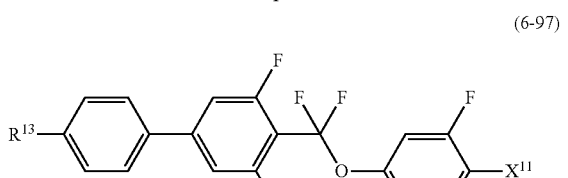
(6-98) 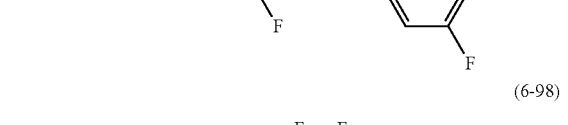
(6-99) 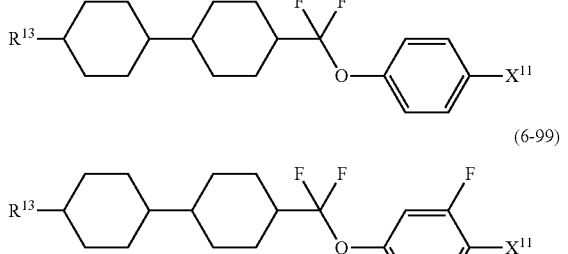
(6-100) 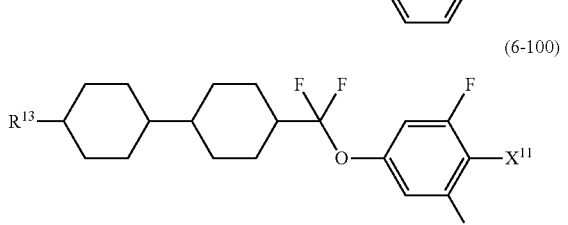
(6-101) 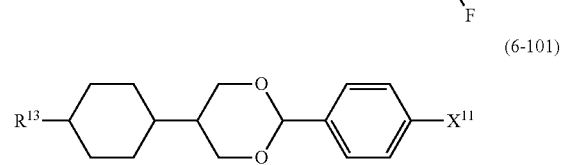

(6-102) 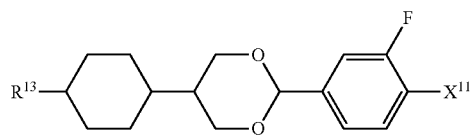
(6-103) 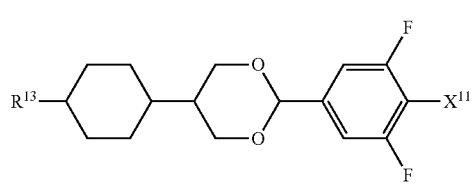
(6-104) 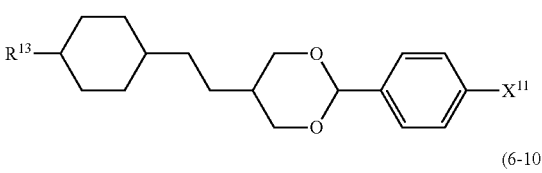
(6-105) 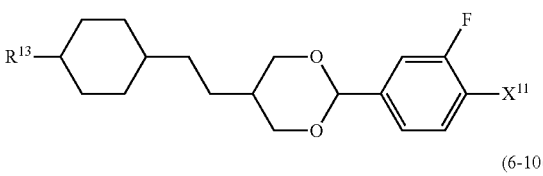
(6-106) 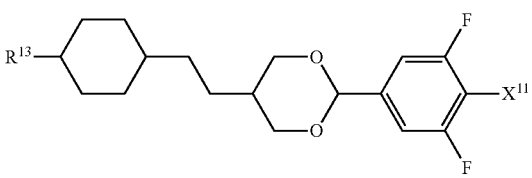
(6-107) 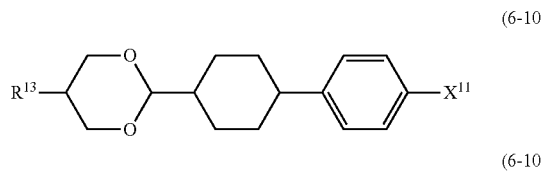
(6-108) 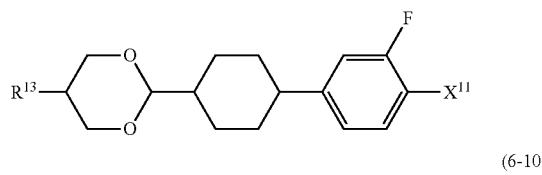
(6-109) 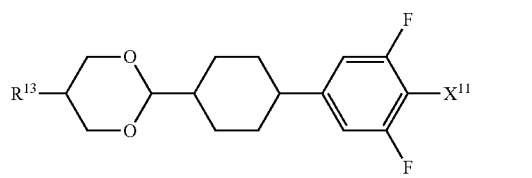
(6-110) 
(6-111) 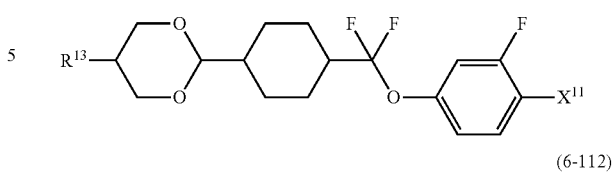
(6-112) 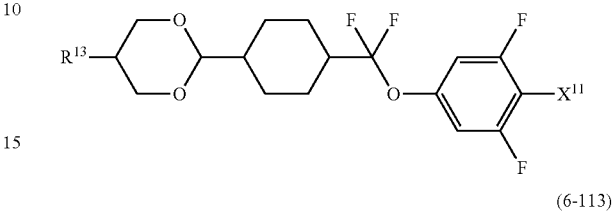
(6-113) 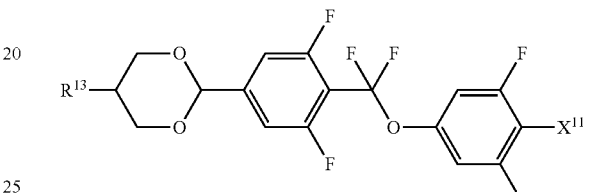
Formula 33
(7-1) 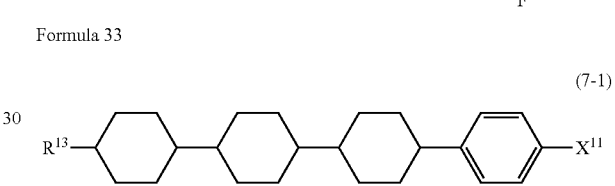
(7-2) 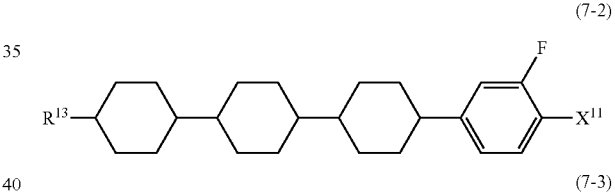
(7-3) 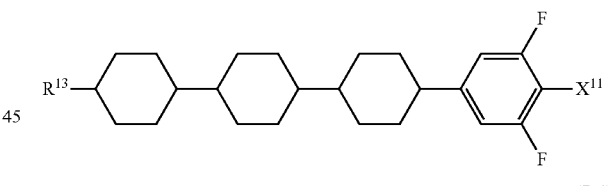
(7-4) 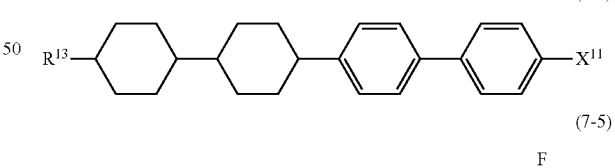
(7-5) 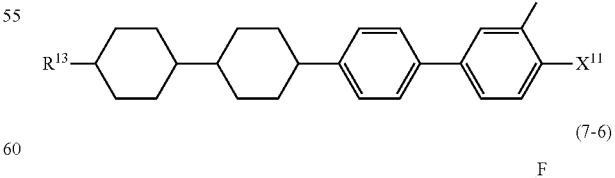
(7-6) 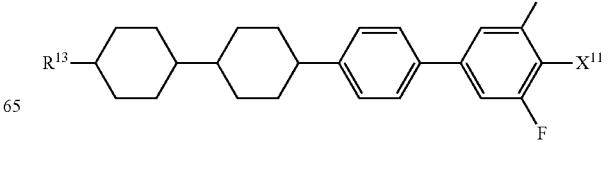

(7-7) through (7-25): chemical structure formulas (7-26)
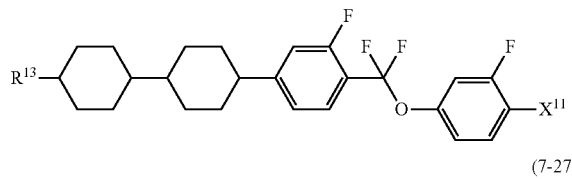
(7-27)
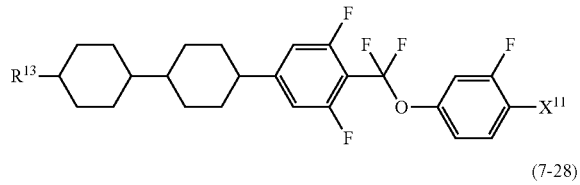
(7-28)
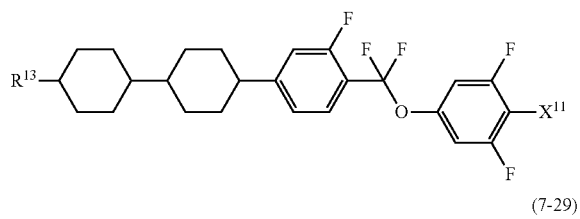
(7-29)
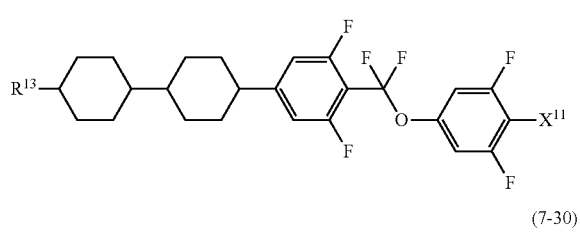
(7-30)
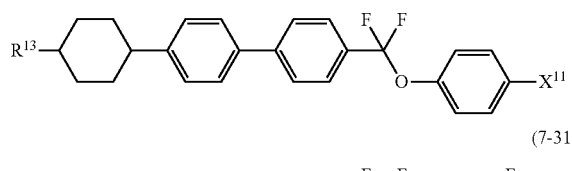
(7-31)
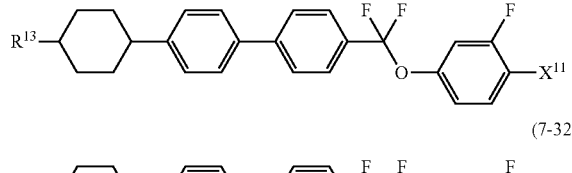
(7-32)
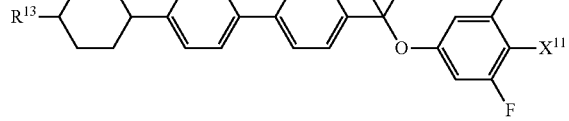
(7-33)
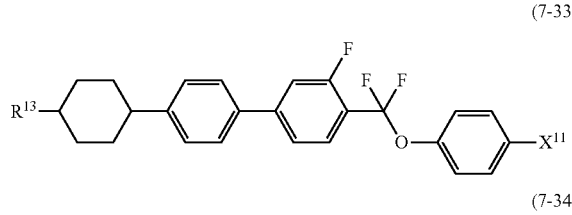
(7-34)
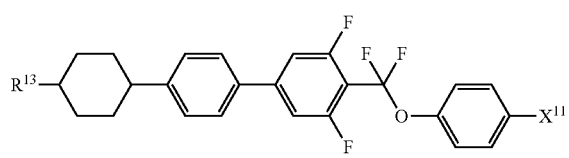
(7-35)
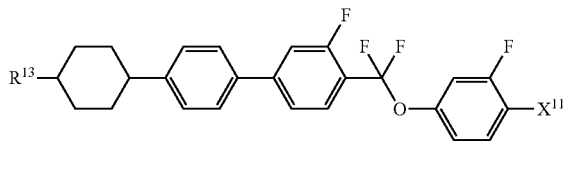
(7-36)
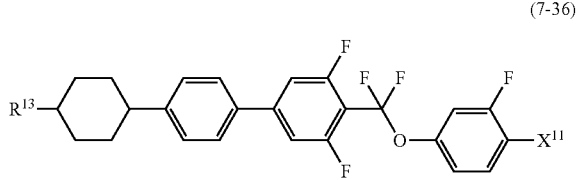
(7-37)
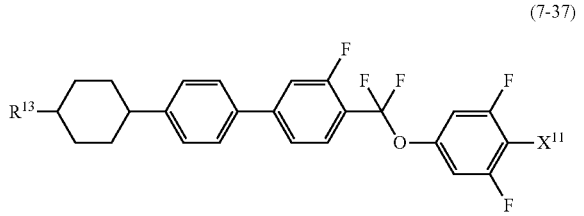
(7-38)
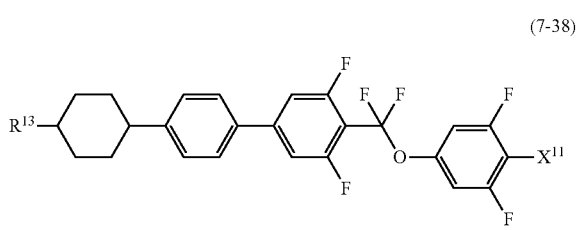
Formula 34
(7-39)
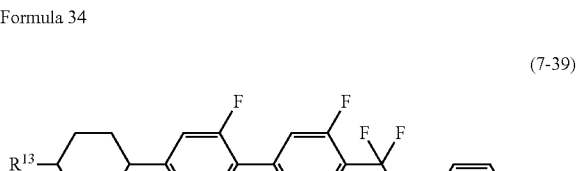
(7-40)
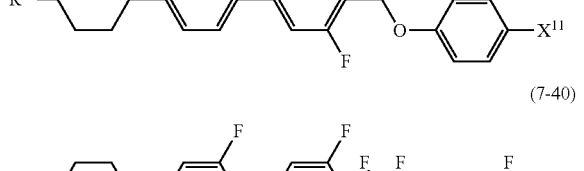
(7-41)
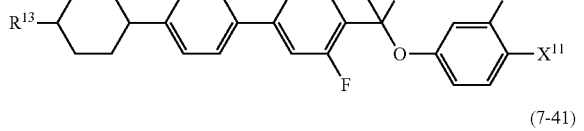
(7-42)
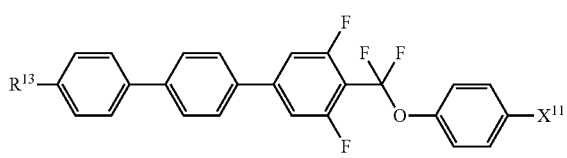

-continued (7-43)
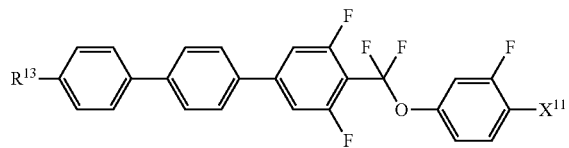

(7-44)
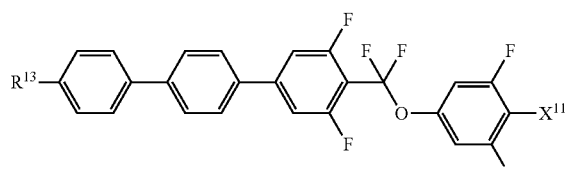

(7-45)
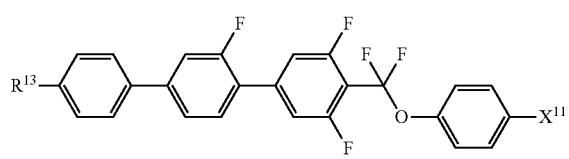

(7-46)
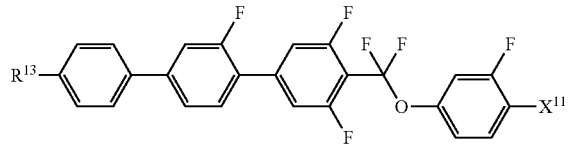

(7-47)
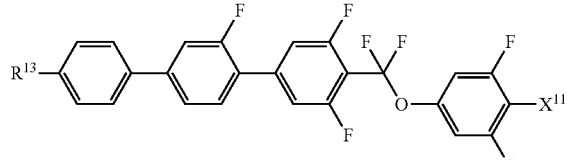

(7-48)
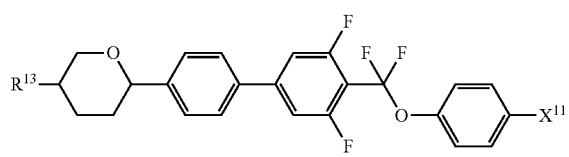

(7-49)
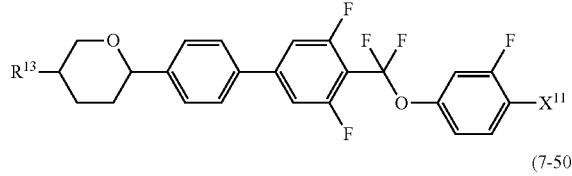

(7-50)
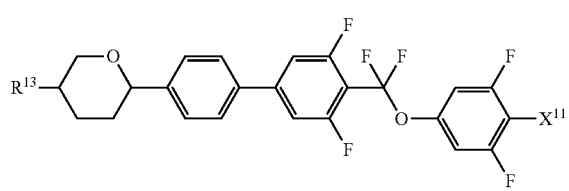

-continued (7-51)
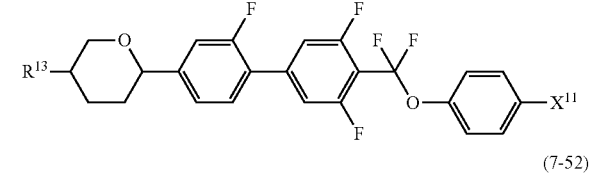

(7-52)
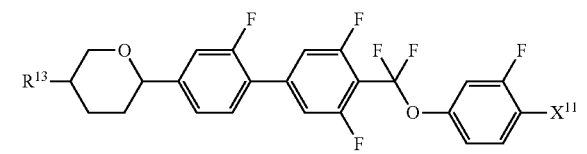

(7-53)
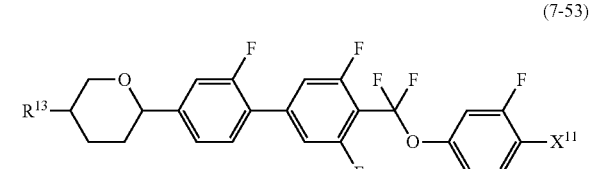

(7-54)
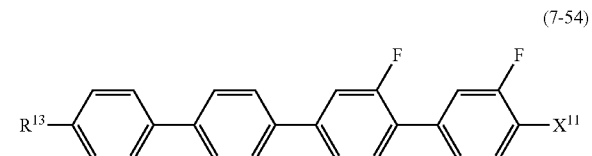

(7-55)
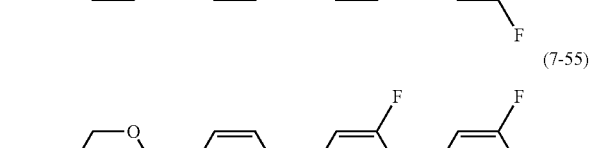

(7-56)
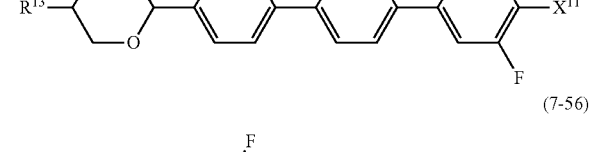

(7-57)
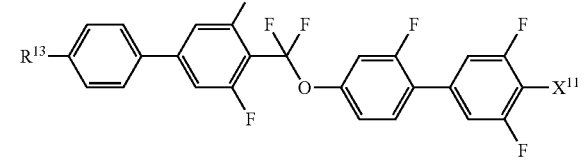

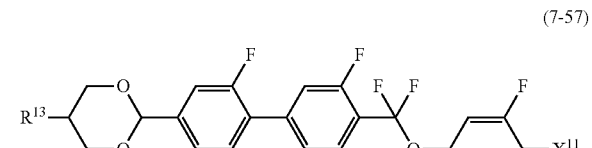

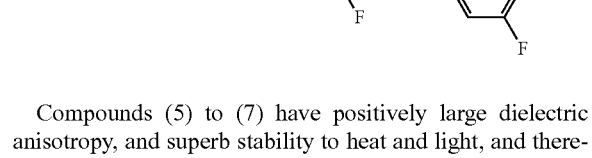

Compounds (5) to (7) have positively large dielectric anisotropy, and superb stability to heat and light, and therefore are used when a composition for a mode such as the IPS mode, the FFS mode and an OCB mode is prepared. A content of compounds (5) to (7) is suitably in the range of about 1% by weight to about 99% by weight, preferably in the range of about 10% by weight to about 97% by weight, and further preferably in the range of about 40% by weight to about 95% by weight, based on the weight of the liquid crystal composition. When the compounds are added to a composition having negative dielectric anisotropy, the content of the compounds is preferably about 30% by weight or less based on the weight of the liquid crystal composition. An elastic constant of the composition can be adjusted, and a voltage-transmittance curve of the device can be adjusted by adding compounds (5) to (7).

In compound (8), a right-terminal group is —C≡N or —C≡C—C≡N. Preferred examples of the compound include compounds (8-1) to (8-64). In the compounds, $R^{14}$ is alkyl having 1 to 10 carbons or alkenyl having 2 to 10 carbons, and in the alkyl and the alkenyl, at least one piece of —CH$_2$— may be replaced by —O—, and at least one piece of hydrogen may be replaced by fluorine; and $X^{12}$ is —C≡N or —C≡C—C≡N.

Formula 35

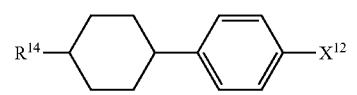 (8-1)

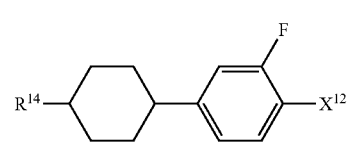 (8-2)

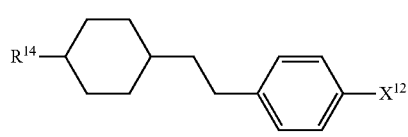 (8-3)

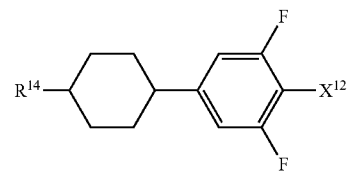 (8-4)

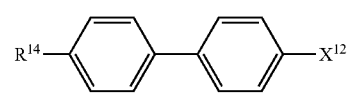 (8-5)

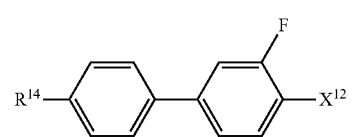 (8-6)

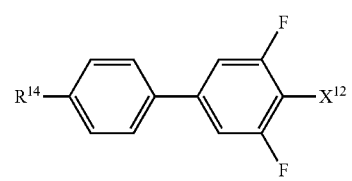 (8-7)

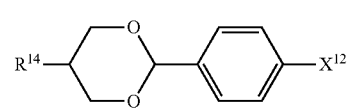 (8-8)

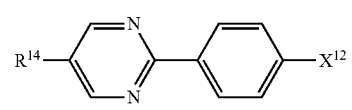 (8-9)

-continued

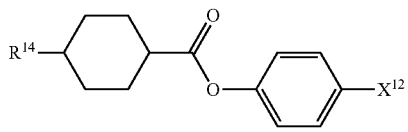 (8-10)

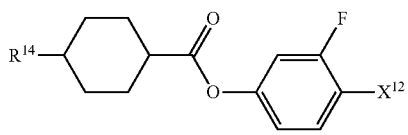 (8-11)

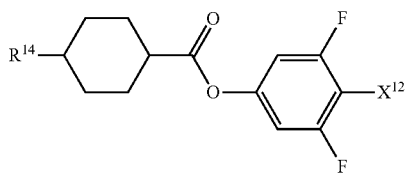 (8-12)

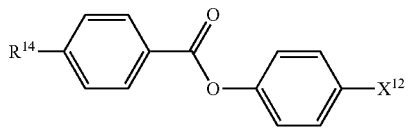 (8-13)

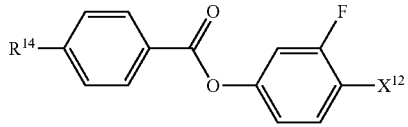 (8-14)

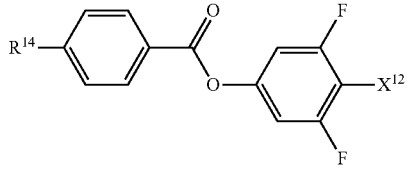 (8-15)

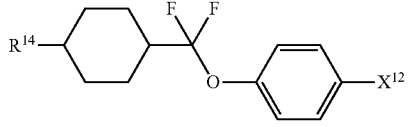 (8-16)

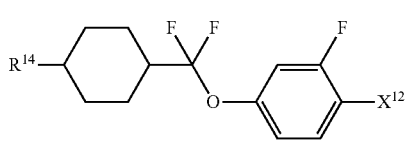 (8-17)

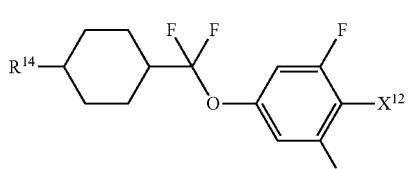 (8-18)

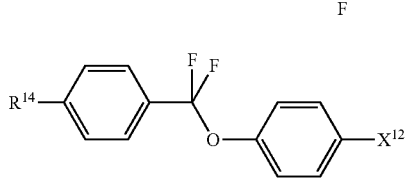 (8-19)

(8-20) 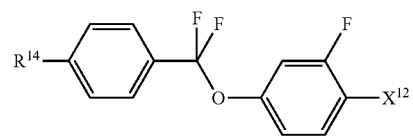
(8-21) 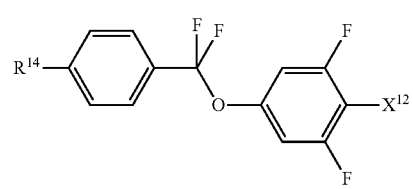
(8-22) 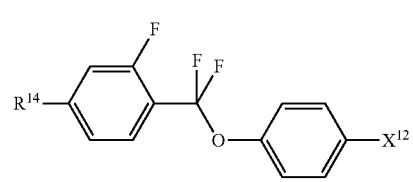
(8-23) 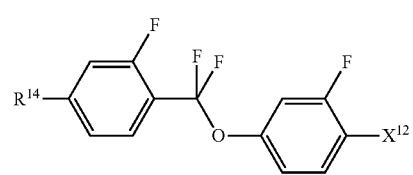
(8-24) 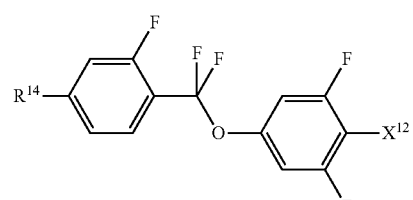
(8-25) 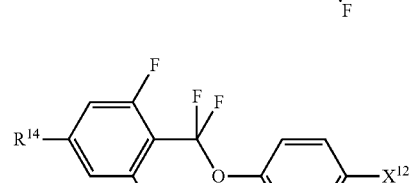
(8-26) 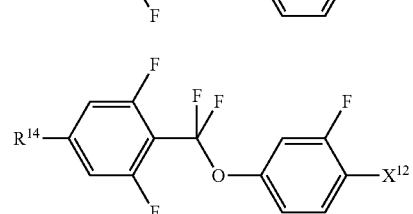
(8-27) 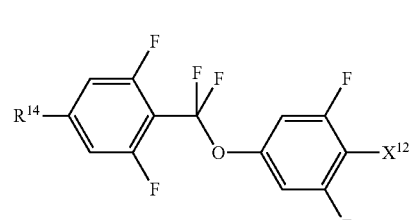
(8-28) 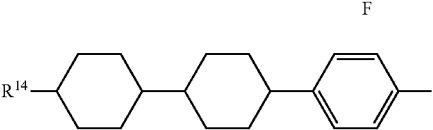
(8-29) 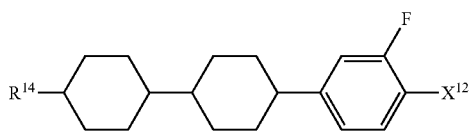
(8-30) 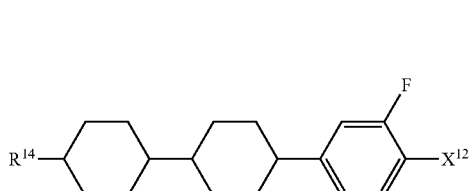
(8-31) 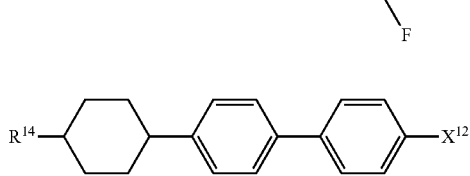
(8-32) 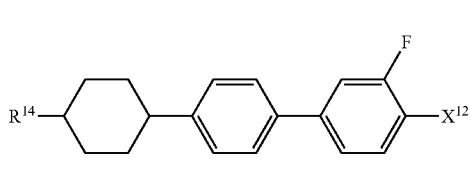
(8-33) 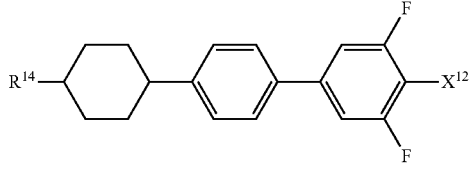
(8-34) 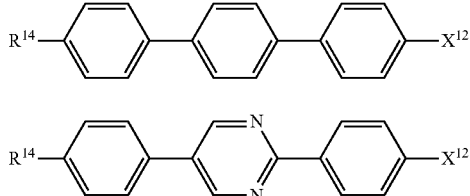
(8-35) 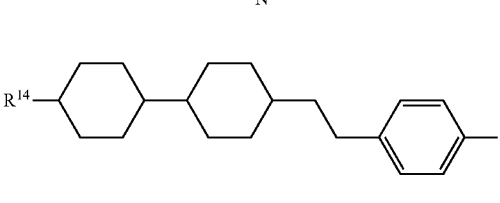
(8-36) 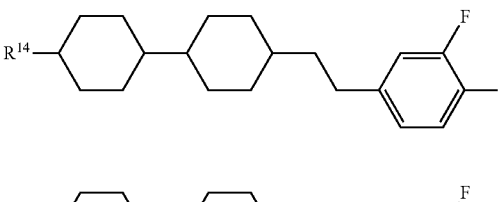
(8-37) 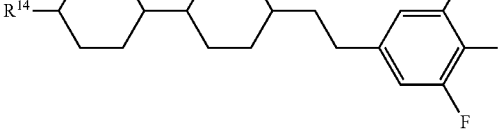
(8-38)

(8-39) 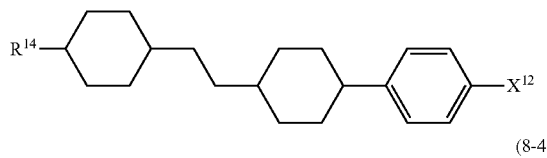
(8-40) 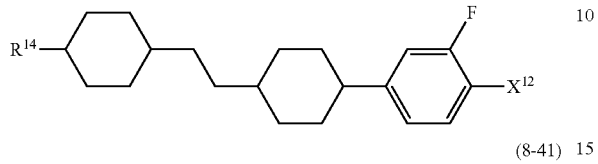
(8-41) 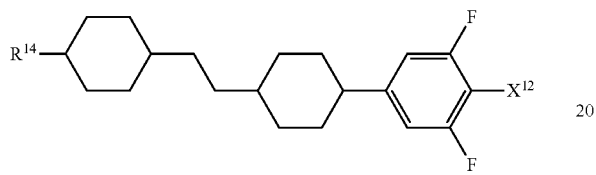
Formula 36
(8-42) 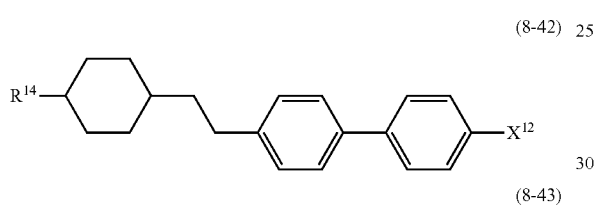
(8-43) 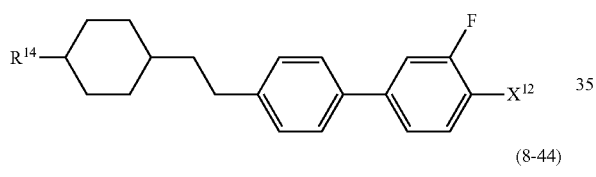
(8-44) 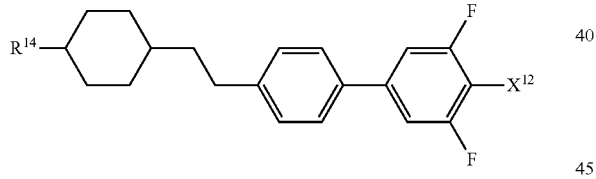
(8-45) 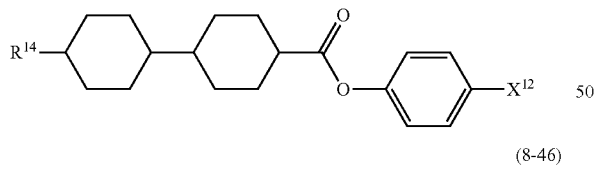
(8-46) 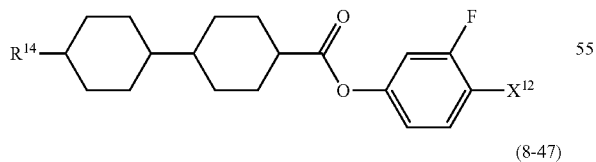
(8-47) 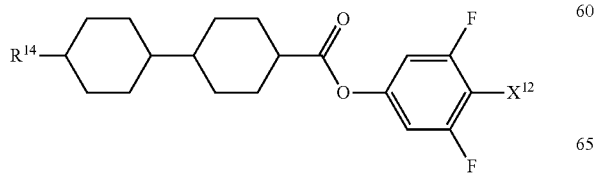
(8-48) 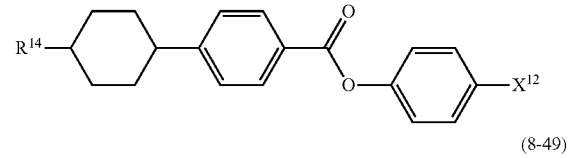
(8-49) 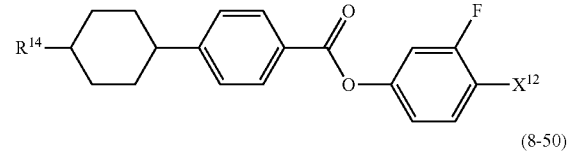
(8-50) 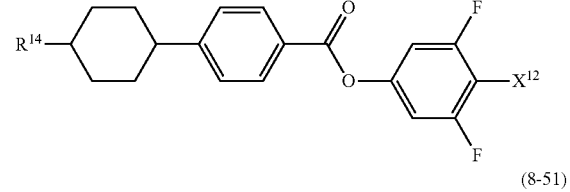
(8-51) 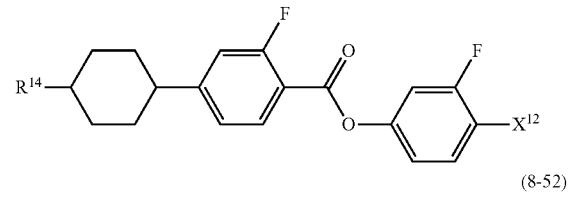
(8-52) 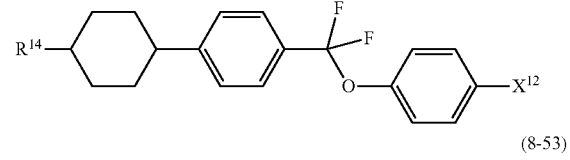
(8-53) 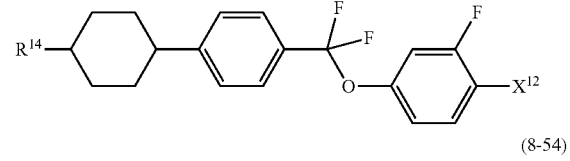
(8-54) 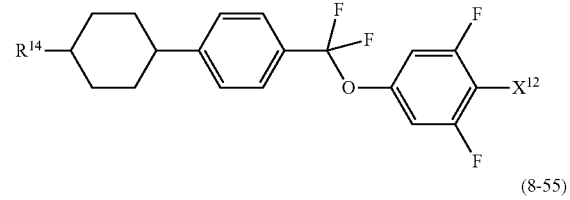
(8-55) 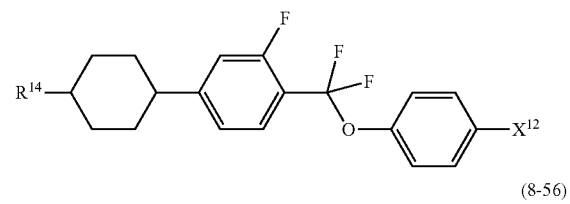
(8-56)

(8-57)
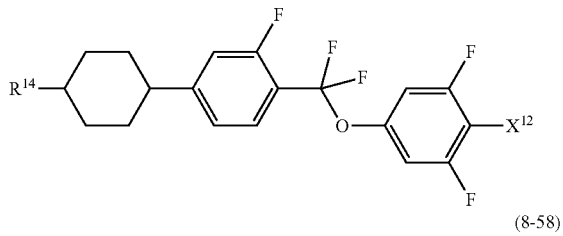

(8-58)
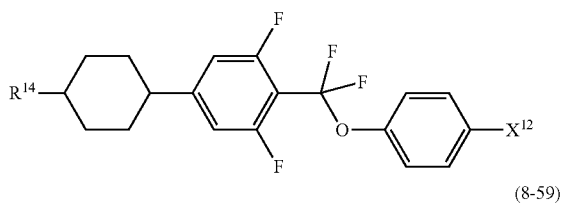

(8-59)
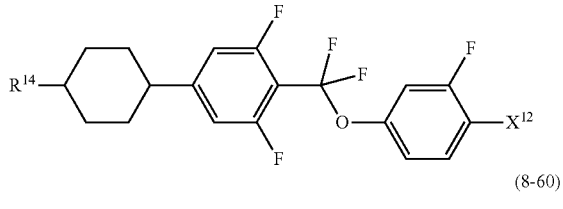

(8-60)
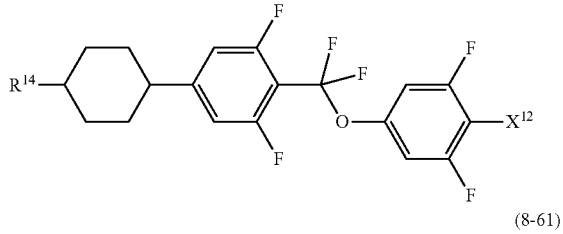

(8-61)
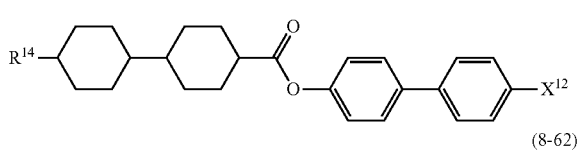

(8-62)
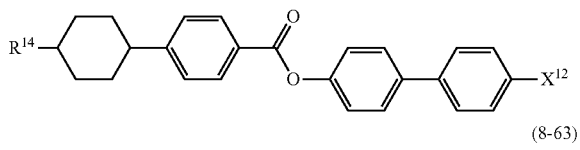

(8-63)
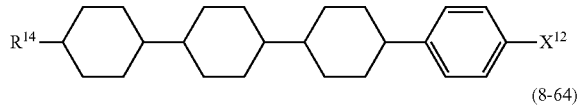

(8-64)
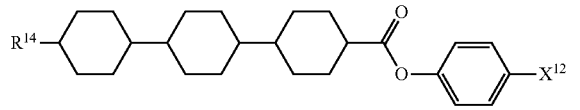

Compound (8) has positive dielectric anisotropy, a value of which is large, and therefore is mainly used for preparing a composition for the mode such as the TN mode and the STN mode. Dielectric anisotropy of the composition can be increased by adding compound (8). Compound (8) is effective in extending the temperature range of the liquid crystal phase, adjusting the viscosity or adjusting the optical anisotropy. The compound is also useful for adjustment of the voltage-transmittance curve of the device.

When the composition for the mode such as the TN mode and the STN mode is prepared, a content of compound (8) is suitably in the range of about 1% by weight to about 99% by weight, preferably in the range of about 10% by weight to about 97% by weight, and further preferably in the range of about 40% by weight to about 95% by weight, based on the weight of the liquid crystal composition. When compound (8) is added to the composition having negative dielectric anisotropy, the content of the compound is preferably about 30% by weight or less based on the weight of the liquid crystal composition. The elastic constant of the composition can be adjusted, and the voltage-transmittance curve of the device can be adjusted by adding compound (8).

Compounds (9) to (15) have phenylene in which atoms in lateral positions are replaced by two pieces of halogen. Preferred examples of the compounds include compounds (9-1) to (9-8), compounds (10-1) to (10-17), compound (11-1), compounds (12-1) to (12-3), compounds (13-1) to (13-11), compounds (14-1) to (14-3) and compounds (15-1) to (15-3). In the compounds, $R^{15}$ and $R^{16}$ are independently alkyl having 1 to 10 carbons or alkenyl having 2 to 10 carbons, and in the alkyl and the alkenyl, at least one piece of —$CH_2$— may be replaced by —O—, and at least one piece of hydrogen may be replaced by fluorine; and $R^{17}$ is hydrogen, fluorine, alkyl having 1 to 10 carbons or alkenyl having 2 to 10 carbons, and in the alkyl and the alkenyl, at least one piece of —$CH_2$— may be replaced by —O—, and at least one piece of hydrogen may be replaced by fluorine.

Compounds (9) to (15) have negatively large dielectric anisotropy. The compounds are used when a composition for a mode such as the IPS mode, the VA mode and the PSA mode is prepared. As a content of the compounds is increased, the dielectric anisotropy of the composition is negatively increased, but the viscosity is increased. Thus, as long as the desired value of threshold voltage of the device is met, the content is preferably as small as possible. Accordingly, when the dielectric anisotropy at a degree of -5 is taken into account, the content is preferably about 40% by weight or more in order to allow a sufficient voltage driving.

Among the compounds, compound (9) is a bicyclic compound, and therefore is mainly effective in decreasing the viscosity, adjusting the optical anisotropy or increasing the dielectric anisotropy. Compounds (10) and (11) are a tricyclic compound, and therefore are effective in increasing the maximum temperature, the optical anisotropy or the dielectric anisotropy. Compounds (12) to (15) are effective in increasing the dielectric anisotropy.

Formula 37

(9-1)
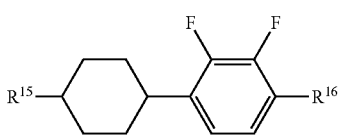

(9-2)
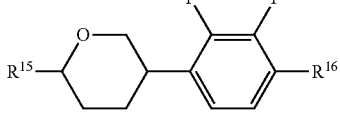

(9-3)
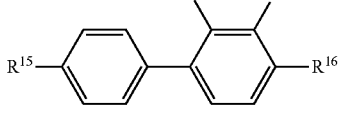

(9-4) 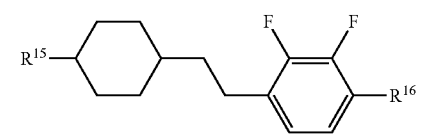
(9-5) 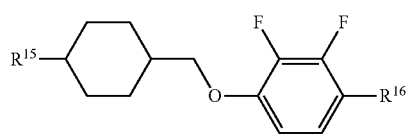
(9-6) 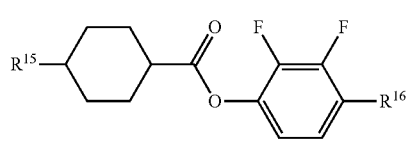
(9-7) 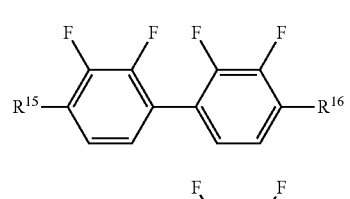
(9-8) 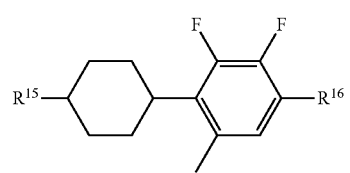
(10-1) 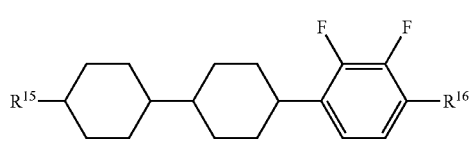
(10-2) 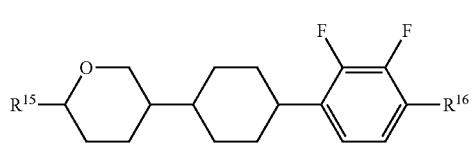
(10-3) 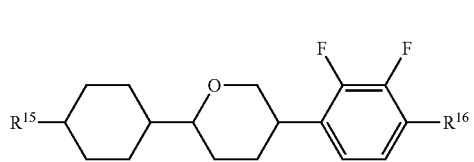
(10-4) 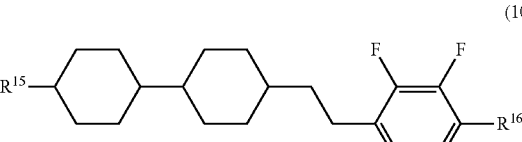
(10-5) 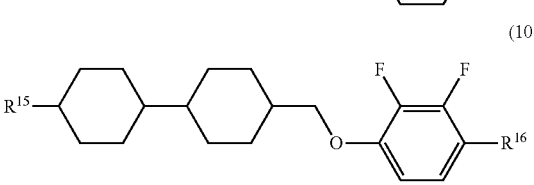
(10-6) 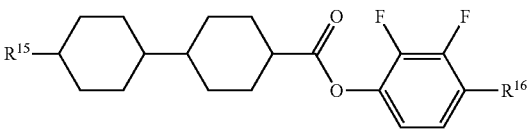
(10-7) 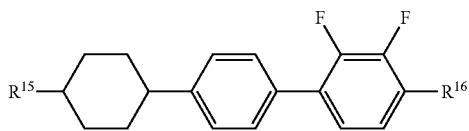
(10-8) 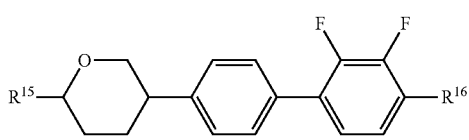
(10-9) 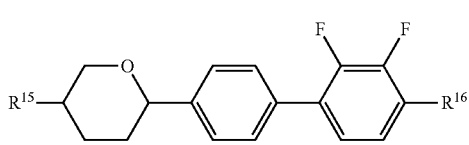
(10-10) 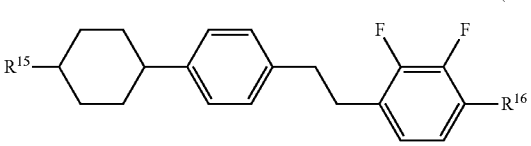
(10-11) 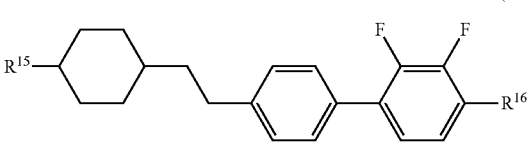
(10-12) 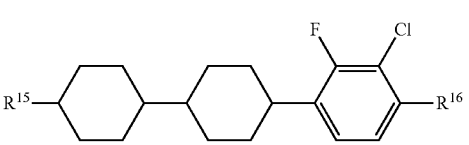
(10-13) 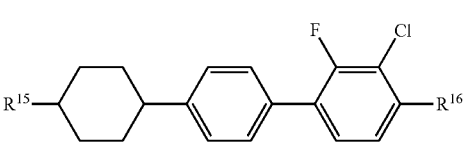
(10-14) 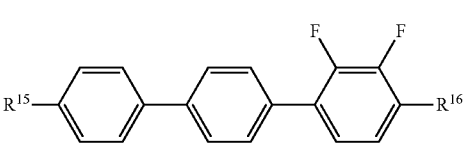
(10-15) 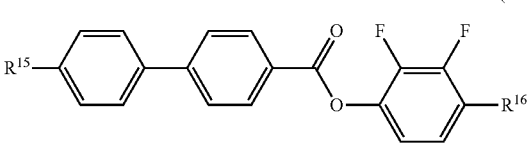

(10-16)
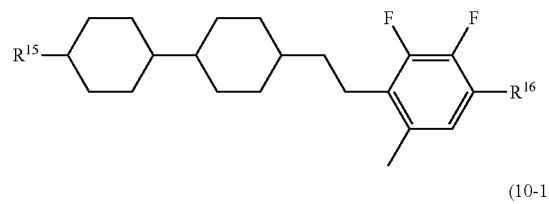
(10-17)
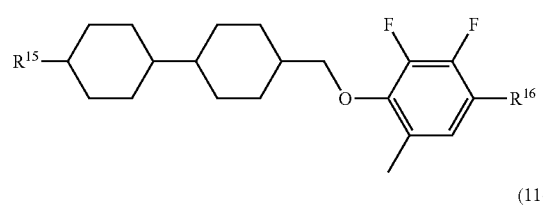
(11-1)
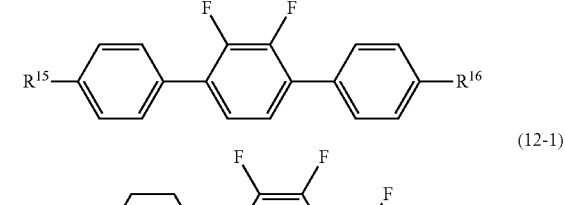
(12-1)
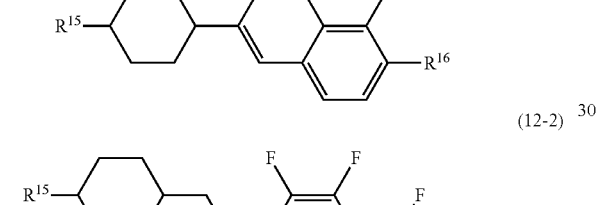
(12-2)
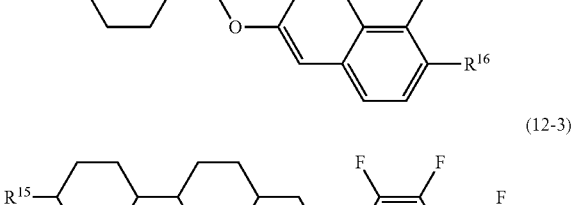
(12-3)
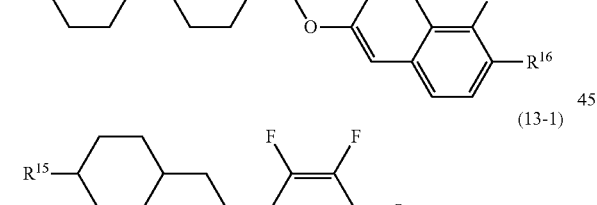
(13-1)
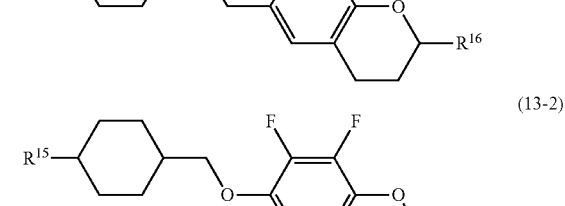
(13-2)
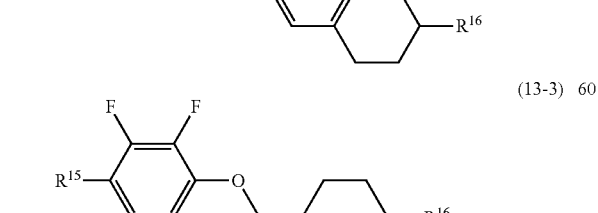
(13-3)
(13-4)
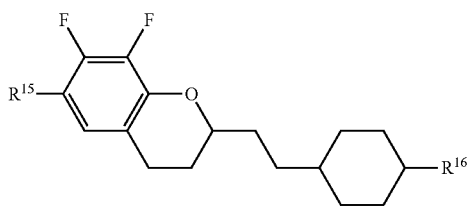
(13-5)
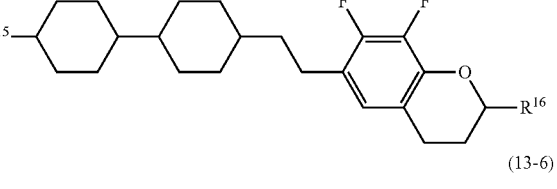
(13-6)
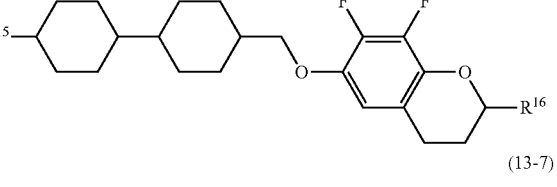
(13-7)
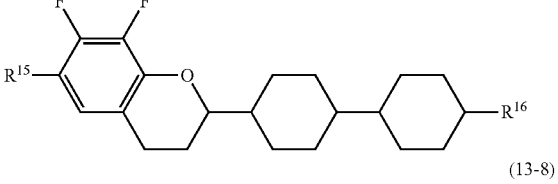
(13-8)
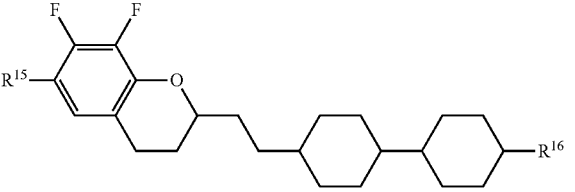
Formula 38
(13-9)
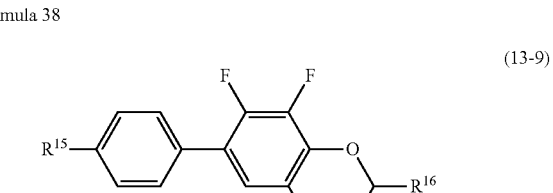
(13-10)
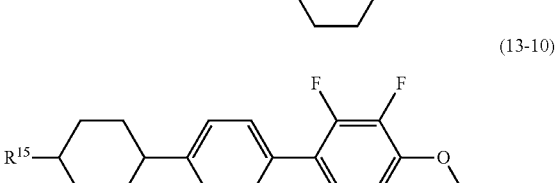
(13-11)
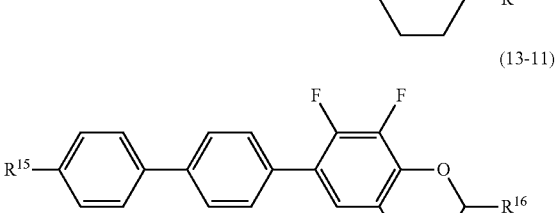

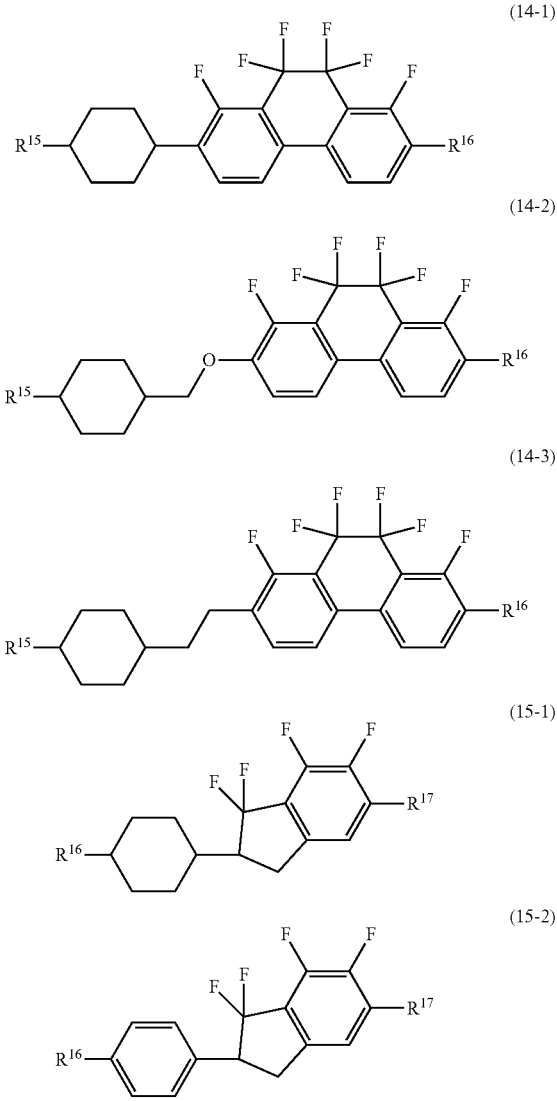
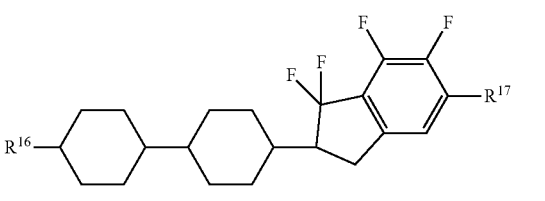

When the composition for the mode such as the IPS mode, the VA mode and the PSA mode is prepared, a content of compounds (9) to (15) is preferably about 40% by weight or more, and further preferably in the range of about 50% by weight to about 95% by weight, based on the weight of the liquid crystal composition. When compounds (9) to (15) are added to a composition having positive dielectric anisotropy, the content of the compounds is preferably about 30% by weight or less based on the weight of the liquid crystal composition. The elastic constant of the composition can be adjusted, and the voltage-transmittance curve of the device can be adjusted by adding the compounds.

Preparation of the liquid crystal composition is performed according to a method for dissolving required components at temperature higher than room temperature, or the like. According to an application, the additive may be added to the composition. Specific examples of the additives include an optically active compound, an antioxidant, an ultraviolet light absorber, a light stabilizer, a heat stabilizer, an anti-foaming agent, a polymerizable compound, a polymerization initiator and a polymerization inhibitor. Such additives are well known to those skilled in the art, and described in literature.

The optically active compound is effective in inducing helical structure in liquid crystal molecules to give a required twist angle, and thereby preventing a reverse twist. A helical pitch can be adjusted by adding the optically active compound thereto. Two or more optically active compounds may be added for the purpose of adjusting temperature dependence of the helical pitch. Specific examples of a preferred optically active compound include compounds (Op-1) to (Op-18) described below. In compound (Op-18), ring J is 1,4-cyclohexylene or 1,4-phenylene, and $R^{28}$ is alkyl having 1 to 10 carbons.

Formula 39

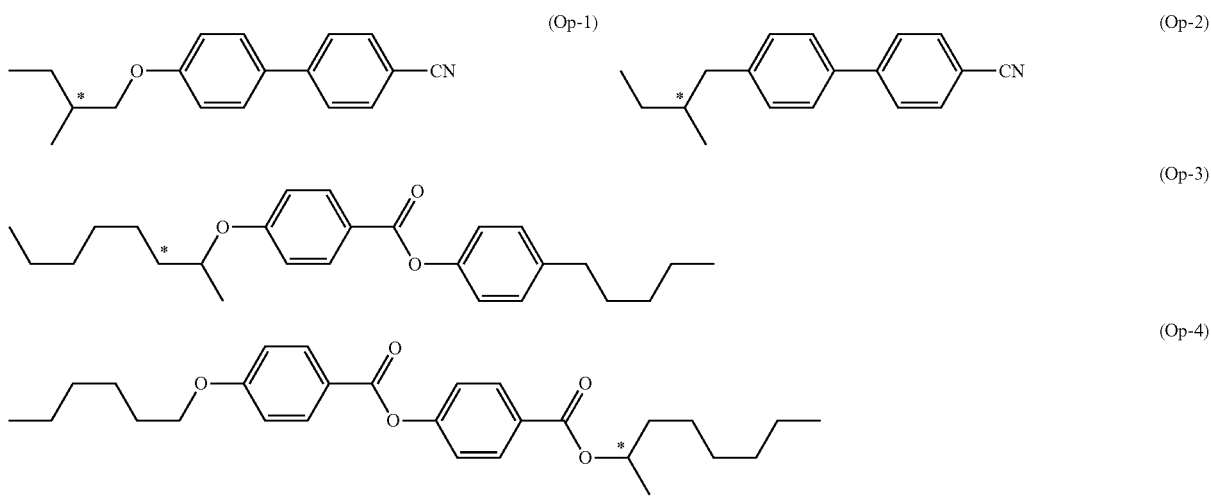

-continued
(Op-5)
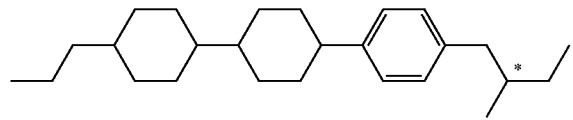
(Op-6)
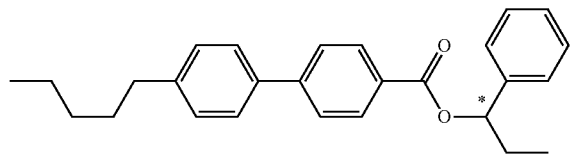
(Op-7)
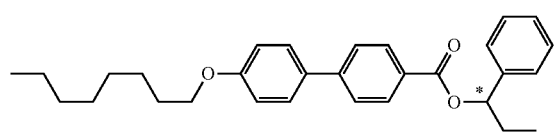
(Op-8)
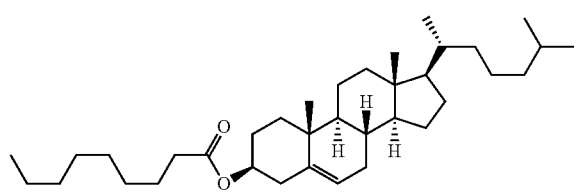
(Op-9)
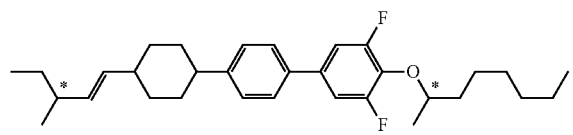
(Op-10)
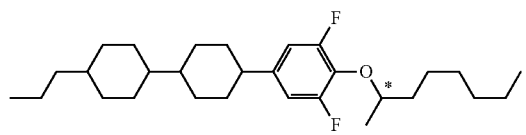
(Op-11)
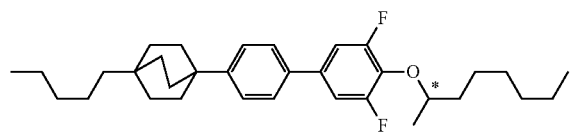
(Op-12)
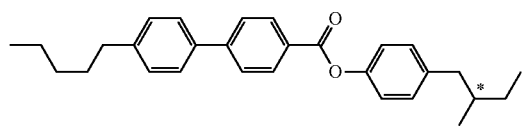
(Op-13)
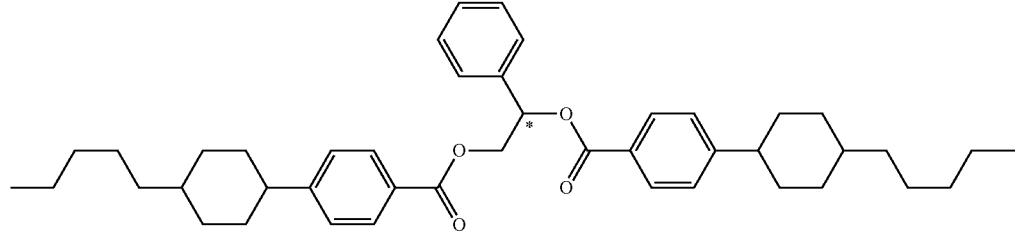
(Op-14)
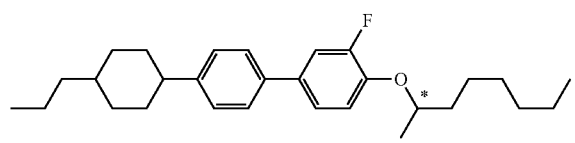
(Op-15)
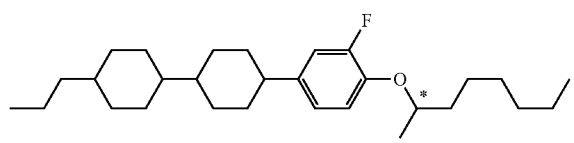
(Op-16)
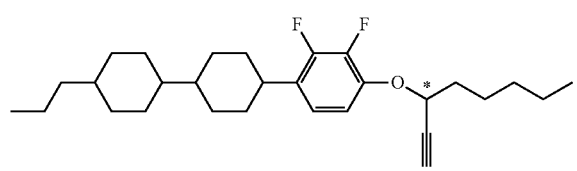
(Op-17)
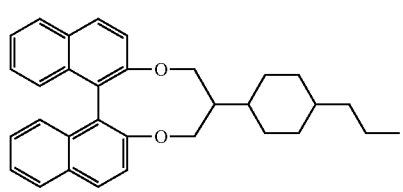

-continued (Op-18)

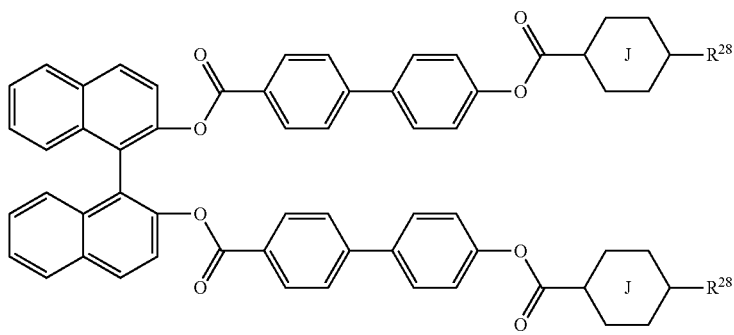

The antioxidant is effective for maintaining a large voltage holding ratio. Specific examples of a preferred antioxidant include compounds (AO-1) and (AO-2) described below; and IRGANOX 415, IRGANOX 565, IRGANOX 1010, IRGANOX 1035, IRGANOX 3114 and IRGANOX 1098 (trade names: BASF SE). The ultraviolet light absorber is effective for preventing a decrease of the maximum temperature. Specific examples of a preferred ultraviolet light absorber include a benzophenone derivative, a benzoate derivative and a triazole derivative. Specific examples include compounds (AO-3) and (AO-4) described below; TINUVIN 329, TINUVIN P, TINUVIN 326, TINUVIN 234, TINUVIN 213, TINUVIN 400, TINUVIN 328 and TINUVIN 99-2 (trade names: BASF SE); and 1,4-diazabicyclo[2.2.2]octane (DABCO).

The light stabilizer such as an amine having steric hindrance is preferred for maintaining the large voltage holding ratio. Specific examples of a preferred light stabilizer include compounds (AO-5) and (AO-6) described below; and TINUVIN 144, TINUVIN 765 and TINUVIN 770DF (trade names: BASF SE). The heat stabilizer is also effective for maintaining the large voltage holding ratio, and preferred examples include IRGAFOS 168 (trade name: BASF SE). The antifoaming agent is effective for preventing foam formation. Specific examples of a preferred antifoaming agent include dimethyl silicone oil and methylphenyl silicone oil.

Formula 40

(AO-1)

(AO-2)

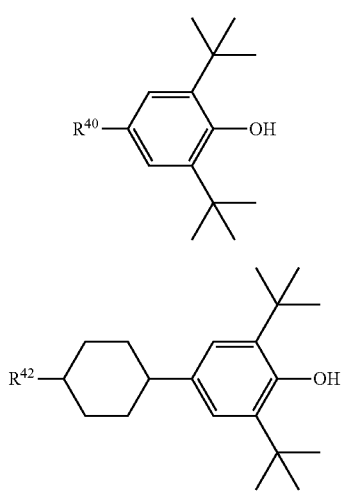

-continued (AO-3)

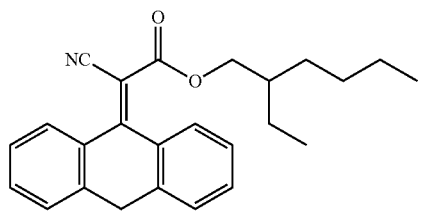

(AO-4)

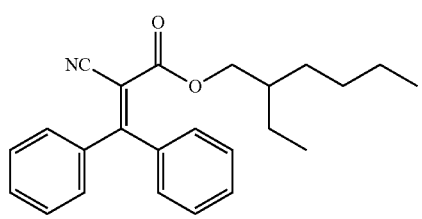

(AO-5)

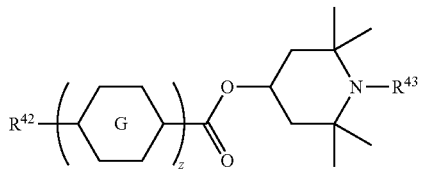

(AO-6)

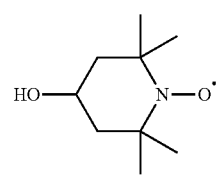

In compound (AO-1), $R^{40}$ is alkyl having 1 to 20 carbons, alkoxy having 1 to 20 carbons, —COOR$^{41}$ or —CH$_2$CH$_2$COOR$^{41}$, in which $R^{41}$ is alkyl having 1 to 20 carbons. In compound (AO-2), $R^{42}$ is alkyl having 1 to 20 carbons. In compound (AO-5), $R^{42}$ is alkyl having 1 to 20 carbons; $R^{43}$ is hydrogen, methyl or O (oxygen radical); ring G is 1,4-cyclohexylene or 1,4-phenylene; and z is 1, 2 or 3.

The polymerizable compound is polymerized while being sterically controlled, and thus a response time of the device can be shortened to decrease image persistence. Specific examples of a preferred polymerizable compound include acrylate, methacrylate, a vinyl compound, a vinyloxy compound, propenyl ether, an epoxy compound (oxirane, oxetane) and vinyl ketone. Further preferred examples include a compound having at least one piece of acryloyloxy, and a compound having at least one piece of methacryloyloxy.

Still further preferred examples also include a compound having both acryloyloxy and methacryloyloxy.

Additional examples of other polymerizable compounds include compounds (M-1) to (M-17). In compounds (M-1) to (M-17), $R^{25}$, $R^{26}$, $R^{27}$, $R^{28}$, $R^{29}$, $R^{30}$ and $R^{31}$ are independently hydrogen or methyl; s, v and x are independently 0 or 1; and t and u are independently an integer from 1 to 10. $L^{21}$, $L^{22}$, $L^{23}$, $L^{24}$, $L^{25}$ and $L^{26}$ are independently hydrogen or fluorine; and L27 and L28 are independently hydrogen, fluorine or methyl.

Formula 41

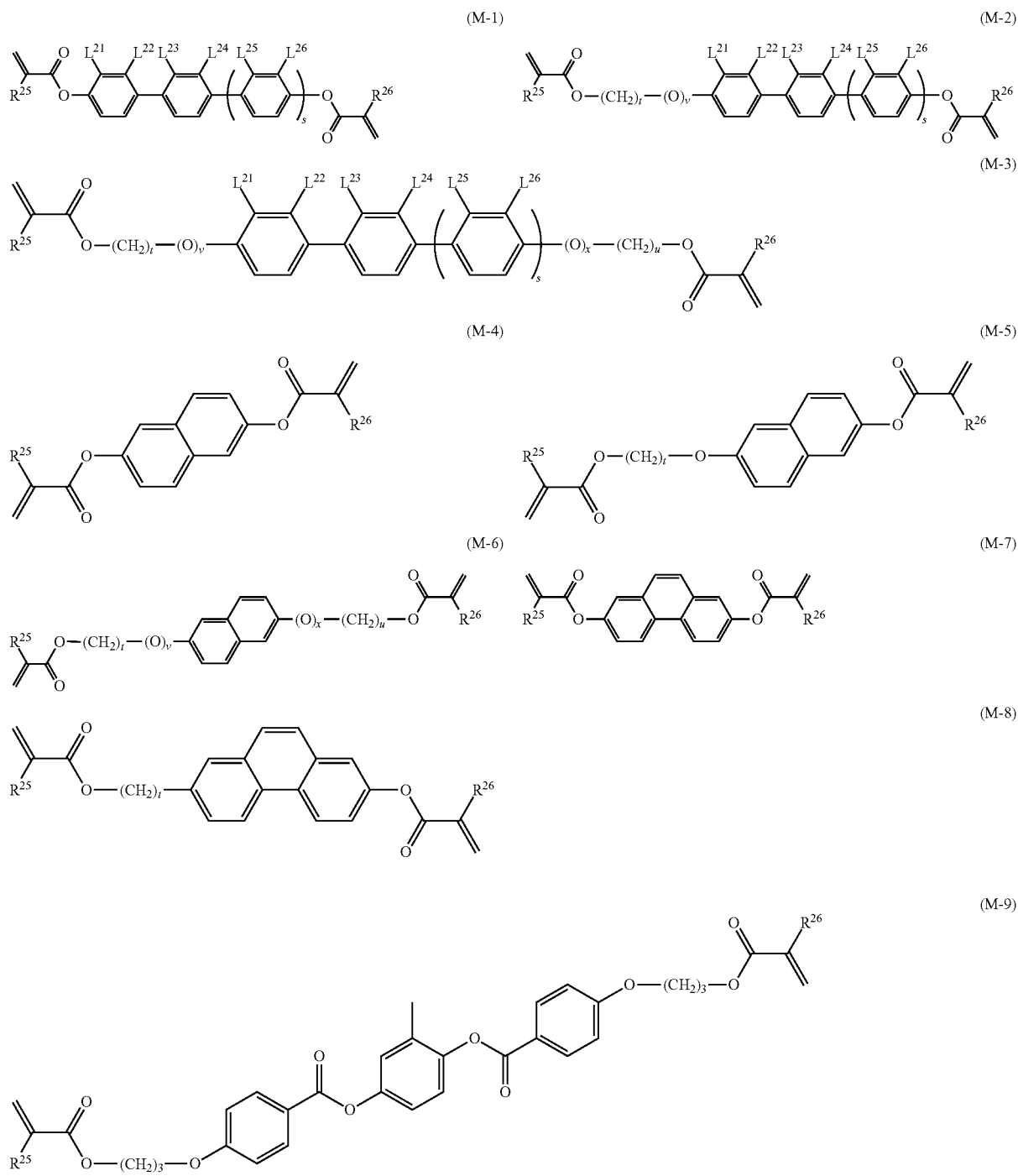

-continued
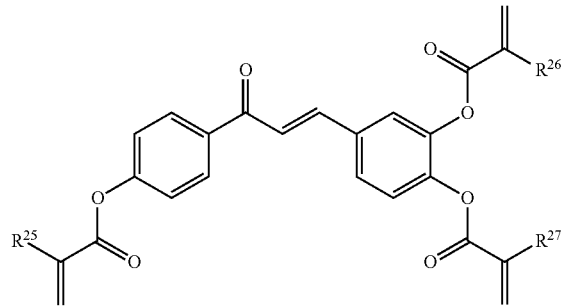
(M-10)
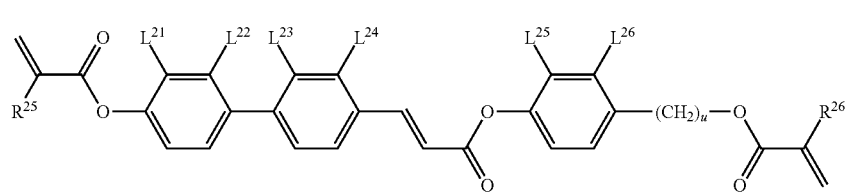
(M-11)
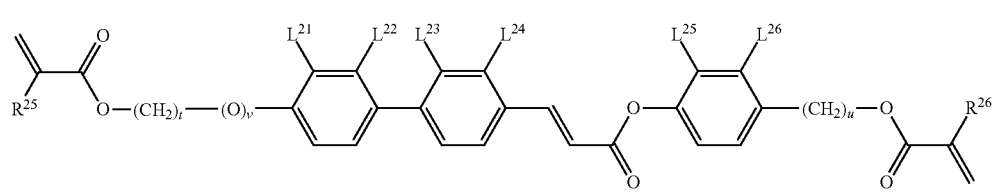
(M-12)
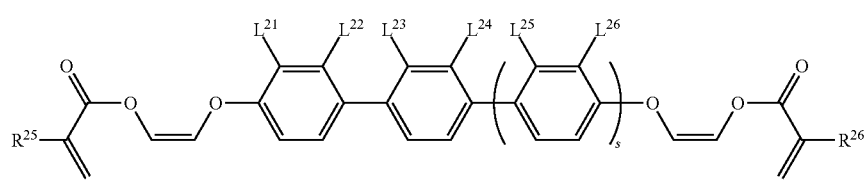
(M-13)
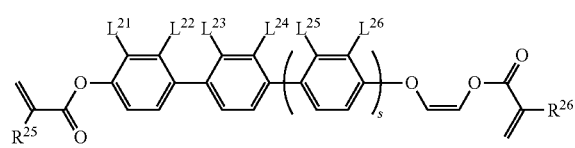
(M-14)
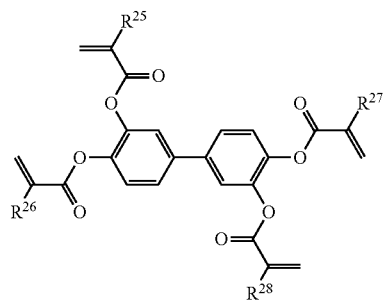
(M-15)
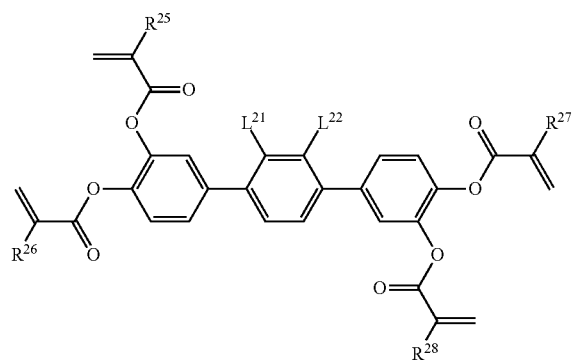
(M-16)
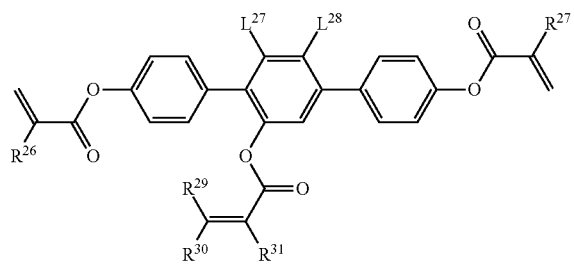
(M-17)

The polymerizable compound can be rapidly polymerized by adding the polymerization initiator. An amount of a remaining polymerizable compound can be decreased by optimizing the reaction temperature. Specific examples of photoradical polymerization initiators include TPO, 1173 and 4265 from Darocur series of BASF SE, and 184, 369, 500, 651, 784, 819, 907, 1300, 1700, 1800, 1850 and 2959 from Irgacure series of BASF SE.

Additional examples of the photoradical polymerization initiators include 4-methoxyphenyl-2,4-bis(trichloromethyl) triazine, 2-(4-butoxystyryl)-5-trichloromethyl-1,3,4-oxadiazole, 9-phenylacridine, 9,10-benzphenazine, a benzophenone-Michler's ketone mixture, a hexaarylbiimidazole-mercaptobenzimidazole mixture, 1-(4-isopropylphenyl)-2-hydroxy-2-methylpropane-1-one, benzyl dimethyl ketal, 2-methyl-1-[4-(methylthio)phenyl]-2-morpholinopropane-1-one, a mixture of 2,4-diethylxanthone and methyl p-dimethylaminobenzoate and a mixture of benzophenone and methyltriethanolamine.

Upon storing the polymerizable compound, the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

4. Liquid Crystal Display Device

The liquid crystal composition having positively large dielectric anisotropy can be used in a liquid crystal display device having an operating mode such as a PC mode, the TN mode, the STN mode, the OCB mode and the PSA mode, and driven by an active matrix (AM mode). The composition can also be used in a liquid crystal display device having an operating mode such as the PC mode, the TN mode, the STN mode, the OCB mode, the VA mode and the IPS mode, and driven by a passive matrix (PM) mode. The AM mode device and the PM mode device can also be applied to any of a reflective type, a transmissive type and a transflective type.

A liquid crystal composition having negatively large dielectric anisotropy has negative dielectric anisotropy, and therefore can be suitably used in a liquid crystal display device having an operating mode such as the VA mode, the IPS mode and the PSA mode, and driven by the AM mode. The composition can be particularly suitably used in a liquid crystal display device having the VA mode, and driven by the AM mode.

Such a composition can also be used in a nematic curvilinear aligned phase (NCAP) device prepared by microencapsulating a nematic liquid crystal, a polymer dispersed liquid crystal display device (PDLCD) and a polymer network liquid crystal display device (PNLCD) prepared by forming a three-dimensional network-polymer in the liquid crystal. When an amount of adding the polymerizable compound is in the range of about 0.1% by weight to about 2% by weight based on the weight of the liquid crystal composition, a liquid crystal display device having the PSA mode is prepared. The device having the PSA mode can be driven by a driving mode such as the active matrix (AM) mode and the passive matrix (PM) mode. A device having a polymer dispersed mode can also be prepared by increasing the amount of adding the polymerizable compound.

EXAMPLES

NMR Analysis:

For measurement, DPX-300 made by Bruker BioSpin Corporation was used. In $^1$H-NMR measurement, a sample was dissolved in a deuterated solvent such as $CDCl_3$, and measurement was carried out under conditions of room temperature, 300 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Determination of Liquid Crystal Phase Group and Transition Temperature:

(1) Phase structure: A sample was placed on Hot and Cold Stage (Hot and Cold Stage, HCS400 made by Instec, Inc.) of a melting point apparatus equipped with a polarizing microscope (Nikon, ECLIPSE E400 POL). A state of phase and a change thereof were observed with the polarizing microscope while the sample was heated at a rate of 1° C. per minute, and a kind of the phase was specified.

(2) Transition temperature (° C.): For measurement, as a differential scanning calorimeter, DSC 3100S, made by MAC Science Co., Ltd. was used. A sample was heated and then cooled at a rate of 5° C. per minute, and a starting point of an endothermic peak or an exothermic peak caused by a phase change of the sample was determined by extrapolation, and thus transition temperature was determined. A melting point and a polymerization starting temperature of a compound were also measured using the apparatus. Temperature at which a compound undergoes transition from a solid to a liquid crystal phase such as a smectic phase and a nematic phase may be occasionally abbreviated as "minimum temperature of the liquid crystal phase." Temperature at which the compound undergoes transition from the liquid crystal phase to liquid may be occasionally abbreviated as "clearing point."

A crystal was expressed as C. When kinds of the crystals were distinguishable, each of the crystals was expressed as $C_1$ or $C_2$. The smectic phase and the nematic phase were expressed as S and N, respectively. When smectic A phase, smectic B phase, smectic C phase or smectic F phase was distinguishable among the smectic phases, the phases were expressed as $S_A$, $S_B$, $S_C$ or $S_F$, respectively. A liquid (isotropic) was expressed as I. A transition temperature was expressed as "C 50.0 N 100.0 I," for example. The expression indicates that transition temperature from the crystals to the nematic phase is 50.0° C., and transition temperature from the nematic phase to the liquid is 100.0° C.

XRD Measurement:

XRD (X-ray diffraction) measurement was carried out as confirmation of biaxiality of the nematic phase. For measurement, RINT2200 diffractometer made by Rigaku Corporation, and TRY-DXGSA-HHIP diffractometer made by TRY SE Co., Ltd. were used.

Synthesis Example 1

Compound (No. 4)

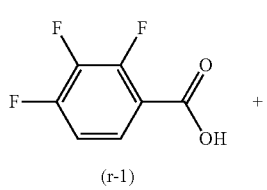

Formula 42

(r-1)

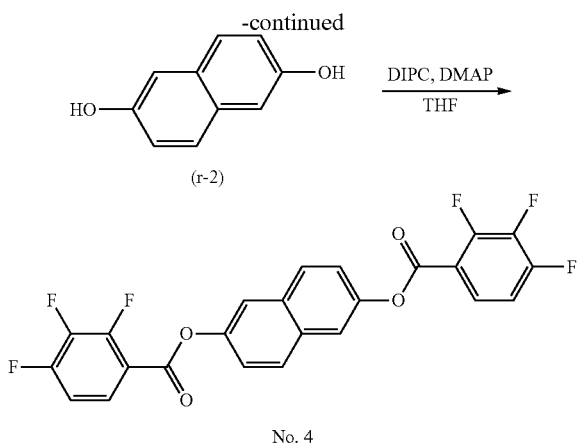

No. 4

In a 200 mL recovery flask to which a calcium chloride tube was attached, 3.33 g (18.9 mmol) of 2,3,4-trifluorobenzoic acid (r-1), 1.40 g (8.75 mmol) of 2,6-dihydroxynaphthalene (r-2), 2.40 g (19.0 mmol) of N,N'-diisopropylcarbodiimide (DIPC) and 0.21 g (1.7 mmol) of 4-dimethylaminopyridine (DMAP) were dissolved into 50 mL of tetrahydrofuran (THF), and the resulting mixture was stirred at room temperature for 24 hours. The filtered solid was put in 50 mL of THF, the resulting mixture was stirred for 24 hours, the resulting crystals after filtration were put in 100 mL of dichloromethane, and the resulting mixture was stirred for 24 hours. The resulting crystals after filtration were subjected to recrystallization from chlorobenzene to obtain compound (No. 4).

$^1$H-NMR (CDCl$_3$; δ ppm): 7.90-8.00 (m, 2H), 7.91 (d, 2H), 7.77 (d, 2H), 7.41 (dd, 2H), 7.14 (dd, 2H).

Transition temperature: C 227.9 N 234.7 I.

Synthesis Example 2

Compound (No. 6)

Formula 43

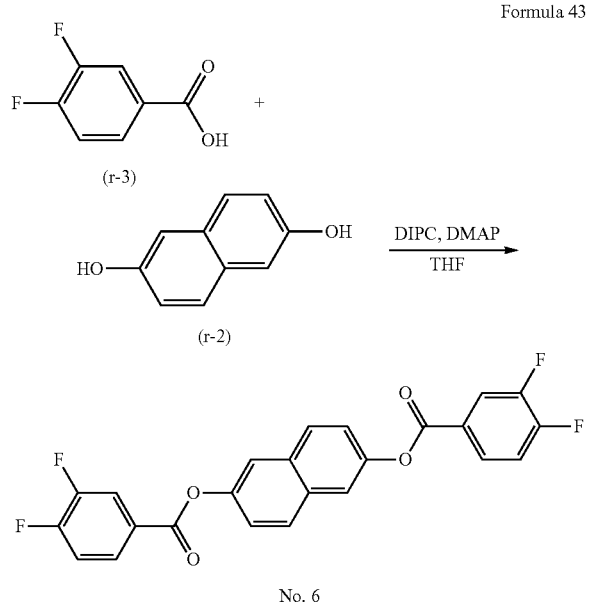

No. 6

In a 200 mL recovery flask to which a calcium chloride tube was attached, 2.99 g (18.9 mmol) of 3,4-difluorobenzoic acid (r-3), 1.40 g (8.75 mmol) of 2,6-dihydroxynaphthalene, 2.40 g of DIPC (18.9 mmol) and 0.21 g (1.7 mmol) of DMAP were dissolved into 50 mL of THF, and the resulting mixture was stirred at room temperature for 24 hours. Filtrate after filtration was washed with distilled water, and dried by adding anhydrous magnesium sulfate thereto. A solvent was distilled off, the residue was purified by silica gel chromatography (chloroform), and then further recrystallization was performed from chloroform to obtain compound (No. 6).

$^1$H-NMR (CDCl$_3$; δ ppm): 8.04-8.12 (m, 4H), 7.91 (d, 2H), 7.73 (d, 2H), 7.26-7.41 (m, 4H).

Transition temperature: C 185.1 N 206.1 I.

Test Example 1

In compounds No. 4 and No. 6 in which a liquid crystal phase was developed, 2D-XRD was performed in a state in which a magnetic field was applied thereto to allow alignment in a state of a nematic phase.

Figure 2:
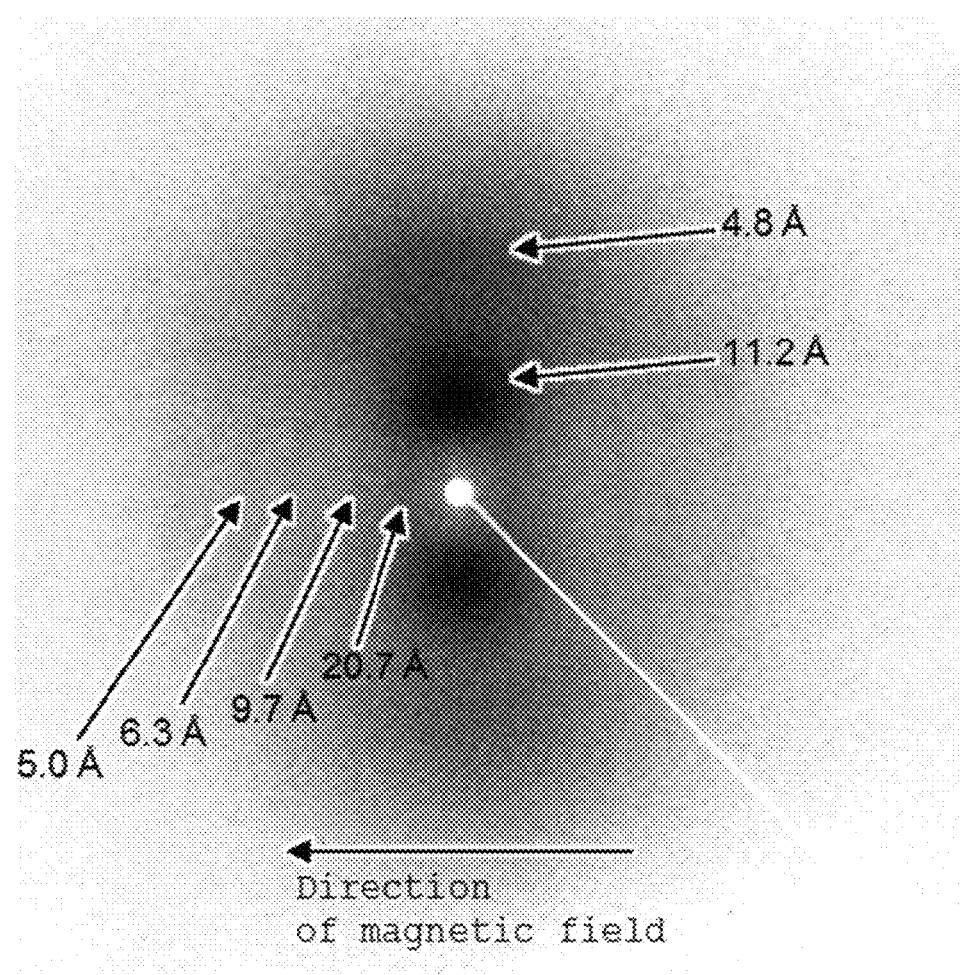
FIG. 2 is a diagram (photograph) showing measurement results of 2D-XRD of compound No. 6 prepared in Example 1.

As a result, in compound No. 4, if directions were aligned by the magnetic field in a liquid crystal phase, layer structure was observed, and therefore the liquid crystal phase was determined to be a biaxial nematic phase locally having SmA (FIG. 1). A liquid crystal phase of compound No. 6 was shown to form layer structure similar to a smectic phase to have orderliness also in a minor axis direction, indicating that the liquid crystal phase was also the biaxial nematic phase having layer structure locally similar to SmA structure (FIG. 2).

Test Example 2

Figure 3:
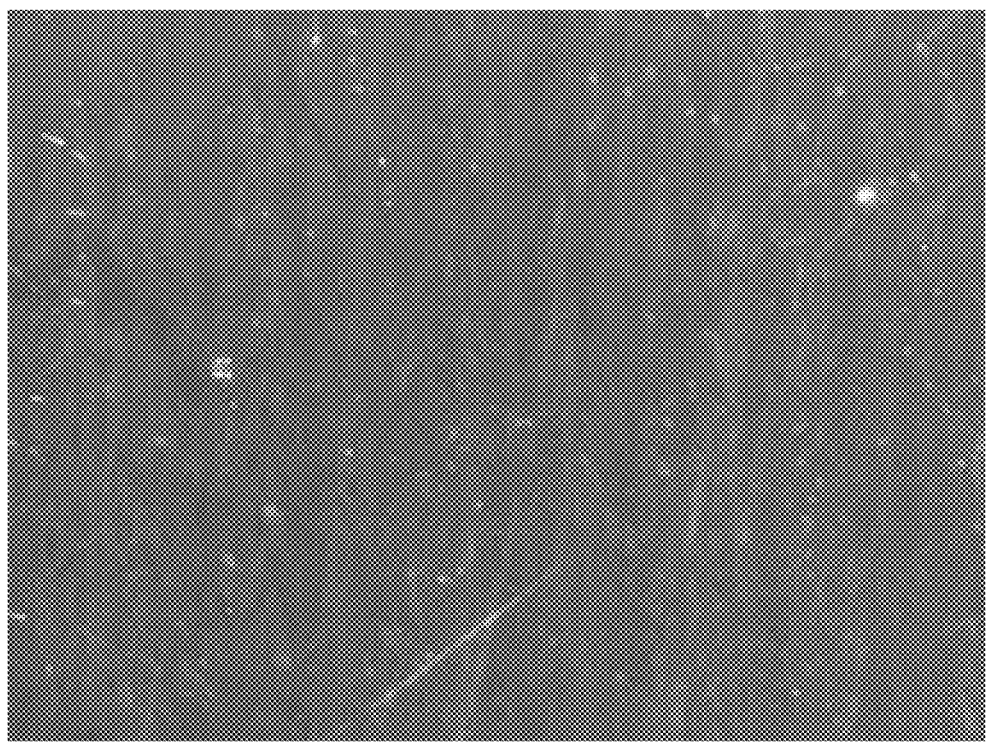
FIG. 3 is a diagram (photograph) showing a state before measurement of inversion current (before applying a triangular wave) in compound No. 6.

In compound No. 6 in which a nematic phase was developed, measurement of inversion current was carried out. A sample was injected into a glass cell coated with an ITO electrode (10 mm×10 mm) and a polyimide-alignment film (homogeneous alignment) and having a cell thickness of 15 μm. Liquid crystal molecules were aligned with the polyimide-alignment film to generate a dark field before applying a triangular wave (FIG. 3): Temperature of 185° C.

Figure 4:
FIG. 4 is a diagram (photograph) showing a state of results (voltage 0 V) obtained by measurement of inversion current in compound No. 6.
Figure 5:
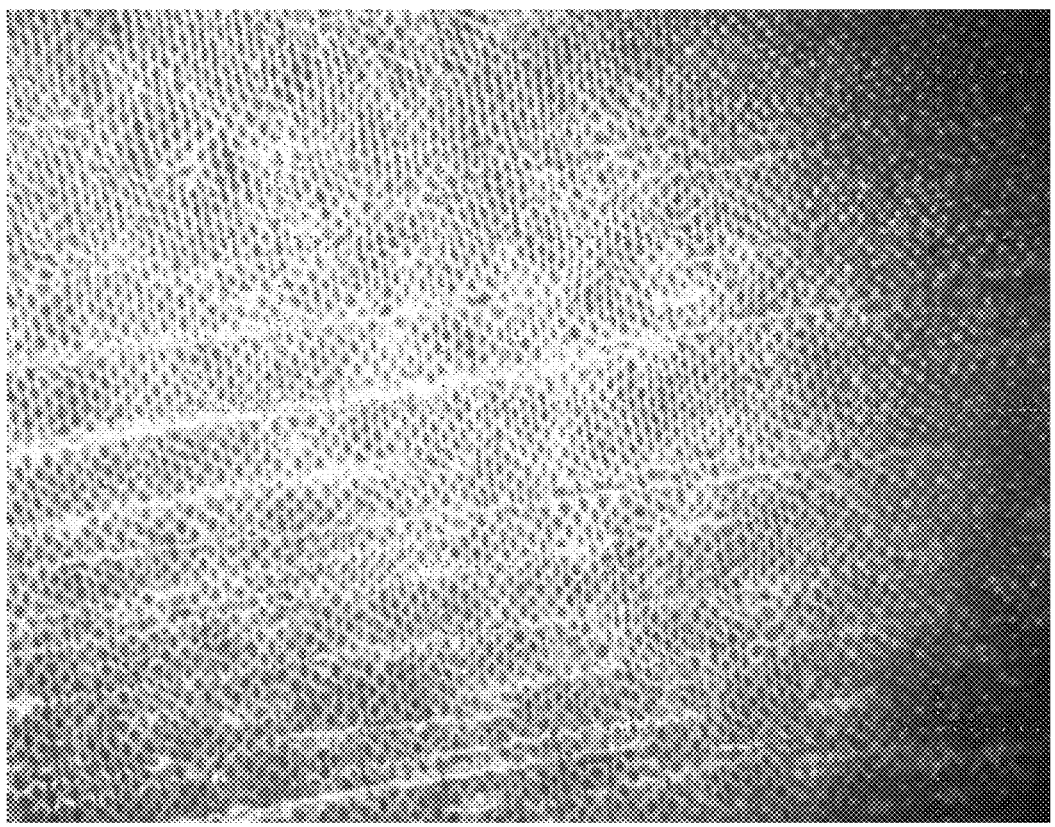
FIG. 5 is a diagram (photograph) showing a state of results (voltage 100 Vpp) obtained by measurement of inversion current in compound No. 6.
Figure 6:
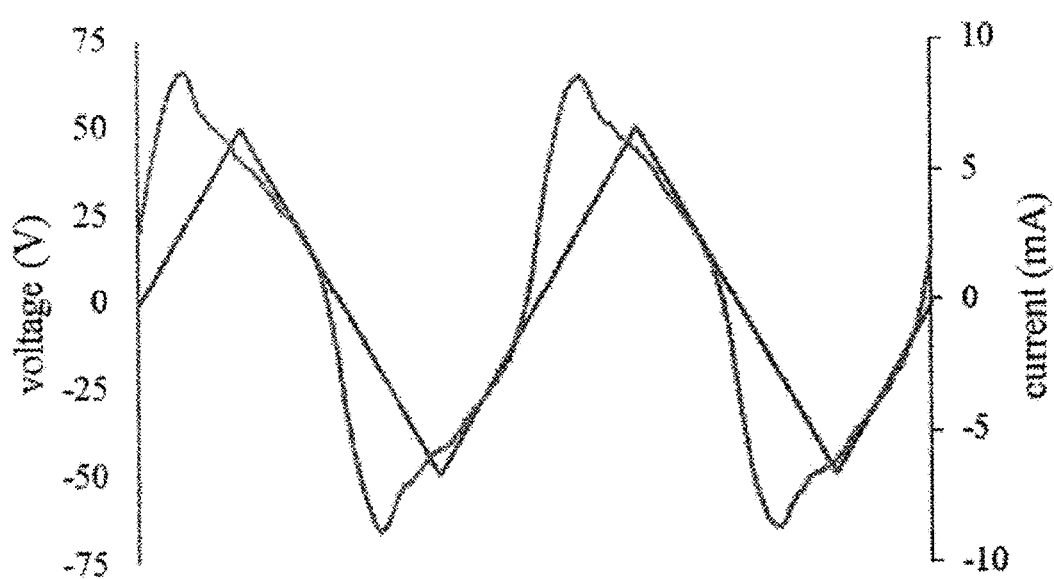
FIG. 6 is a diagram showing behavior of voltage and current upon measuring inversion current in compound No. 6.

A rapid change of light and darkness was shown if the triangular wave was applied to a liquid crystal cell into which compound No. 6 was sealed in a state of a nematic liquid crystal (185° C.) (FIG. 4): 0 V, (FIG. 5): 100 Vpp, 5 Hz. Behavior of current upon the above occasion was as shown in FIG. 6.

Compound No. 6 showed a shoulder peak derived from polarized inversion current to exhibit ferroelectric behavior under conditions of 1.0 to 200 Vpp and 5 Hz.

A liquid crystal compound of the invention has ferroelectricity, and a liquid crystal display device using the liquid crystal compound produces a contrast ratio. Accordingly, a liquid crystal display device using a liquid crystal composition containing the liquid crystal compound can be used in a liquid crystal projector, a liquid crystal television and so forth.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-101478, filed May 20, 2016 which is hereby incorporated by reference herein in its entirety.

What is claimed is:

1. A compound, represented by formula (1):

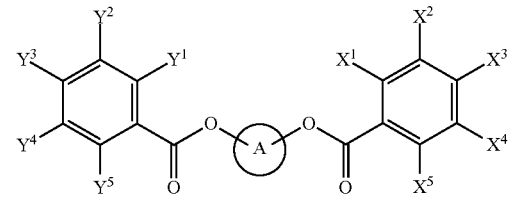

(1)

wherein, in formula (1), ring A is naphthylene, phenanthrenylene, or anthracenylene wherein at least one hydrogen may be replaced by halogen, $-CH_3$, $-C_2H_5$, $-CF_3$, $-CHF_2$, $-CH_2F$, $-OCF_3$, $-OCHF_2$, or $-OCH_2F$; and $X^1$, $X^2$, $X^3$, $X^4$, $X^5$, $Y^1$, $Y^2$, $Y^3$, $Y^4$, and $Y^5$ are independently hydrogen or fluorine, but at least two of $X^1$, $X^2$, $X^3$, $X^4$, $X^5$, $Y^1$, $Y^2$, $Y^3$, $Y^4$, and $Y^5$ are fluorine.

2. The compound according to claim 1, wherein, in formula (1), ring A is naphthylene, phenanthrenylene, or anthracenylene wherein at least one hydrogen may be independently replaced by fluorine, $-CH_3$, or $-CF_3$.

3. The compound according to claim 1, represented by any one of formulas (1-1) to (1-12)

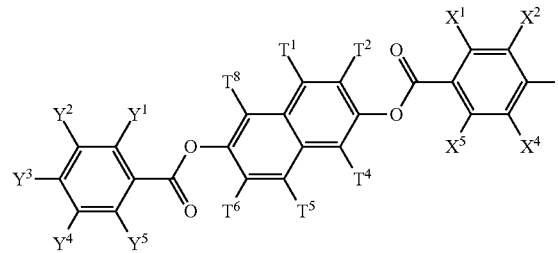

(1-1)

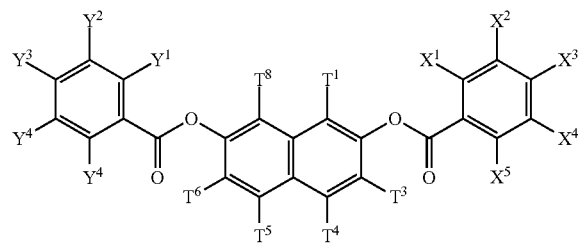

(1-2)

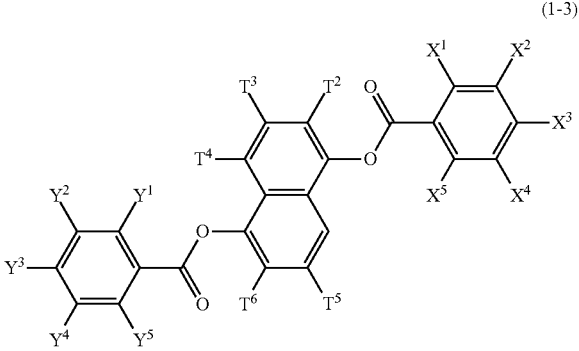

(1-3)

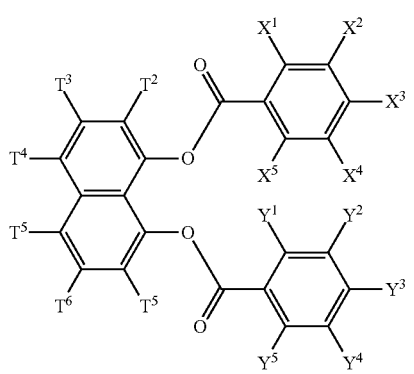

(1-4)

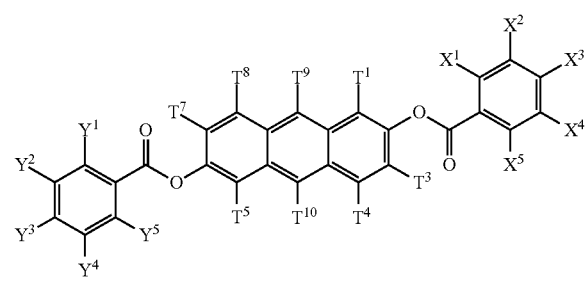

(1-5)

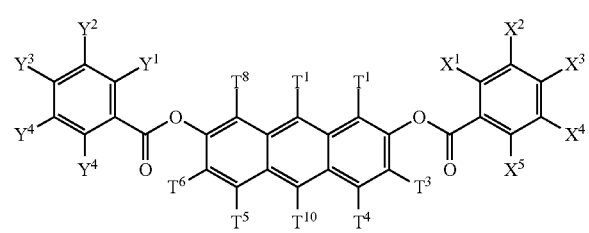

(1-6)

(1-7)

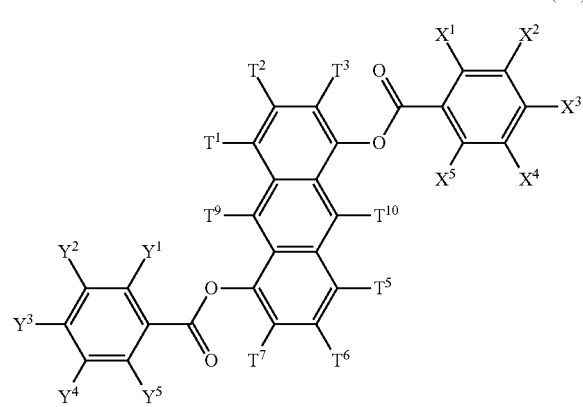

(1-8)

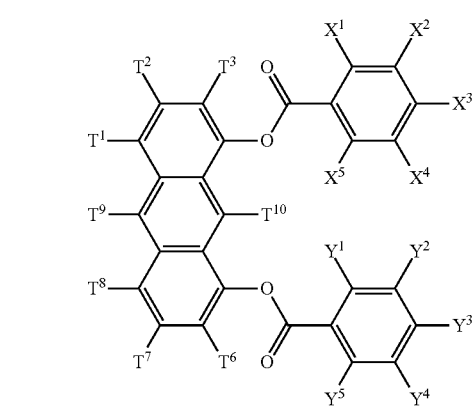

(1-9)

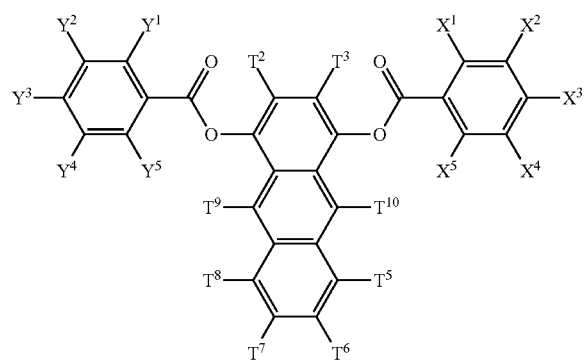

(1-10)

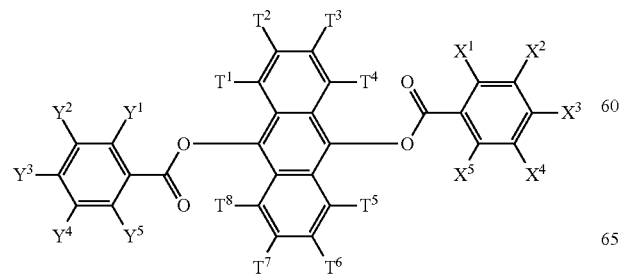

(1-11)

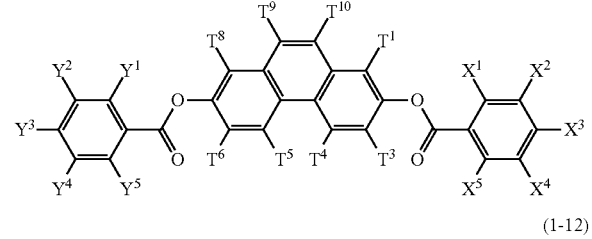

(1-12)

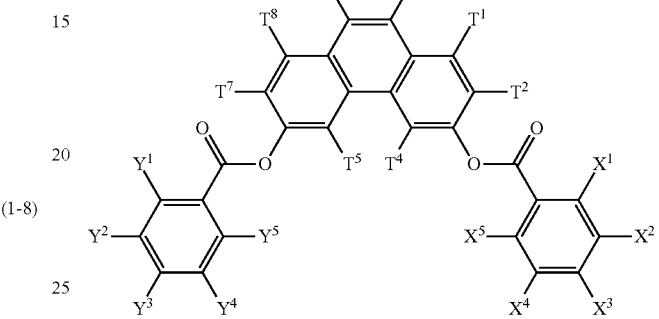

wherein, in formulas (1-1) to (1-12), $T^1$, $T^2$, $T^3$, $T^4$, $T^5$, $T^6$, $T^7$, $T^8$, $T^9$, and $T^{10}$ are independently hydrogen, halogen, —$CH_3$, —$C_2H_5$, —$CF_3$, —$CHF_2$, —$CH_2F$, —$OCF_3$, —$OCHF_2$, or —$OCH_2F$; and $X^1$, $X^2$, $X^3$, $X^4$, $X^5$, $Y^1$, $Y^2$, $Y^3$, $Y^4$, and $Y^5$ are independently hydrogen or fluorine, but at least two of $X^1$, $X^2$, $X^3$, $X^4$, $X^5$, $Y^1$, $Y^2$, $Y^3$, $Y^4$, and $Y^5$ are fluorine.

4. The compound according to claim 3, wherein, in formulas (1-1) to (1-12), $T^1$, $T^2$, $T^3$, $T^4$, $T^5$, $T^6$, $T^7$, $T^8$, $T^9$, and $T^{10}$ are independently hydrogen, fluorine, or —$CH_3$.

5. The compound according to claim 3, wherein, in formulas (1-1) to (1-12), $X^2$, $X^3$, $Y^2$, and $Y^3$ are fluorine.

6. The compound according to claim 3, represented by any one of formula (1-1), formula (1-2), formula (1-5), formula (1-6), formula (1-11), or formula (1-12).

7. The compound according to claim 3, represented by any one of formula (1-3), formula (1-4), formula (1-7), formula (1-8), formula (1-9), or formula (1-10).

8. The compound according to claim 3, represented by any one of formula (1-1-A), formula (1-2-A), formula (1-5-A), formula (1-6-A), formula (1-11-A), and formula (1-12-A):

(1-1-A)

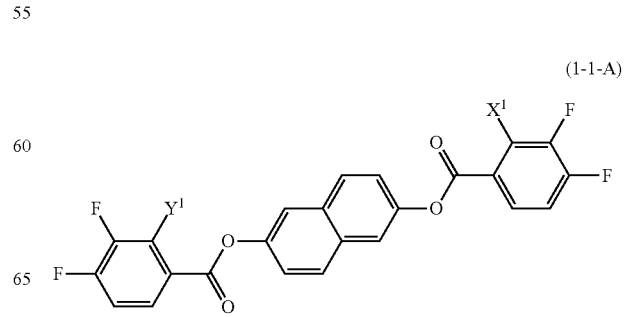

-continued (1-2-A)
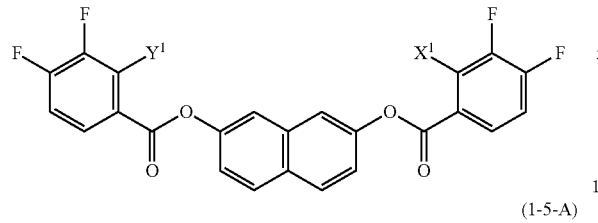

(1-5-A)
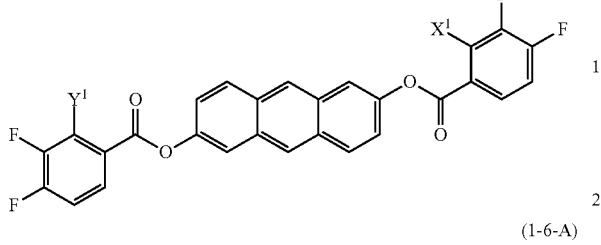

(1-6-A)
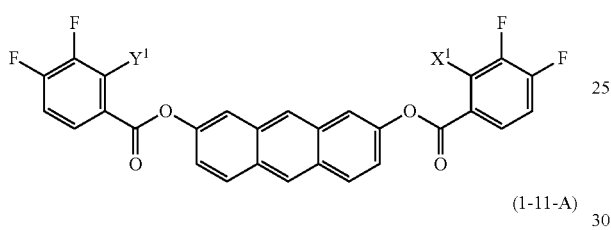

(1-11-A)
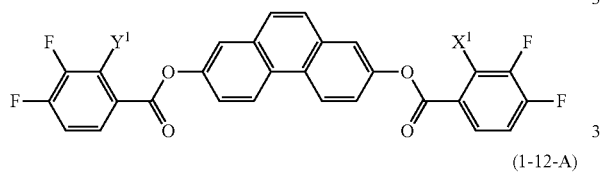

(1-12-A)
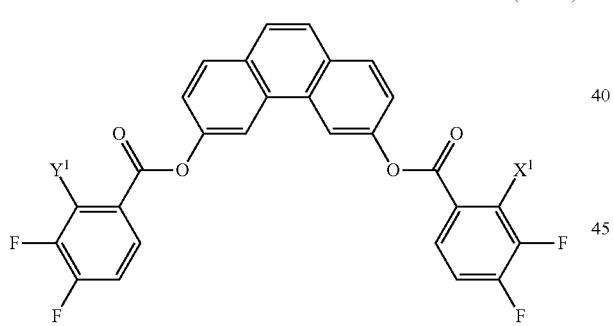

wherein, in formula (1-1-A), formula (1-2-A), formula (1-5-A), formula (1-6-A), formula (111-A), and formula (1-12-A), $X^1$ and $Y^1$ are independently hydrogen or fluorine.

9. The compound according to claim 8, wherein, in formula (1-1-A), formula (1-2-A), formula (1-5-A), formula (1-6-A), formula (1-11-A), and formula (1-12-A), both of $X^1$ and $Y^1$ are hydrogen.

10. The compound according to claim 9, represented by formula (1-1-A) and formula (1-2-A).

11. A liquid crystal composition, containing at least one compound according to claim 1.

12. The liquid crystal composition according to claim 11, further containing at least one compound selected from the group consisting of compounds represented by formulas (2) to (4):

(2)

(3)
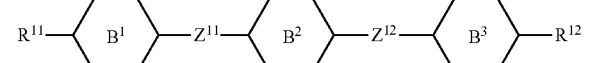

(4)
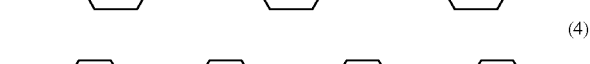

wherein, in formulas (2) to (4),
ring $B^1$, ring $B^2$, ring $B^3$, and ring $B^4$ are independently 1,4-cyclohexylene, 1,4-phenylene, 2-fluoro-1,4-phenylene, 2,5-difluoro-1,4-phenylene, or pyrimidine-2,5diyl;
$R^{11}$ and $R^{12}$ are independently alkyl having 1 to 10 carbons or alkenyl having 2 to 10carbons, and in the alkyl and the alkenyl, at least one —CH$_2$— may be replaced by —O—, and in the alkyl and the alkenyl, at least one hydrogen may be replaced by fluorine; and
$Z^{11}$, $Z^{12}$, and $Z^{13}$ are independently a single bond, —COO—, —CH$_2$CH$_2$—, —CH═CH—, or —C≡C—.

13. The liquid crystal composition according to claim 11, further containing at least one compound selected from the group consisting of compounds represented by formulas (5) to (7):

(5)

(6)
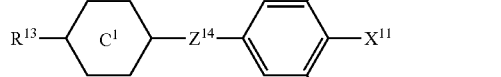

(7)

wherein, in formulas (5) to (7),
ring $C^1$, ring $C^2$, and ring $C^3$ are independently 1,4-cyclohexylene, 1,4-phenylene, or 1,4-phenylene in which at least one hydrogen is replaced by fluorine, tetrahydropyran-2,5-diyl, 1,3-dioxane-2,5-diyl, or pyrimidine-2,5-diyl;
$R^{13}$ is alkyl having 1 to 10 carbons or alkenyl having 2 to 10 carbons, and in the alkyl and the alkenyl, at least one —CH$_2$— may be replaced by —O—, and in the alkyl and the alkenyl, at least one hydrogen may be replaced by fluorine;

$X^{11}$ is fluorine, chlorine, —OCF$_3$, —OCHF$_2$, —CF$_3$, —CHF$_2$, —CH$_2$F, —OCF$_2$CHF$_2$, or —OCF$_2$CHFCF$_3$;

$Z^{14}$, $Z^{15}$, and $Z^{16}$ are independently a single bond, —COO—, —OCO—, —CH$_2$O—, —OCH$_2$—, —CF$_2$O—, —OCF$_2$—, —CH$_2$CH$_2$—, —CH=CH—, —C≡C—, or —(CH$_2$)$_4$—; and $L^{11}$ and $L^{12}$ are independently hydrogen or fluorine.

14. The liquid crystal composition according to claim 11, further containing at least one compound represented by formula (8):

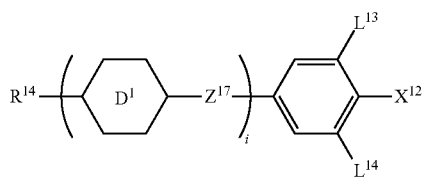
(8)

wherein, in formula (8), ring $D^1$ is 1,4-cyclohexylene, 1,4-phenylene, or 1,4-phenylene in which at least one hydrogen is replaced by fluorine, tetrahydropyran-2,5-diyl, 1,3-dioxane-2,5-diyl or pyrimidine-2,5-diyl;

$R^{14}$ is alkyl having 1 to 10 carbons or alkenyl having 2 to 10 carbons, and in the alkyl and the alkenyl, at least one —CH$_2$— may be replaced by —O—, and in the alkyl and the alkenyl, at least one hydrogen may be replaced by fluorine;

$X^{12}$ is —C≡N or —C≡C—C≡N;

$Z^{17}$ is a single bond, —COO—, —OCO—, —CH$_2$O—, —OCH$_2$—, —CF$_2$O—, —OCF$_2$—, —CH$_2$CH$_2$—, or —C≡C—;

$L^{13}$ and $L^{14}$ are independently hydrogen or fluorine; and i is 1, 2, 3, or 4.

15. The liquid crystal composition according to claim 11, further containing at least one compound selected from the group consisting of compounds represented by formulas (9) to (15):

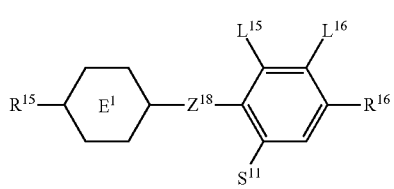
(9)

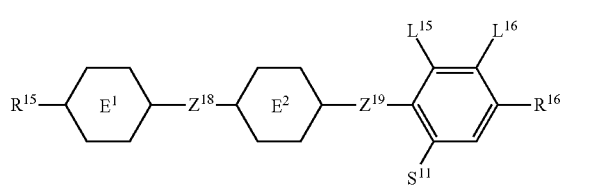
(10)

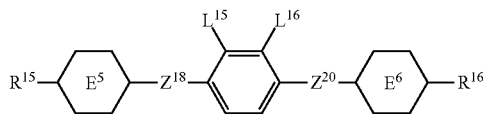
(11)

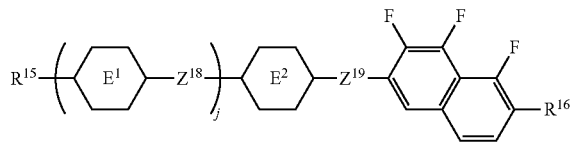
(12)

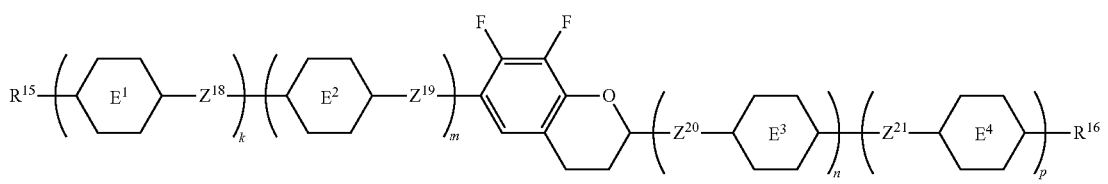
(13)

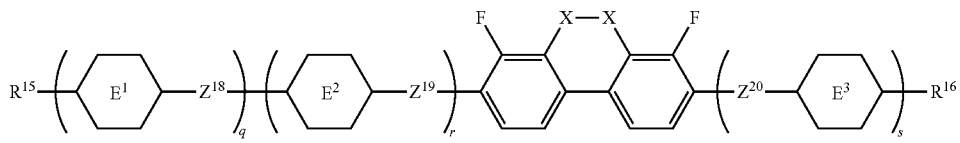
(14)

(15)

wherein, in formulas (9) to (15),
- ring $E^1$, ring $E^2$, ring $E^3$, and ring $E^4$ are independently 1,4-cyclohexylene, 1,4-cyclohexenylene, 1,4-phenylene, or 1,4-phenylene in which at least one hydrogen is replaced by fluorine, tetrahydropyran-2,5-diyl, or decahydronaphthalene-2,6-diyl;
- ring $E^5$ and ring $E^6$ are independently 1,4-cyclohexylene, 1,4-cyclohexenylene, 1,4-phenylene, tetrahydropyran-2,5-diyl, or decahydronaphthalene-2,6-diyl;
- $R^{15}$ and $R^{16}$ are independently alkyl having 1 to 10 carbons or alkenyl having 2 to 10 carbons, and in the alkyl and the alkenyl, at least one —$CH_2$— may be replaced by —O—, and in the alkyl and the alkenyl, at least one hydrogen may be replaced by fluorine;
- $R^{17}$ is hydrogen, fluorine, alkyl having 1 to 10 carbons or alkenyl having 2 to 10 carbons, and in the alkyl and the alkenyl, at least one —$CH_2$—may be replaced by —O—, and at least one hydrogen may be replaced by fluorine;
- $Z^{18}$, $Z^{19}$, $Z^{20}$, and $Z^{21}$ are independently a single bond, —COO—, —OCO—, —$CH_2O$—, —$OCH_2$—, —$CF_2O$—, —$OCF_2$—, —$CH_2CH_2$—, —$CF_2OCH_2CH_2$—,or —$OCF_2CH_2CH_2$—;
- $L^{15}$ and $L^{16}$ are independently fluorine or chlorine;
- $S^{11}$ is hydrogen or methyl;
- X is —CHF— or —$CF_2$—; and
- j, k, m, n, p, q, r, and s are independently 0 or 1, a sum of k, m, n, and p is 1 or 2, a sum of q, r, and s is 0, 1, 2, or 3, and t is 1, 2, or 3.

16. A liquid crystal display device, including the liquid crystal composition according to claim 11.

\* \* \* \* \*